(12) United States Patent
Nakajima et al.

(10) Patent No.: US 8,290,363 B2
(45) Date of Patent: Oct. 16, 2012

(54) OPTICAL LINE MONITORING APPARATUS AND OPTICAL LINE MONITORING METHOD

(75) Inventors: Toshiaki Nakajima, Sakura (JP); Kenji Yasuhara, Sakura (JP)

(73) Assignee: Fujikura Ltd., Tokyo (JP)

( * ) Notice: Subject to any disclaimer, the term of this patent is extended or adjusted under 35 U.S.C. 154(b) by 912 days.

(21) Appl. No.: 12/184,273

(22) Filed: Aug. 1, 2008

(65) Prior Publication Data

US 2009/0190921 A1 Jul. 30, 2009

Related U.S. Application Data

(63) Continuation of application No. PCT/JP2007/051814, filed on Feb. 2, 2007.

(30) Foreign Application Priority Data

Feb. 3, 2006 (JP) .................................. 2006-026763
Oct. 26, 2006 (JP) .................................. 2006-291085

(51) Int. Cl.
*H04B 10/08* (2006.01)
*H04B 10/12* (2006.01)

(52) U.S. Cl. ............................. 398/13; 398/20; 398/28

(58) Field of Classification Search ................... 398/13, 398/28–29, 20–21

See application file for complete search history.

(56) References Cited

U.S. PATENT DOCUMENTS

| 5,069,544 A | 12/1991 | Buerli |
| 5,737,105 A * | 4/1998 | Ohta et al. ...................... 398/18 |
| 5,943,123 A | 8/1999 | Oshimi et al. |
| 6,310,702 B1 | 10/2001 | Minami et al. |
| 7,469,101 B1 * | 12/2008 | Eslambolchi et al. .......... 398/28 |
| 2002/0075534 A1 | 6/2002 | Feldman |
| 2009/0028553 A1 | 1/2009 | Oron |

FOREIGN PATENT DOCUMENTS

| JP | 2-140635 A | 5/1990 |
| JP | 499943 A | 3/1992 |
| JP | 04225131 A | 8/1992 |
| JP | 5-199191 A | 8/1993 |

(Continued)

OTHER PUBLICATIONS

"Journal of the Society of Instrument and Control Engineers", The Society of Instrument and Control Engineers, vol. 35, No. 1, Jan. 10, 1996, pp. 13-16.

(Continued)

*Primary Examiner* — Leslie Pascal
(74) *Attorney, Agent, or Firm* — Sughrue Mion, PLLC

(57) ABSTRACT

An optical line monitoring apparatus, including: a group information recording portion which records group information about to which splitter respective terminators are connected; a normal information recording portion which records intensities of reflected lights from a plurality of terminators in a state in which a failure is not occurring in optical lines; a monitored information recording portion which records intensities of reflected lights from the plurality of terminators in failure monitoring time; an attenuation amount determination portion which determines a terminator the reflected light intensity of which is attenuated compared with the corresponding reflected light intensity in normal information; and a control portion which determines, if the intensities of the reflected lights of all the terminators connected to the same splitter are attenuated by the same value, that a failure has occurred between the test apparatus and the splitter to which all the terminators are connected.

6 Claims, 30 Drawing Sheets

FOREIGN PATENT DOCUMENTS

| | | |
|---|---|---|
| JP | 5-199192 A | 8/1993 |
| JP | 5-322696 A | 12/1993 |
| JP | 662346 U | 9/1994 |
| JP | 07-063921 A | 3/1995 |
| JP | 07063921 A | 3/1995 |
| JP | 7174666 A | 7/1995 |
| JP | 7202805 A | 8/1995 |
| JP | 08201223 | 8/1996 |
| JP | 09-018411 A | 1/1997 |
| JP | 09018411 A | 1/1997 |
| JP | 09152386 | 6/1997 |
| JP | 09-247102 A | 9/1997 |
| JP | 09247102 A | 9/1997 |
| JP | 09294122 A | 11/1997 |
| JP | 10-135907 A | 5/1998 |
| JP | 10170394 | 6/1998 |
| JP | 10170396 | 6/1998 |
| JP | 11006785 A | 1/1999 |
| JP | 11-119027 A | 4/1999 |
| JP | 11-298409 A | 10/1999 |
| JP | 11-326124 A | 11/1999 |
| JP | 2000-019065 A | 1/2000 |
| JP | 2000019065 A | 1/2000 |
| JP | 2000321170 | 11/2000 |
| JP | 2000354008 | 12/2000 |
| JP | 2001-4487 A | 1/2001 |
| JP | 2001-021445 A | 1/2001 |
| JP | 2001-074598 A | 3/2001 |
| JP | 2001094512 | 4/2001 |
| JP | 2002-044037 A | 2/2002 |
| JP | 2002044037 A | 2/2002 |
| JP | 2002-71510 A | 3/2002 |
| JP | 2002118520 | 4/2002 |
| JP | 2003-207413 A | 7/2003 |
| JP | 2003207413 A | 7/2003 |
| JP | 2004163175 | 6/2004 |
| JP | 2007-33255 A | 2/2007 |
| JP | 2007-064931 A | 3/2007 |
| JP | 2007-071573 A | 3/2007 |
| JP | 2007064931 A | 3/2007 |
| JP | 2007071573 A | 3/2007 |
| JP | 2002-215202 A | 7/2012 |
| WO | 9804895 A | 2/1998 |

OTHER PUBLICATIONS

Japanese Office Action issued in corresponding Japanese Application No. 2007-026556 on Jul. 26, 2011.

Notice of Reasons for Rejection dated Oct. 5, 2011 from the Japanese Patent Office in counterpart Japanese application No. 2006026763.

Zhao Luhui, et al., "Application of Optical Time Domain Reflectometer in Communication Operation and Maintenance", Railway Signalling & Communication, vol. 40, No. 10, p. 26, (Oct. 31, 2004).

Notice of Allowance issued in Corresponding Japanese Application No. 2005-254928, dated Feb. 7, 2012.

Office Action issued in corresponding Chinese Application No. 201010184857.5, dated Feb. 3, 2012.

Notice of Reasons for Rejection dated May 8, 2012 issued by the Japanese Patent Office in counterpart Japanese Patent Application No. 2005-256304.

"SEI Technical Review", Sumitomo Electric Industries, Ltd., No. 155, Sep. 1999, pp. 15-21.

U.S. Notice of Allowance dated Apr. 2, 2012 issued in corresponding U.S. Appl. No. 13/218,681.

Notice of Reasons for Rejection dated Oct. 11, 2011 from the Japanese Patent Office in counterpart Japanese application No. 2006026763.

Notice of Reasons for Rejection dated Sep. 6, 2011 from the Japanese Patent Office in counterpart Japanese application No. 2005256304.

Notice of Allowance issued in U.S. Appl. No. 13/218,710 dated Jul. 18, 2012.

* cited by examiner

| GROUP NAME (SPLITTER NAME) | GROUP g1 (SPLITTER 3b) | GROUP g2 (SPLITTER 3c) | GROUP g3 (SPLITTER 3d) |
|---|---|---|---|
| TERMINATOR NAME | TERMINATOR · 4a | TERMINATOR · 4c | TERMINATOR · 4f |
| | TERMINATOR · 4b | TERMINATOR · 4d | — |
| | — | TERMINATOR · 4e | — |
| | — | — | — |

FIG. 15

| TERMINATOR NAME | OPTICAL LINE LENGTH (m) | REFLECTED LIGHT INTENSITY IN NORMAL TIME (dB) | REFLECTED LIGHT INTENSITY IN FAILURE MONITORING TIME (dB) |
|---|---|---|---|
| TERMINATOR 204a | 280 | 48.0 | 48.0 |
| TERMINATOR 204b | 290 | 46.5 | 46.5 |
| TERMINATOR 204c | 300 | 45.0 | 19.0 |
| TERMINATOR 204d | 310 | 45.0 | 45.0 |

FIG. 23

PEAK INFORMATION IN NORMAL TIME

| REFERENCE PRIORITY NUMBER | MEASUREMENT POINT NAME | DISTANCE [km] | INITIAL PEAK DISTANCE [km] | CORRECTION RANGE WIDTH [km] |
|---|---|---|---|---|
| 2 | ONU420-1 | 5.0000 | 5.0120 | 0.0100 |
| 1 | ONU420-2 | 5.5000 | 5.4980 | 0.0110 |
| 3 | ONU420-3 | 5.2500 | 5.2550 | 0.0105 |
| ... | ... | ... | ... | ... |

OPTICAL LINE MONITORING APPARATUS AND OPTICAL LINE MONITORING METHOD

CROSS-REFERENCE TO RELATED APPLICATION

This is a Continuation Application of International Application No. PCT/JP2007/051814, filed Feb. 2, 2007, which claims priority to Japanese Patent Application No. 2006-26763, filed on Feb. 3, 2006 and Japanese Patent Application No. 2006-291085, filed on Oct. 26, 2006 The contents of the aforementioned applications are incorporated herein by reference.

FIELD OF THE INVENTION

The present invention relates to an optical line monitoring apparatus and an optical line monitoring method which monitors a failure occurring in an optically branched line such as a PON (Passive Optical Network) transmission path which connects a test apparatus, a splitter, and a terminator, to an optical fiber line automatic monitoring system and an automatic optical fiber line monitoring method which can significantly reduce the time to restore a communication failure which has occurred in an optical fiber line, and to an optical transmission line monitoring apparatus, an optical transmission line monitoring method, and an optical transmission line monitoring program which detects an abnormality in an optical transmission line configured with a PON.

DESCRIPTION OF RELATED ART

Conventionally, there are known techniques which monitor the states of optical lines which are connected to terminators via a splitter connected to a test apparatus (Japanese Unexamined Patent Application, First Publication No. 2004-163175, and Japanese Patent No. 3580622).

In these techniques, an optical signal is emitted from a test apparatus to terminators via optical lines, and change in intensity of the reflected lights reflected from the terminators is measured to determine which terminator connected to which optical line has a failure.

However, in the techniques described in the above mentioned documents, if splitters are connected in a multistage manner in which an optical line is branched and a failure such as to attenuate a reflected light occurs in an optical line between a first stage splitter and a second stage splitter, then the intensities of the reflected lights from all the terminators connected to the optical line are influenced. Therefore, it was impossible to acquire information with regard to whether a failure occurred in an optical line between a first stage splitter and a second stage splitter or a failure occurred in an optical line between a second stage splitter and one of the terminators. That is, there has been a problem in that it is impossible to determine which optical line has failed.

Furthermore, in recent years, with enhanced high-speed and large capacity communication such as the widespread CATV (Cable Television) network and the broadbanded Internet optical fiber line networks using optical fiber cables are nationally coming into wide use. As a result, to maintain reliability of optical fiber lines, more importance is attached on a monitoring system therefor. Hereinafter is a description of an example of a current monitoring system for optical fiber lines.

In the case where a communication failure occurs in an optical fiber line network, an optical pulse test apparatus is connected to the optical fiber line with the failure from among the optical relay connection apparatuses in which thousands of optical fibers are gathered, to observe an OTDR (Optical Time Domain Reflector) waveform. Thereby, the location and details of the failure of the optical fiber in the optical fiber lines is searched (for example, see Japanese Unexamined Patent Application, First Publication No. 2000-321170, and Japanese Patent No. 3585680).

That is, the connection between the optical pulse test apparatus and the optical fiber line to be monitored is manually conducted. However, it takes about one or more minutes for one OTDR measurement. Therefore, for a speedy response to a failure, it is necessary to shorten the time from the start of the failure to the connection of the optical pulse test apparatus with the optical fiber line.

Furthermore, in conventional monitoring systems for an optical fiber line, an automatic fiber switching apparatus (a mechanical optical switch) is used to selectively establish connection between a directional coupler connected to an optical fiber line and a test terminal of an OTDR.

As an example, FIG. 30 shows an exemplary configuration of a conventional optical line monitoring system for monitoring an optical fiber line. In the optical line monitoring system shown in FIG. 30, a management server 1111 of a maintenance center 1110 is communicably connected to an optical line monitoring apparatus 1120 via a communications line 1100. The optical line monitoring apparatus 1120 is an apparatus for automatically performing a test on and a fault determination of optical fibers 1003 to be tested within an optical fiber line 1001. Within the optical line monitoring apparatus 1120, there is provided: a controller 1121 for controlling the entirety of the optical line monitoring apparatus 1120; an OTDR test apparatus (including a light source) 1122 for utilizing backscattering light to measure a loss of the optical fiber and to detect a failure and a location of failure; an optical switch (an optical SW) 1123 for switching fibers to be tested; and coupler filters 1124 for injecting a test optical pulse for an OTDR test. Therefore, by use of the optical line monitoring apparatus 1120 shown in FIG. 30, the time from the start of a failure in the optical fiber line 1001 to the tracking down of a failure location of the optical fiber 1003 is significantly reduced. However, it is desirable that the time from the start of a failure to the start of the optical pulse test be shortened.

On the other hand, the broadband uses a status monitoring apparatus (a network monitoring apparatus) for monitoring line conditions to always keep track of the communication status. Thus, in the event of a communication failure, the broadband has a function of outputting the fact as an automatic alarm. Furthermore, many of the CATV systems all over Japan have an HFC system which uses an optical fiber line as a main line and uses a coaxial cable in a part to the terminals of the users. In the CATV systems like this, an alarm signal is automatically produced from the status monitor in the event of a failure.

For example, as shown in an exemplary configuration of a CATV network of FIG. 31, a CATV network 1210 is made of an optical fiber line network 1006 and a coaxial network 1211. An image signal sent from a broadcast wave transmission apparatus is delivered to each home 1204 via a head end 1203, and through optical fiber lines 1001 and optical signal transmission apparatuses 1004 such as relay amplifiers in the optical fiber line network 1006, and through the coaxial network 1211. Furthermore, some (or all) of the optical signal transmission apparatuses 1004 are provided with a monitoring unit 5. The monitoring unit 1005, for example, measures a received signal level and an operation status in the optical signal transmission apparatus 1004, and transmits them as equipment monitoring information to the status monitoring apparatus 1202. The status monitoring apparatus 1202 displays the operation status in the optical signal transmission apparatus 1004 on a monitor screen of a display portion (not shown in the figure) and also makes a fault determination whether an abnormality has occurred or not in an optical fiber line 1001. In the event of a failure in an optical fiber line 1001, an alarm signal is automatically produced from the status monitoring apparatus 1202.

As described above, in conventional techniques, the optical line monitoring apparatus which uses an OTDR for monitoring an optical fiber line and the status monitoring apparatus which is used for monitoring a CATV network or the like are systems independent of each other.

The status monitoring apparatus is capable of monitoring whether a communication failure has occurred in an optical fiber line between the CATV center station and the monitoring unit, but is not capable of determining whether the failure is due to an optical signal transmission apparatus (for example, a relay amplifier, an optical signal transmission relay apparatus, a power source apparatus, or the like) from whether it is due to an optical fiber line. On the other hand, the optical line monitoring system is capable of finding a failure which has occurred in optical lines. However, it has a problem of taking more time than a given period of time to conduct a measurement.

Furthermore, as a method of monitoring a branched line using a splitter and terminators, a method is conventionally known for verifying a change in reflected light intensity of the terminators to verify an abnormality of optical lines (Japanese Unexamined Patent Application, First Publication No. H10-170396). In this method, if a measurement is made with a broadened pulse width, there is a case where the reflected lights overlap each other when an interval of the reflected lights of the terminators is short. In this case, even if there is a change in reflected light from one terminator, it is not possible to verify the change in reflected light intensity due to a reflected light from the other terminator.

Therefore, for a pulse width, a short value of approximately 20 ns is used to prevent the overlap of the reflected lights as much as possible.

Furthermore, there is a case where it is intended not only to verify in which terminator an abnormality has occurred, but also to verify at what distance between the splitter and the terminator the abnormality has occurred. As a general method of detecting an abnormality of optical lines, there is known a method of analyzing a difference in measurement results between in normal time and in failure monitoring time to identify a location where the failure has occurred. This method can also be used for a failure detection between a splitter and a terminator.

When a distance between terminators is short, that is, when there is no difference in distance between the respective terminators and a test apparatus, it is necessary to make a measurement with a shortened pulse width in order to prevent an overlap of the reflected lights. At this time, there is a problem in that a large loss of optical lines causes a reduction in dynamic range, thus generating noise. Especially in a branched line using a splitter, a great loss occurs in the splitter. With a waveform with much noise, it is difficult to identify the location of a failure even if a difference in measurement results between normal time and failure monitoring time is verified. Furthermore, when an automatic determination of a failure location is performed with a software program or the like, there is a very high probability of erroneous determination. If a pulse width is broadened to suppress generation of noise, there arises a problem in that the reflected lights of the terminators overlap each other.

That is, if an FBG (Fiber Bragg Grating) filter is used in a terminator, it is possible to stably detect a reflection peak with a high S/N ratio (Signal to Noise Ratio) even if the time for the averaging processing is set to be short, because the filter has a high reflection level. However, there are cases where a reflection from a portion other than the filter reflection, for example a reflection from a failure occurrence point such as a point of rupture, is buried in noise, resulting in difficulty in its determination.

However, in order to make a measurement with an S/N ratio high enough to allow an easy determination of a point of rupture or the like, it requires for example about 90 seconds to carry out one measurement. As a result, it takes a very long time to measure all the 100 routes. Furthermore, the problem has existed that it takes a very long time to track down the target abnormal route because the time per one measurement is long, making it impossible to address emergencies.

Furthermore, there is known a PON-type transmission line (hereinafter described as a PON transmission line) that one optical fiber cable (hereinafter described as optical fiber) connected to a communication apparatus provided in a communication station is branched by a splitter, and the terminators provided in a plurality of user homes are covered by the branched optical fiber.

Conventionally in the PON transmission line, in the case where an abnormality occurs, for example OTDR (Optical Time Domain Reflectometer) or the like is used to launch an optical pulse in the longitudinal direction of an optical fiber of a transmission line, that is, in the direction of a terminator, and the Rayleigh scattering generated by the launched pulse or the returning light based on the reflection from the device is measured. A comparison is then made between the measured information and information which has been measured in normal time, to thereby detect the presence or absence of a failure.

For example, Japanese Unexamined Patent Application, First Publication No. 2000-354008, and Japanese Unexamined Patent Application, First Publication No. H08-201223 propose a technique which provides filters having different reflecting properties at terminal points of optical fibers by an FBG (Fiber Bragg Grating) to identify the location of failure by means of a multiwavelength monitoring light source. Furthermore, Japanese Patent No, 3588657 proposes a technique which uses a wavelength router for outputting to output ports of an output target according to ports and wavelengths to be input, and provides filters having different reflecting properties at terminal points of optical fibers in a manner similar to Japanese Unexamined Patent Application, First Publication No. 2000-354008, and Japanese Unexamined Patent Application, First Publication No. H08-201223, to thereby identify a location of failure in a transmission line.

In an optical fiber, as a portion of the optical fiber is closer to its terminal point, the optical fiber extends/contracts more due to aging of the optical fiber or to a temperature change. Therefore, there are cases where a position at which a waveform peak formed from a returning light which is measured by the OTDR is shifted.

However, none of the techniques of Japanese Unexamined Patent Application, First Publication No. 2000-354008, Japanese Unexamined Patent Application, First Publication No. H08-201223, and Japanese Patent No. 3588657 takes into consideration the occurrence of extension/contraction of an optical fiber as described above. Therefore, there is a problem that when a measurement is made on an optical fiber which is extended/contracted by the OTDR based only on a position at which a peak of a normal waveform previously measured occurs, a peak of the waveform does not occur at the position, and hence it is erroneously detected as an abnormality.

SUMMARY

The present invention has been achieved in view of the above circumstances, and its object is to provide an optical line monitoring apparatus and method capable of identifying an optical line where a failure has occurred even if splitters and terminators are connected to a test apparatus in a multistage manner by means of optical lines.

Another object of the present invention is to provide an optical fiber line automatic monitoring system and automatic monitoring method capable of speedily identifying a location of failure in an optical fiber in an optical fiber line by acquiring failure occurrence information with regard to an optical line to make a test on the optical fiber line.

Still another object of the present invention is to provide an optical line monitoring apparatus and method capable of reliably detecting a failure of respective terminators and also capable of precisely finding a distance to a position where the failure has occurred without being affected by noise. Furthermore, an object of the present invention is to provide an optical line monitoring apparatus and method capable of identifying a location of a failure point precisely and in a short time.

Yet still another object of the present invention is to provide an optical transmission line monitoring apparatus, an optical transmission line monitoring method, and an optical transmission line monitoring program which make it possible to precisely detect an abnormality of an optical transmission line even when an optical fiber is extended/contracted.

The present invention provides an optical line monitoring apparatus which monitors a failure of optical lines which are branched from a test apparatus by a splitter and connected to a plurality of terminators, including: a group information recording device which records group information about to which splitter the respective terminators are connected; a normal information recording device which records intensities of reflected lights from the plurality of terminators in response to an optical signal emitted from the test apparatus in a state in which a failure is not occurring in the optical lines; a monitored information recording device which records intensities of reflected lights from the plurality of terminators in response to an optical signal emitted from the test apparatus when a failure of the optical lines is monitored; an attenuation amount determination device which determines in which terminator among the plurality of terminators recorded in the group information of the group information recording device, the reflected light intensity recorded in the monitored information recording device is attenuated compared with the corresponding reflected light intensity which is recorded in the normal information recording device; and a first control device which identifies all the terminators connected to the same splitter based on the group information recorded by the group information recording device, and which determines that a failure has occurred between the test apparatus and the splitter to which all the terminators are connected if the attenuation amount determination device determines that the intensities of the reflected lights of all the terminators are attenuated by the same value.

The above optical line monitoring apparatus may further include a second control device which determines, if the attenuation amount determination device determines that only a reflected light intensity of any one of the terminators is attenuated, that a failure has occurred between the terminator and the splitter to which the terminator is connected.

Furthermore, the present invention provides an optical line monitoring method which monitors a failure of optical lines which are branched from a test apparatus by a splitter and connected to a plurality of terminators, including: a first step which records group information about to which splitter the respective terminators are connected; a second step which records intensities of reflected lights from the plurality of terminators in response to an optical signal emitted from the test apparatus in a state in which a failure is not occurring in the optical lines; a third step which records intensities of reflected lights from the plurality of terminators in response to an optical signal emitted from the test apparatus when a failure of the optical lines is monitored; a fourth step which determines in which terminator among the plurality of terminators recorded in the first step, the reflected light intensity recorded in the third step is attenuated compared with the corresponding reflected light intensity which is recorded in the second step; and a fifth step which identifies all the terminators connected to the same splitter based on the group information recorded in the first step, and determines that a failure has occurred between the test apparatus and the splitter to which all the terminators are connected if the fourth step determines that the intensities of the reflected lights of all the terminators are attenuated by the same value.

The above optical line monitoring method may further include a sixth step which determines, if the fourth step determines that only a reflected light intensity of any one of the terminators is attenuated, that a failure has occurred between the terminator and the splitter to which the terminator is connected.

Furthermore, the present invention provides an optical line monitoring method which monitors a failure of optical lines which are branched from a test apparatus by a splitter and connected to a plurality of terminators, in which at least one splitter is inserted between the test apparatus and the terminators, and it is determined in which of an upper stream side or lower stream side of the splitter connected to the plurality of terminators a failure has occurred, based on group information about to which splitter the respective terminators are connected, on intensities of reflected lights from the plurality of terminators in response to an optical signal emitted from the test apparatus in a state in which a failure is not occurring in the optical lines, and on intensities of reflected lights from the plurality of terminators in response to an optical signal emitted from the test apparatus when a failure of the optical lines is monitored.

Furthermore, the present invention provides an optical fiber line automatic monitoring system which selects an optical fiber within an optical fiber line and observes an OTDR waveform by injecting a test optical pulse into the selected optical fiber, to thereby determine a failure location, including: an alarm signal reception portion which receives information with regard to an optical fiber with a failure as an alarm signal from a network monitoring apparatus which detects a communication error; a test target optical fiber selection portion which identifies, based on failure occurrence information included in the alarm signal received by the alarm signal reception portion, the optical fiber with a failure, and selects a test target optical fiber; an optical fiber test portion which injects a test optical pulse into the optical fiber selected by the test target optical fiber selection portion to observe an OTDR waveform; and an optical fiber failure location determination portion which determines a location of failure in the optical fiber based on a test result by the optical fiber test portion.

With such a configuration, the optical fiber line automatic monitoring system receives failure occurrence information with regard to an optical fiber (a coated optical fiber) of an optical fiber line as an alarm signal from the network monitoring apparatus. It then selects an optical fiber to be tested, based on the failure occurrence information included in the alarm signal (for example, it uses an optical switch). It then runs an OTDR test on the test target optical fiber to identify the location of failure in the optical fiber.

As a result, the optical fiber line automatic monitoring system side is allowed to use information with regard to the abnormal optical fiber detected by the network monitoring apparatus side, enabling speedy identification of the location of failure in the optical fiber with a failure.

In the above-mentioned optical fiber line automatic monitoring system, the network monitoring apparatus may include: a monitoring unit signal reception portion which receives equipment monitoring information with regard to the optical signal transmission apparatus from a monitoring unit provided in a predetermined optical signal transmission apparatus in an optical fiber line network, which monitors equipment operational states in the optical signal transmission apparatus; and an alarm signal transmission portion which transmits, as an alarm signal, information with regard to a communication network determined as abnormal based on the equipment monitoring information received by the monitoring unit signal reception portion to the optical fiber line automatic monitoring apparatus.

With such a configuration, a monitoring unit is provided in an optical signal transmission apparatus (for example, a relay amplifier of a CATV network, a router of a TCP/IP network, or the like), and a signal reception level and operational states in the optical signal transmission apparatus are monitored. The network monitoring apparatus receives equipment monitoring information from the monitoring unit, determines an optical fiber with a failure based on the equipment monitoring information, and transmits an alarm signal including failure occurrence information with regard to the optical fiber to the optical fiber line automatic monitoring system.

As a result, the optical fiber line automatic monitoring system side is allowed to use information with regard to the abnormal optical fiber detected by the network monitoring apparatus side, enabling speedy identification of the location of failure in the optical fiber with a failure.

Furthermore, the present invention provides an optical fiber line automatic monitoring system which selects an optical fiber within an optical fiber line and observes an OTDR waveform by injecting a test optical pulse into the selected optical fiber, to thereby determine a failure location, including: a monitoring unit signal reception portion which is provided in a predetermined optical signal transmission apparatus in an optical fiber line network which receives equipment monitoring information with regard to the optical signal transmission apparatus from a monitoring unit which monitors equipment operational states in the optical signal transmission apparatus; an optical fiber abnormality determination portion which determines an optical fiber with a failure based on the equipment monitoring information received by the monitoring unit signal reception portion; a test target optical fiber selection portion which selects the optical fiber determined as abnormal by the optical fiber abnormality determination portion, as a test target optical fiber; an optical fiber test portion which injects a test optical pulse into the optical fiber selected by the test target optical fiber selection portion to observe an OTDR waveform; and an optical fiber failure location determination portion which determines a location of failure based on a test result by the optical fiber test portion.

With such a configuration, a signal reception level and equipment operational states in the optical signal transmission apparatus are monitored by a monitoring unit provided in an optical signal transmission apparatus (for example, a relay amplifier of a CATV network, a router of a TCP/IP network, or the like) of an optical fiber line, and the equipment monitoring information from this monitoring unit is received by the optical fiber line automatic monitoring system. The optical fiber line automatic monitoring system determines the failed optical fiber based on the equipment monitoring information received from the monitoring unit to select an optical fiber to be tested (for example, it uses an optical switch). It then runs an OTDR test on the test target optical fiber to identity the location of failure in the optical fiber.

As a result, the optical fiber line automatic monitoring system itself can take in equipment monitoring information with regard to a monitoring unit, allowing the optical fiber line automatic monitoring system to implement the function of a network monitoring apparatus. This enables speedy identification of the location of failure in the optical fiber with a failure.

The above-mentioned optical fiber line automatic monitoring system may include a test result display portion which displays a result of the optical fiber test on a monitor screen. As a result, in the case where a failure has occurred in an optical fiber, taking a look at the monitor screen allows easy grasp of a failure occurrence situation.

Furthermore, the above-mentioned optical fiber line automatic monitoring system may include an abnormality occurrence location display portion which determines a failure location from the result of the optical fiber test to display the abnormal site on a map of a monitor screen of a display portion. As a result, in the case where a failure has occurred in an optical fiber, taking a look at the monitor screen allows easy grasp of a failure occurrence situation and a location of failure.

Furthermore, the present invention provides an optical fiber line automatic monitoring method in an optical fiber line automatic monitoring system which selects an optical fiber within an optical fiber line and observes an OTDR waveform by injecting a test optical pulse into the selected optical fiber, to thereby determine a failure location, in which a control portion in the optical fiber line automatic monitoring system performs: an alarm signal reception procedure which receives information with regard to an optical fiber with a failure as an alarm signal from a network monitoring apparatus which detects a failure occurrence of an optical fiber in an optical fiber line; a test target optical fiber selection procedure which identifies an optical fiber with an abnormality based on failure occurrence information included in the alarm signal received in the alarm signal reception procedure, to select an optical fiber to be tested; an optical fiber test procedure which injects a test optical pulse into the optical fiber selected in the test target optical fiber selection procedure to observe an OTDR waveform; and an optical fiber failure location determination procedure which determines a location of failure in the optical fiber based on a test result in the optical fiber test procedure.

With such procedures, the optical fiber line automatic monitoring system receives failure occurrence information with regard to an optical fiber (a coated optical fiber) of an optical fiber line as an alarm signal from the network monitoring apparatus. It then selects an optical fiber to be tested, based on the failure occurrence information included in the alarm signal (for example, it uses an optical switch). It then runs an OTDR test on the test target optical fiber to identify the location of failure in the optical fiber.

As a result, the optical fiber line automatic monitoring system side is allowed to use information with regard to the abnormal optical fiber detected by the network monitoring apparatus side, enabling speedy identification of the location of failure in the optical fiber with a failure.

Furthermore, the present invention provides an optical line monitoring apparatus which monitors a failure of optical lines which are branched from a test apparatus by a splitter and connected to a plurality of terminators, including: a first storage device which stores intensities of reflected lights from the plurality of terminators in response to an optical signal emitted from the test apparatus in a state in which a failure is not occurring the optical lines; a first control device which emits an optical signal, to which a first averaging time and/or a first pulse width are applied, from the test apparatus; a second storage device which stores intensities of reflected lights from the plurality of terminators in response to the optical signal emitted by the first control device; an attenuation amount determination device which determines whether or not, of the reflected light intensities of the plurality of terminators stored in the second storage device, there is a terminator with a reflected light intensity attenuated compared with the corresponding reflected light intensity which is stored in the first storage device; and a second control device which emits an optical signal, to which a second averaging time and/or a second pulse width are applied, from the test apparatus, if the attenuation amount determination device determines that there is a terminator with an attenuated reflected light intensity.

In the above-mentioned optical line monitoring apparatus, the second averaging time may be set to be longer than the first averaging time, and the second pulse width may be set to be wider than the first pulse width.

Furthermore, the above-mentioned optical line monitoring apparatus may further include: a third control device which determines whether or not an abnormality in reflection and/or loss is present in a waveform of returning light in response to the optical signal emitted by the second control device; and a fourth control device which calculates a distance from the test apparatus to a point where the abnormality has occurred if the third control device determines that an abnormality in reflection and/or loss is present.

Furthermore, the above-mentioned optical line monitoring apparatus may further include a display device which displays what failure has occurred at a point away from the test apparatus by the distance calculated by the fourth control device, the point being on an optical line connecting between the test apparatus and a terminator the reflected light intensity of which is determined as attenuated by the attenuation amount determination device.

Furthermore, the present invention provides an optical line monitoring method which monitors a failure of optical lines which are branched from a test apparatus by a splitter and connected to a plurality of terminators, including: a first step which stores intensities of reflected lights from the plurality of terminators in response to an optical signal emitted from the test apparatus in a state in which a failure is not occurring in the optical lines; a second step which emits an optical signal, to which a first averaging time and/or a first pulse width are applied, from the test apparatus; a third step which stores intensities of reflected lights from the plurality of terminators in response to the optical signal emitted in the second step; a fourth step which determines whether, of the reflected light intensities of the plurality of terminators stored in the third step, there is a terminator with a reflected light intensity attenuated compared with the intensity reflected light intensity which is stored in the first step or not; and a fifth step which emits an optical signal, to which a second averaging time and/or a second pulse width are applied, from the test apparatus, if the fourth step determines that there is a terminator with an attenuated reflected light intensity.

Furthermore, the present invention provides an optical transmission line monitoring apparatus that takes any of plural pieces of measured information including a light intensity value associated with an optical transmission line obtained by analyzing a returning light which is measured by launching an optical pulse in a longitudinal direction of an optical fiber constituting the optical transmission line as measured information in normal time, and detects an abnormality of the optical transmission line based on the measured information in normal time and on information measured when an extension/contraction of the optical fiber as a monitoring target is unknown, including: a first detection device which detects a first waveform portion which includes at least one waveform peak from a waveform formed from the distance and the light intensity value included in the measured information in normal time; a second detection device which detects a second waveform portion corresponding to the first waveform portion in a waveform in the measured information with regard to the monitoring target, within a previously determined correction range including the peak of the first waveform portion; and an abnormality detection device which detects an abnormality in the waveform in the measured information with regard to the monitoring target independently of the extension/contraction of the optical fiber, based on the first waveform portion detected by the first detection device and the second waveform portion detected by the second detection device.

Furthermore, the present invention provides an optical transmission line monitoring apparatus that takes any of plural pieces of measured information including a light intensity value associated with a distance of an optical transmission line obtained by analyzing a returning light which is measured by launching an optical pulse in a longitudinal direction of an optical fiber constituting the optical transmission line as measured information in normal time, and detects an abnormality of the optical transmission line based on the measured information in normal time and on information measured when an extension/contraction of the optical fiber as a monitoring target is unknown, including: a first detection device which detects a first waveform portion which includes at least one waveform peak from a waveform formed from the distance and the light intensity value included in the measured information in normal time; a measured information storage device which stores at least one of first waveform portions detected by the first detection device as a reference waveform; a second detection device which detects a second waveform portion corresponding to the reference waveform in a waveform in the measured information with regard to the monitoring target, within a previously determined correction range including the peak of the first waveform portion; and an abnormality detection device which detects an abnormality in the waveform in the measured information with regard to the monitoring target independently of the extension/contraction of the optical fiber, based on the reference waveform and the second waveform portion detected by the second detection device.

In the above-mentioned optical transmission line monitoring apparatus, the first detection device may detect a distance value at a peak of the first waveform portion as information which identifies the first waveform portion, the second detection device may detect a distance value at a peak of the second waveform portion within the correction range in the measured information with regard to the monitoring target, and the abnormality detection device may include: a shift amount calculation device which calculates a shift amount to correct a displacement in the distance value of the second waveform portion from the first waveform portion, based on the distance value at the peak of the first waveform portion and the distance value at the peak of the second waveform portion; a correction device which corrects the distance value at the peak of the second waveform portion with a shift amount calculated by the shift amount calculation device; a first determination device which determines whether the second waveform portion has an abnormality or not by comparing the second waveform portion corrected by the correction device with the first waveform portion; and a first output device which outputs a result as having an abnormality if the first determination device determines that the second waveform portion has an abnormality.

The above-mentioned optical transmission line monitoring apparatus may include a correction range calculation portion which calculates, as the correction range, a shift amount predicted value for the distance value of the second waveform portion from the distance value of the first waveform portion due to an extension/contraction of the optical fiber, the second waveform portion corresponding to the first waveform portion in a waveform in the measured information with regard to the monitoring target.

The above-mentioned optical transmission line monitoring apparatus may include a storage device which stores the correction range which is previously set by a user as a shift amount predicted value for the distance value of the second waveform portion from the distance value of the first waveform due to an extension/contraction of the optical fiber, the second waveform portion corresponding to the first waveform portion in a waveform in the measured information with regard to the monitoring target.

In the above-mentioned optical transmission line monitoring apparatus, the second detection device may detect, if a plurality of the second waveform portions, which correspond to the first waveform portion detected by the first detection device, are detected in the waveform in the measured information with regard to the monitoring target, a waveform portion with a peak most similar to that of the first waveform as a second waveform portion.

The above-mentioned optical transmission line monitoring apparatus may further include a shift amount calculation device which calculates a shift amount to correct a displacement in the distance value of the second waveform portion from the first waveform portion, based on a distance value at a peak of the first waveform portion and a distance value at a peak of the second waveform portion, in which the measured information storage device takes the plurality of first waveform portions detected by the first detection device as reference waveforms, and stores the reference waveforms after assigning reference priority numbers indicating a priority order to the reference waveforms, and the shift amount calculation portion takes, if a waveform portion corresponding to the reference waveform with a reference priority number N (N is an integer from 1) is not present within the correction range when calculating the shift amount, a waveform portion corresponding to the reference waveform with a reference priority number N+1 as the second waveform portion, and calculates a shift amount for correcting the displacement in the distance value based the second waveform portion.

Furthermore, the present invention provides an optical transmission line monitoring method which takes any of plural pieces of measured information including a light intensity value associated with a distance of an optical transmission line obtained by analyzing a returning light which is measured by launching an optical pulse in a longitudinal direction of an optical fiber constituting the optical transmission line as measured information in normal time, and detects an abnormality of the optical transmission line based on the measured information in normal time and on information measured when an extension/contraction of the optical fiber as a monitoring target is unknown, including the steps of: detecting a first waveform portion which includes at least one waveform peak from a waveform formed from the distance and the light intensity value included in the measured information in normal time; detecting a second waveform portion corresponding to the first waveform portion in a waveform in the measured information as the monitoring target, within a previously determined correction range including the peak of the first waveform portion; and detecting an abnormality in the waveform in the measured information with regard to the monitoring target independently of the extension/contraction of the optical fiber, based on the first waveform portion detected by the first detection device and the second waveform portion detected by the second detection device.

Furthermore, the present invention provides a monitoring program to allow an optical transmission line monitoring apparatus that takes any of plural pieces of measured information including a light intensity value associated with a distance of an optical transmission line obtained by analyzing a returning light which is measured by launching an optical pulse in a longitudinal direction of an optical fiber constituting the optical transmission line as measured information in normal time, and detects an abnormality of the optical transmission line based on the measured information in normal time and on information measured when an extension/contraction of the optical fiber as a monitoring target is unknown, to execute the steps of: detecting a first waveform portion which includes at least one a waveform peak from a waveform formed from the distance and the light intensity value included in the measured information in normal time; detecting a second waveform portion corresponding to the first waveform portion in a waveform in the measured information with regard to the monitoring target, within a previously determined correction range including the peak of the first waveform portion; and detecting an abnormality in the waveform in the measured information with regard to the monitoring target independently of the extension/contraction of the optical fiber, based on the first waveform portion detected by the first detection device and the second waveform portion detected by the second detection device.

In the present invention, group information is previously recorded in a group information storage device, and also intensities of reflected lights from terminators when optical lines are normal are previously recorded.

In the case where the intensities of reflected lights obtained from all the terminators recorded in the group information are attenuated by the same value in failure monitoring time, it is determined that a failure has occurred between the test apparatus and the splitter connected to those terminators.

As a result, in the case where a failure has occurred in the optical lines, an administrator or others can roughly identify the location of failure, that is, can isolate the location of failure. This eliminates the necessity for minutely checking the condition of all the optical lines connected to the test apparatus, the splitters, and the terminators to identify the optical line with a failure. Therefore, efforts of the administrator or others required to monitor the optical lines can be greatly reduced.

In the present invention, the optical fiber line automatic monitoring system receives failure occurrence information with regard to an optical fiber detected by the network monitoring apparatus side, and automatically runs a test on the optical fiber with a failure. Therefore, a location of failure in an optical fiber can be speedily identified.

Furthermore, the optical fiber line automatic monitoring system itself takes in failure occurrence information from an optical signal transmission apparatus (for example, a relay amplifier of a CATV network, a router of a TCP/IP network, or the like), to thereby allow the optical fiber line automatic monitoring system to implement a function of a network monitoring apparatus.

In the present invention, the optical fiber line automatic monitoring system receives failure occurrence information with regard to an optical fiber detected by the network monitoring apparatus side, and automatically runs a test on the optical fiber with a failure. Therefore, a location of failure in an optical fiber can be speedily identified.

Furthermore, the optical fiber line automatic monitoring system itself takes in failure occurrence information from an optical signal transmission apparatus (for example, a relay amplifier of a CATV network, a router of a TCP/IP network, or the like), to thereby allow the optical fiber line automatic monitoring system to implement a function of a network monitoring apparatus.

In the present invention, a first storage device stores intensities of reflected lights from a plurality of terminators in response to an optical signal emitted from a test apparatus in a state in which a failure is not occurring in optical lines; a first control device emits an optical signal to which a first averaging time and/or a first pulse width are applied, from the test apparatus; a second storage device stores intensities of reflected lights from the plurality of terminators in response to the optical signal emitted by the first control device; an attenuation amount determination device determines whether or not, of the reflected light intensities of the plurality of terminators stored in the second storage device, there is a terminator with a reflected light intensity attenuated compared with the corresponding reflected light intensity which is stored in the first storage device; and a second control device emits an optical signal to which a second averaging time and/or a second pulse width are applied, from the test apparatus, if the attenuation amount determination device determines that there is a terminator with an attenuated reflected light intensity.

As a result, by making a measurement width the second averaging time set to be longer than the first averaging time, and also with the second pulse width set to be wider than the first pulse width, a determination can be made between terminators with close reflected lights in a measurement using the first averaging time and/or the first pulse width. Alternatively, a determination between terminators with close reflected lights in a short averaging time. Furthermore, in a measurement using a second averaging time and/or a second pulse width, at intensity of reflected light from a terminator and a failure occurrence point can be measured unaffected by noise. Therefore, a failure occurrence point on optical lines can be identified with high accuracy.

According to the present invention, the optical transmission line monitoring apparatus detects a first waveform portion which is a waveform portion where all the light intensities of continued pieces of waveforms in a waveform formed from a distance and light intensity values included in the measured information in normal time have a value greater than or equal to a predetermined threshold value for waveform portion identification, and which includes at least one waveform peak. It is configured such that within a correction range indicating a range including a second waveform portion corresponding to the first waveform portion and the relevant first waveform portion, the second waveform portion corresponding to the first waveform portion is detected in the waveform in the measured information with regard to the monitoring target, and that an abnormality is detected independently of an extension/contraction of the optical fiber, based on the first waveform portion and the second waveform portion. As a result in the case where a waveform portion disappears because of a displacement of a waveform position due to lowering of a reflection level or to a break in a fiber or the like, it is possible to prevent an erroneous detection of a waveform without correspondence to the first waveform portion as a second waveform corresponding to the first waveform portion after a long search of wrong waveform portions.

Furthermore, in consideration of properties of an optical transmission line, when calculating a displacement amount of the second waveform portion from the first waveform portion, the shift amounts from any one of the first waveform portions are handled, to thereby make it possible to reduce the cost of a calculation amount much more than in the case of calculating the shift amount of all the waveform portions. Furthermore, a plurality of first waveform portions are taken as the reference waveforms. Thereby, even if a third waveform portion corresponding to one first wave portion fails to be detected as a result of a construction work, a break in a fiber, or the like, it is possible to automatically calculate a shift amount from another reference waveform. Therefore, in the case where there is an abnormality in one waveform, it is possible to prevent a situation in which another normal waveform is detected as abnormal.

As described above, even if there is a displacement on a distance axis between a waveform formed from the measured information in normal time and a waveform formed from the measured information with regard to the monitoring target due to an extension/contraction of an optical fiber, the waveforms are the same. Therefore, a detection is made based on a corresponding waveform. Consequently, it is possible to make a precise detection in consideration of a displacement due to the extension/contraction of the optical fiber, and also to prevent an erroneous detection due to the extension/contraction of the optical fiber.

BRIEF DESCRIPTION OF THE DRAWINGS

FIG. 15 shows one example of information stored in a storage portion according to the fourth embodiment.

FIG. 23 shows one example of peak information in normal time stored in measured information in the seventh embodiment.

DESCRIPTION OF EMBODIMENTS

Hereinafter is a description of a first embodiment of the present invention, with reference to the drawings.

Figure 1:
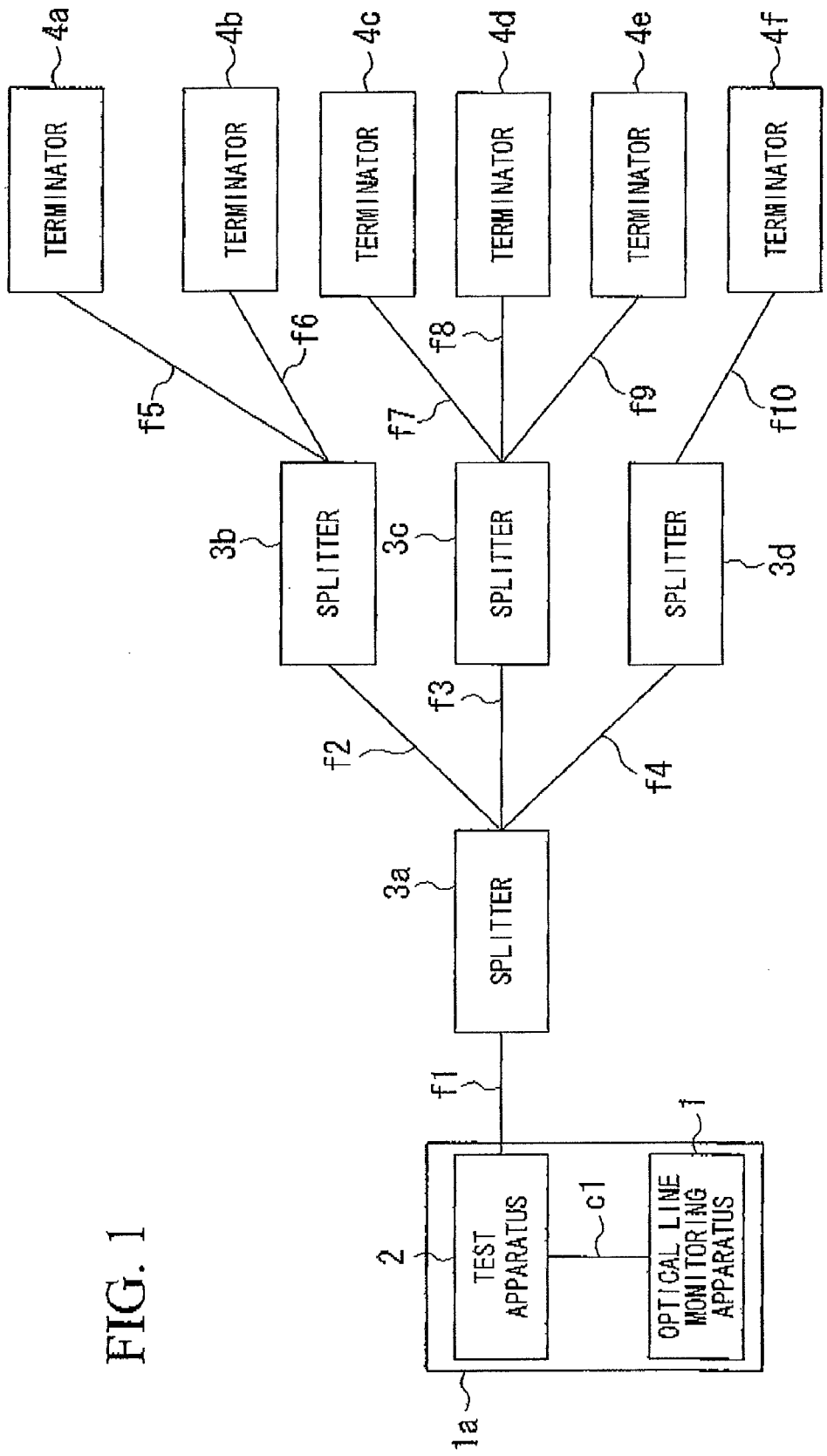
FIG. 1 is a schematic block diagram of an optical line monitoring system according to a first embodiment of the present invention.

FIG. 1 is a schematic block diagram of an optical line monitoring system according to the first embodiment of the present invention. This optical line monitoring system includes: an optical line monitoring apparatus 1; a test apparatus 2; splitters 3 (3a, 3b, 3c, 3d); and terminators 4 (4a, 4b, 4c, 4d, 4e, 4f). In the first embodiment, the case where an OTDR (Optical Time Domain Reflectometer) is used as the test apparatus 2, and ONUs (Optical Network Units) are used as the terminators 4 is described.

The optical line monitoring apparatus 1 and the test apparatus 2 are connected via a cable c1 with a standard such as the RS232-C (Recommended Standard 232 version C), and is contained in one enclosure 1a. Furthermore, the test apparatus 2 and the splitter 3a are connected with an optical line f1. The splitter 3a and the splitters 3b, 3c, 3d are connected respectively with optical lines f2, f3, f4. The splitter 3b and the terminators 4a, 4b are connected respectively with optical lines f5, f6. The splitter 3c and the terminators 4c, 4d, 4e are connected respectively with optical lines f7, f8, f9. The splitter 3d and the terminator 4f are connected with an optical line f10. Each of the optical lines f1 to f10 is made of one optical fiber or the like.

The optical line monitoring apparatus 1 controls the test apparatus 2 and acquires information with regard to waveforms measured by the test apparatus 2, or the like, via the cable c1. The test apparatus 2 emits an optical signal to the splitter 3a and receives an optical signal emitted by the splitter 3a via the optical line f1 based on the control by the optical line monitoring apparatus 1.

When receiving an optical signal from the test apparatus 2 or another splitter 3 which is connected on the upstream side, the splitter 3 branches the optical signal equally in terms of power, and emits the branched optical signals to other splitters 3 or terminators 4 which are connected on the downstream side. Furthermore, when receiving optical signals from other splitters 3 or terminators 4 which are connected on the downstream side, the splitter 3 multiplexes those optical signals and emits the multiplexed optical signal to the test apparatus 2 or another splitter 3 which is connected on the upstream side. As a splitter 3, for example a PLC (Planar Lightwave Circuit) type splitter can be used in which optical waveguides are branched in a tree-like manner on a silica substrate.

Here, an upstream side designates a direction in which the test apparatus 2 corresponding to the root of the optical lines laid in a tree-like manner from the test apparatus 2 to the respective terminators 4 is connected. A downstream side designates a direction in which a terminator 4 corresponding to a leaf of the optical lines laid in a tree-like manner from the test apparatus 2 to the respective terminators 4 is connected.

When receiving an optical signal from the splitter 3, the terminator 4 reflects a specific wavelength of the optical signal to the splitter 3. As a terminator 4, for example an optical connector containing a fiber grating filter which reflects an optical signal at a specific wavelength can be used.

In the first embodiment, the case where the splitters 3b to 3d are connected to the splitter 3a is described. However, the number of the splitters 3 connected to the splitter 3a is optional, as long as it is less than or equal to the number of the branches of the splitter 3. Furthermore, in the first embodiment, the case is described where the terminators 4a, 4b are connected to the splitter 3b, the terminators 4c to 4e are connected to the splitter 3c, and terminator 4f is connected to the splitter 3d. However) the number of the splitters 3 connected to the respective splitters 3b to 3d is optional. Furthermore, the first embodiment has a two-stage configuration of the splitter 3a (first stage) and the splitters 3b to 3d (second stage). However, the number of the stages is optional.

Figures 2, 3:
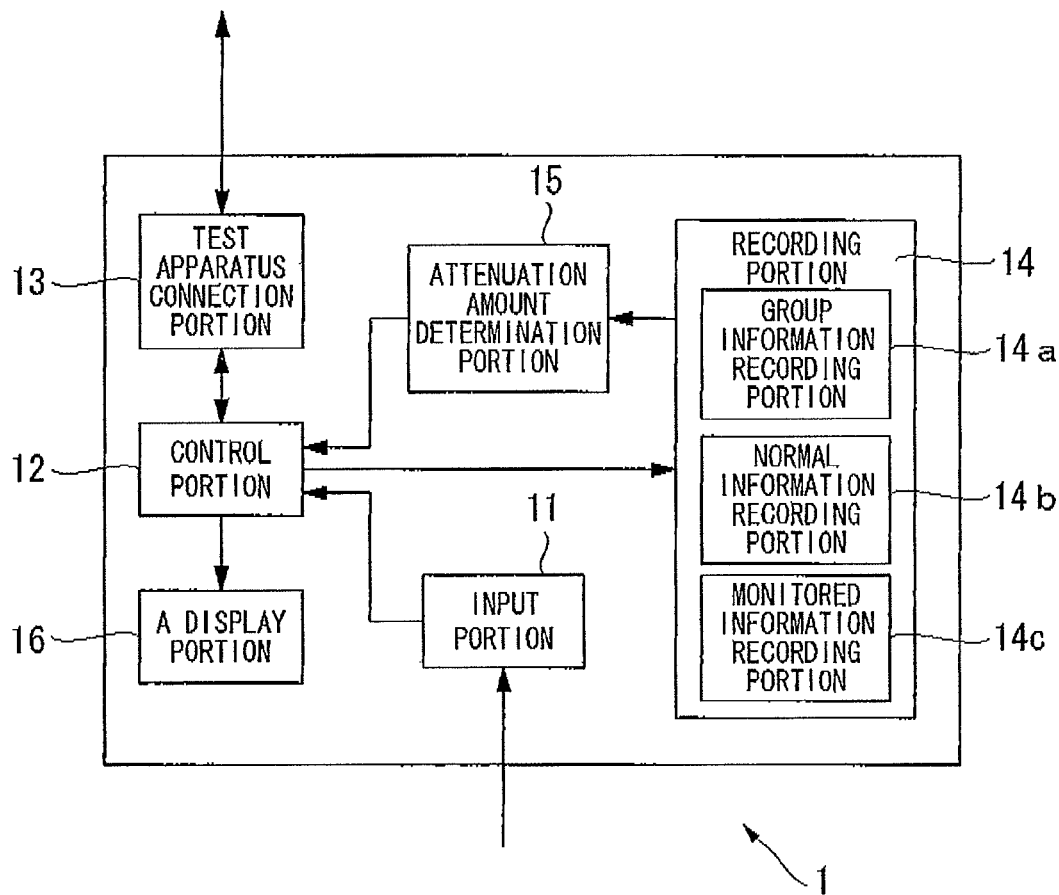
FIG. 2 is a block diagram showing a configuration of an optical line monitoring apparatus according to the first embodiment.
FIG. 3 shows one example of group information recorded in a group information recording portion.

FIG. 2 is a block diagram showing a configuration of the optical line monitoring apparatus 1 according to the first embodiment. The optical line monitoring apparatus 1 includes: an input portion 11; a control portion 12; a test apparatus connection portion 13; a recording portion 14; an attenuation amount determination portion 15; and a display portion 16. As an optical line monitoring apparatus 1, equipment such as a PC (Personal Computer) may be used.

As the input portion 11, input equipment such as a keyboard is used. To the input portion 11, group information about to which splitter 3 the respective terminators 4a to 4f are connected or the like are input through the operation by the administrator or others of the optical line monitoring system according to the first embodiment.

The control portion 12 controls the input portion 11, the test apparatus connection portion 13, the recording portion 14, the attenuation amount determination portion 15, and the display portion 16 which constitute the optical line monitoring apparatus 1. The test apparatus connection portion 13 is connected to the test apparatus 2 via the cable c1 (see FIG. 1). The test apparatus connection portion 13 emits an optical signal from the test apparatus 2 to the splitter 3a via the optical line f1, based on the control by the control portion 12. Furthermore, the test apparatus connection portion 13 acquires, via the cable c1, information with regard to a waveform of multiplexed reflected lights incident in the test apparatus 2 from the respective terminators 4.

The recording portion 14 includes: a group information recording portion 14a; a normal information recording portion 14b; and a monitored information recording portion 14c. In the group information recording portion 14a, the group information which has been input from the input portion 11 is recorded.

FIG. 3 shows one example of group information recorded in the group information recording portion 14a. As shown in the figure, information with regard to the terminators 4 connected to the same splitter 3 is recorded as group information, classified for every group. For example, the terminators 4a, 4b connected to the splitter 3b are recorded as in group g1.

In the normal information recording portion 14b, information with regard to intensities of the reflected lights which, after being emitted from the test apparatus 2 via the splitters 3, are reflected and returned by the respective terminators 4 is previously recorded. The intensities of the reflected lights recorded in this normal information recording portion 14b are those from the respective terminators 4 in the case where there is no failure in the optical lines f (f1 to f10).

There is a difference in distance from the test apparatus 2 to the respective terminators 4, which results in a time difference from the time an optical signal is emitted from the test apparatus 2 to the time the reflected light is incident. Therefore, it is possible to determine which reflected light is from which terminator 4 based on the time difference.

In the monitored information recording portion 14c, information with regard to the intensities of the reflected lights which, after being emitted from the test apparatus 2 via the splatters 3, are reflected and returned by the respective terminators 4 is recorded. Note that in the monitored information recording portion 14c, the intensities of the reflected lights from the respective terminators 4 in the case of a failure detection of whether or tot there is a failure in the optical lines f (f1 to f10) are recorded.

The attenuation amount determination portion 15 determines by how much the reflected light intensity of the predetermined terminator 4 previously recorded in the normal information recording portion 14b is attenuated from the corresponding reflected light intensity recorded in the monitored information recording portion 14c. Furthermore, the attenuation amount determination portion 15 determines whether or not the attenuated amount is equal in value to the attenuated amount of the other terminators 4 belonging to the same group.

As the display portion 16, a liquid crystal display unit or the like is used. The display portion 16 displays a waveform of the multiplexed reflected lights incident from the respective terminators 4, and displays information with regard to the optical line f with a failure.

Next is a description of processing steps of the optical line monitoring system according to the first embodiment.

Figure 4:
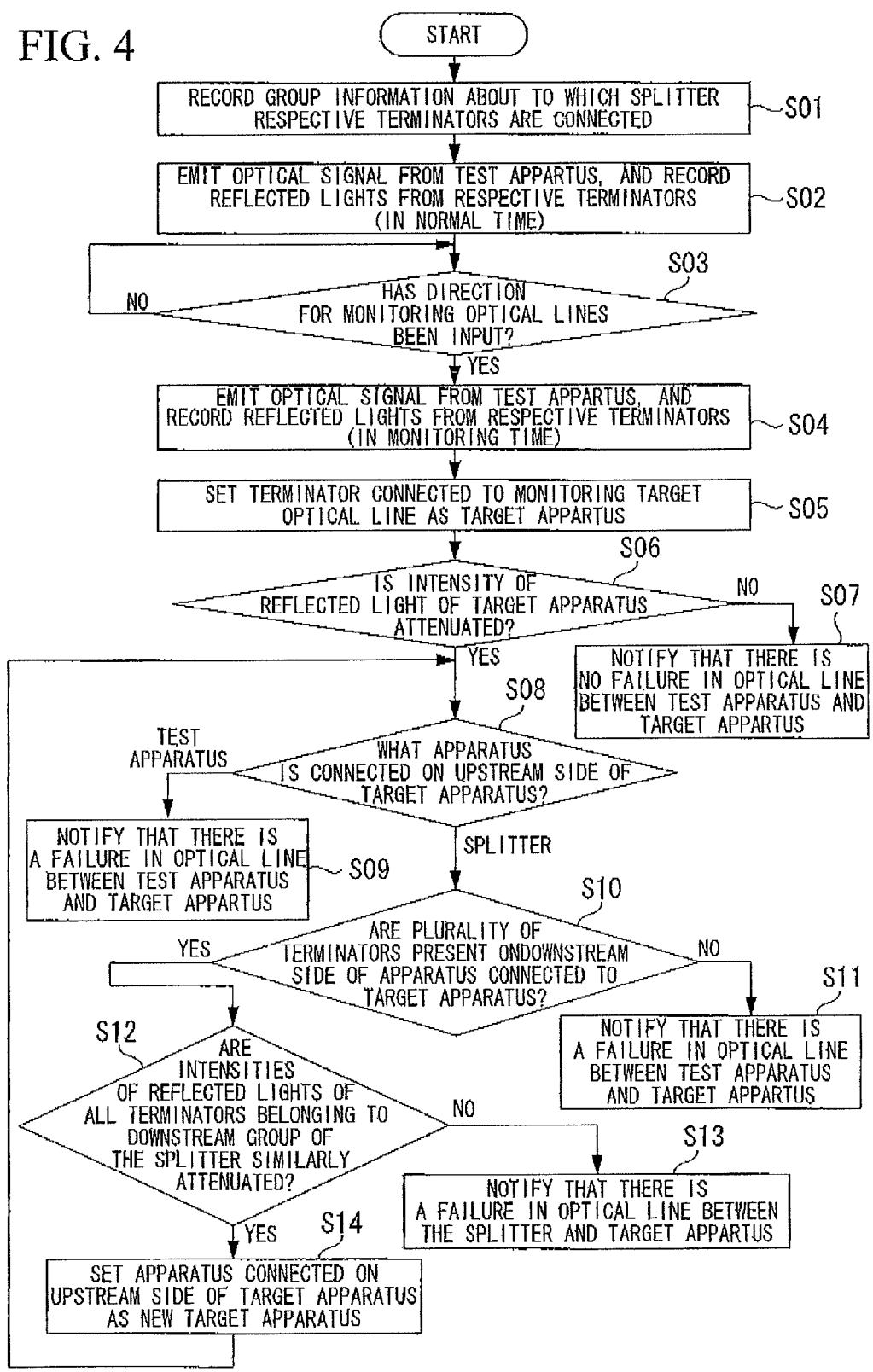
FIG. 4 is a flow chart showing a flow of processing steps of the optical line monitoring apparatus 1 according to the first embodiment.

FIG. 4 is a flow chart showing a flow of processing steps of the optical line monitoring apparatus 1 according to the first embodiment. First, the administrator or others of the optical line monitoring system according to the first embodiment input group information to the input portion 11. The control portion 12 records the group information which has been input to the input portion 11 in the group information recording portion 14a (Step S01). In the group information recording portion 14a, the group information as shown in FIG. 3 is recorded. Here, as group information, only connection information with regard to some splitters 3 and terminators 4 is recorded. However, other information such as connection information between the splitters 3 may be additionally recorded.

Next, the control portion 12 directs the test apparatus 2 to emit an optical signal to the splitter 3a in a state in which a failure is not occurring in the optical lines f (f1 to f10). The optical signal emitted from the test apparatus 2 is branched by the respective splitters 3 laid in a tree-like manner, and reflected by the respective terminators 4 to be returned to the test apparatus 2. The test apparatus connection portion 13 acquires information with regard to a waveform of the multiplexed reflected lights incident in the test apparatus 2, and the control portion 12 records the information with regard to the waveform of the multiplexed reflected lights in the normal information recording portion 14b (Step S02).

Next, the control portion 12 determines whether or not a direction for starting a failure monitoring of optical lines has been input front the input portion 11 (Step 803). If the direction has not been input, Step S03 determines "NO," and the procedure is again moved to Step 03. On the other hand, if the direction has been input, Step 803 determines "YES." Then, the control portion 12 directs the test apparatus 2 to emit an optical signal to the optical line f1. The optical signal emitted from the test apparatus 2 is branched by the respective splitters 3 laid in a tree-like manner, and reflected by the respective terminators 4 to be returned to the test apparatus 2. The test apparatus connection portion 13 acquires information with regard to a waveform of the multiplexed reflected lights incident in the test apparatus 2, and the control portion 12 records the information with regard to the waveform of the multiplexed reflected lights in the monitored information recording portion 14c (Step S04).

Next, the control portion 12 acquires, from the input portion 11, information with regard to a predetermined terminator 4 which is connected to an optical line f to be monitored, and sets the terminator 4 as a target apparatus (Step S05). The attenuation amount determination portion 15 then compares the reflected light intensity of the target apparatus recorded in the monitored information recording portion 14c with the reflected light intensity of the target apparatus recorded in the normal information recording portion 14b to determine whether or not the former is attenuated (Step S06).

If the reflected light intensity is not attenuated, Step S06 determines "NO," and notifies the administrator or others the fact that there is no failure in the optical line(s) f between the test apparatus 2 and the target apparatus by displaying it on the display portion 16 or the like (Step S07).

On the other hand, if the reflected light intensity is attenuated, Step S06 determines "YES," and further determines whether the apparatus connected on the upstream side of the target apparatus is the test apparatus 2 or a splitter 3. That is, it is determined whether or not another splitter 3 is present between the target apparatus and the test apparatus 2 to generate an optical branching (Step S08). If it is the test apparatus 2, Step S08 determines "test apparatus," and notifies the administrator or others the fact that there is a failure in the optical line f between the test apparatus 2 and the target apparatus by displaying it on the display portion 16 or the like (Step S09).

On the other hand, if it is a splitter 3, Step S08 determines "splitter." Then, it refers to the group information recording portion 14a to determine whether or not another terminator 4 is present in the same group as the target apparatus (Step S10). Here, the same group means being connected to the same splitter. If another terminator 4 is not present, Step S10 determines "NO," and notifies the administrator or others the fact that there is a failure in the optical line f between the test apparatus 2 and the target apparatus by displaying it on the display portion 16 or the like (Step S11).

On the other hand, if another terminator 4 is present, Step S10 determines "YES," and further determines whether or not the reflected light intensities of all the terminators 4 belonging to the downstream group of the splitter 3 to which the target apparatus is connected are also attenuated by the same attenuation amount value as that of the target apparatus (Step S12).

If they are not attenuated by the same value, Step S12 determines "NO," and notifies the administrator or others the fact that there is a failure in the optical line f between the splitter 3 to which the target apparatus is connected and the target apparatus by displaying it on the display portion 16 or the like (Step S13).

On the other hand, if they are attenuated by the same value, Step S12 determines "YES," and sets the apparatus connected on the upstream side on the target apparatus newly as a target apparatus (Step S14). Then, the procedure is moved to the aforementioned Step S08.

Next, a flow of processing steps of the optical line monitoring apparatus 1 in the case where a failure has actually occurred in an optical line f will be described with reference to the flow chart of FIG. 4.

Figure 5:
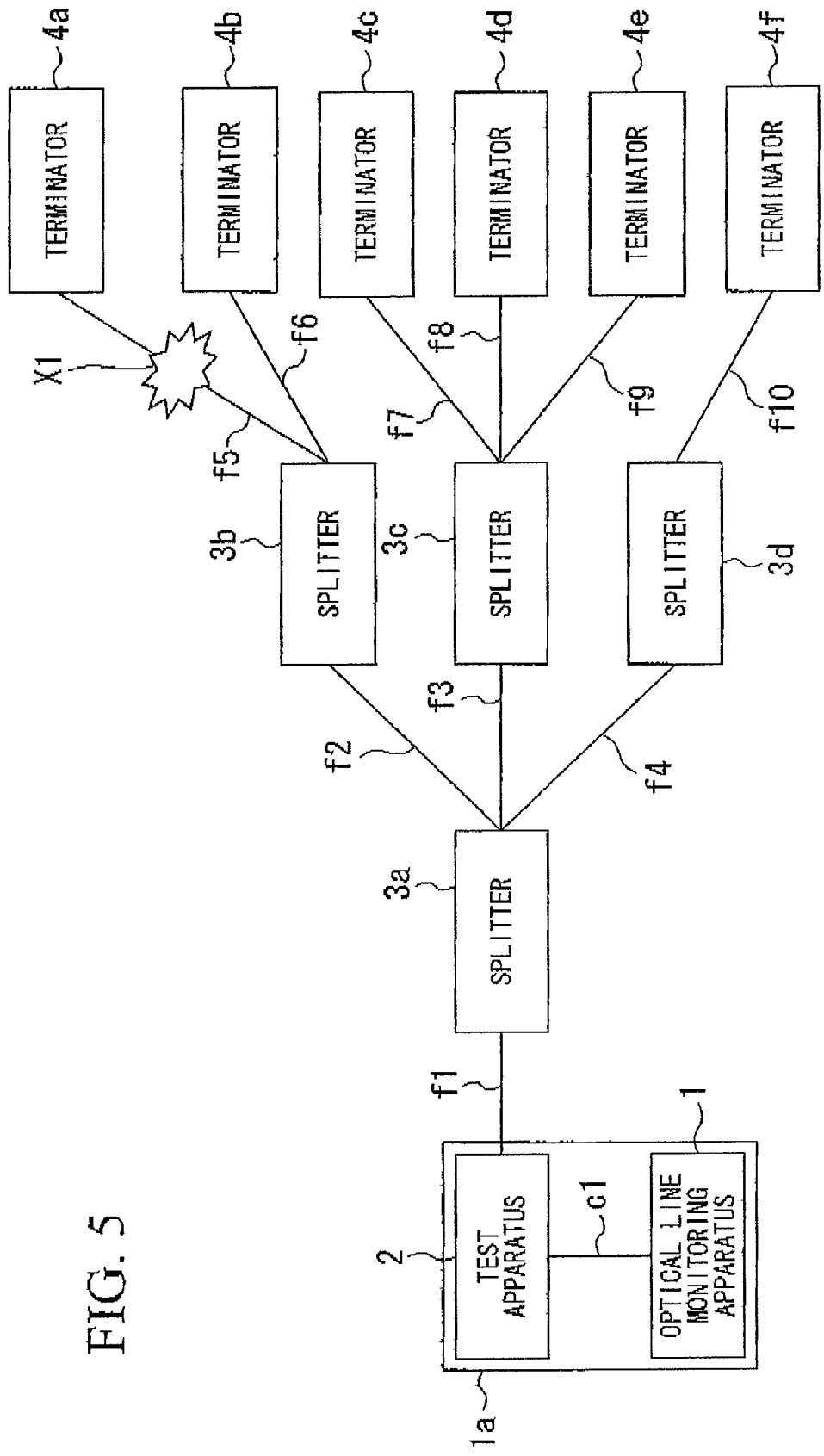
FIG. 5 shows a state in which a failure has occurred in an optical line in the optical line monitoring system according to the first embodiment.

FIG. 5 shows a state in which a failure X1 has occurred in the optical line f5 in the optical line monitoring system according to the first embodiment. It is assumed that no failure has occurred in the optical lines f1 to f4, f6 to f10 other than the optical line f5. In this case, an optical signal emitted from the test apparatus 2 is attenuated when passing through the optical line f5. Therefore, the intensity of the reflected light from the terminator 4a is attenuated.

In the optical line monitoring apparatus 1, the processing steps of Steps 801 to S04 in FIG. 4 are performed. Then, in Step S05, the terminator 4a is set as a target apparatus. Step S06 then determines "YES" because the intensity of the reflected light of the terminator 4a as a target apparatus is attenuated. Step S08 then determines "splitter" because the splitter 3b is connected on the upstream side of the terminator 4a as the target apparatus. Step S10 then determines "YES" because a plurality of terminators 4a, 4b are present on the downstream side of the splitter 3b to which the terminator 4a as the target apparatus is connected. Step S12 then determines "NO" because, of the reflected light intensities of the terminators 4a, 4b belonging to the downstream group g1 of the splitter 3b, the reflected light intensity of the terminator 4b is not attenuated. Step S13 then notifies the administrator or others the fact that there is a failure in the optical line f5 between the splitter 3b and the terminator 4a as the target apparatus by displaying it on the display portion 16 or the like.

Figure 6:
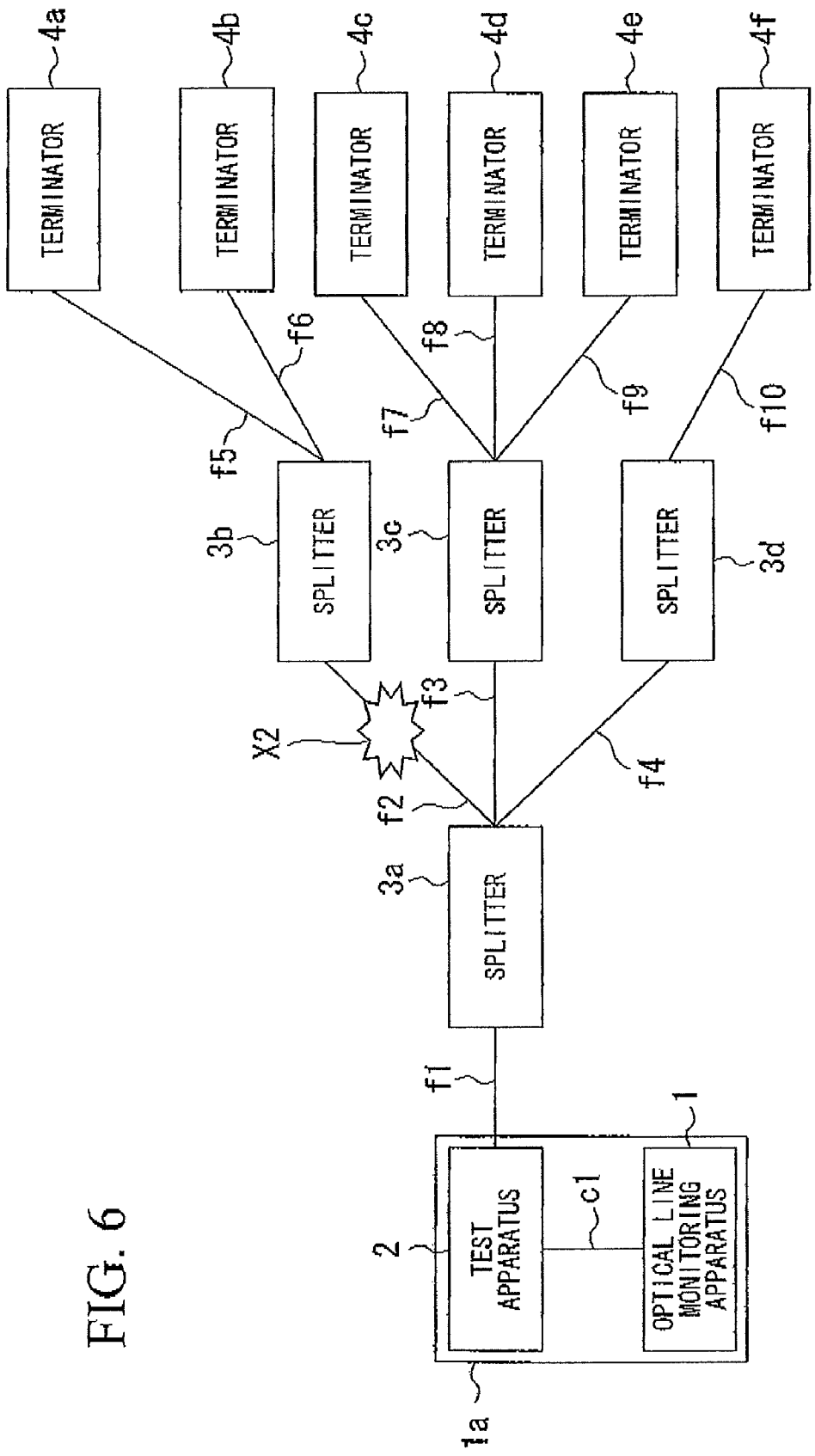
FIG. 6 shows a state in which a failure has occurred in another optical line in the optical line monitoring system according to the first embodiment.

FIG. 6 shows a state in which a failure X2 has occurred in the optical line f2 in the optical line monitoring system according to the first embodiment. It is assumed that no failure has occurred in the optical lines f1, f3 to f10 other than the optical line f2. In this case, an optical signal emitted from the test apparatus 2 is attenuated when passing through the optical line f2. Therefore, the intensities of the reflected lights from the terminators 4a, 4b are attenuated by the same value. Of the processing for the case where the failure X2 has occurred in the optical line f2 in FIG. 6, the processing steps of Steps S01, S02, S03, S04, S05, S06, S08, and S10 described for FIG. 5 is the same. Therefore, their description is omitted.

After Step S10, Step S12 determines "YES" because the intensities of the reflected lights of all the terminators 4a, 4b belonging to the downstream group g1 of the splitter 3b are attenuated by the same value. Step S14 then sets the splitter 3b, which is connected on the upstream side of the terminator 4a as the target apparatus, newly as a target apparatus. Subsequently, Step S08 determines "splitter" because the splitter 3a is connected on the upstream side of the splitter 3b as the target apparatus. Step S10 then determines "YES" because a plurality of terminators 4a to 4f are present on the downstream side of the splitter 3a to which the splitter 3b as the target apparatus is connected. Step S12 then determines "NO" because, of the terminators 4a to 4f belonging to the downstream groups g1 to g3 of the splitter 3a, the reflected light intensities of the terminators 4a, 4b are attenuated but those of the terminators 4c to 4f are not attenuated. Step S13 then notifies the administrator or others the fact that there is a failure in the optical line f2 between the splitter 3a and the splitter 3b as the target apparatus the administrator or others by displaying it on the display portion 16 or the like.

Figure 7:
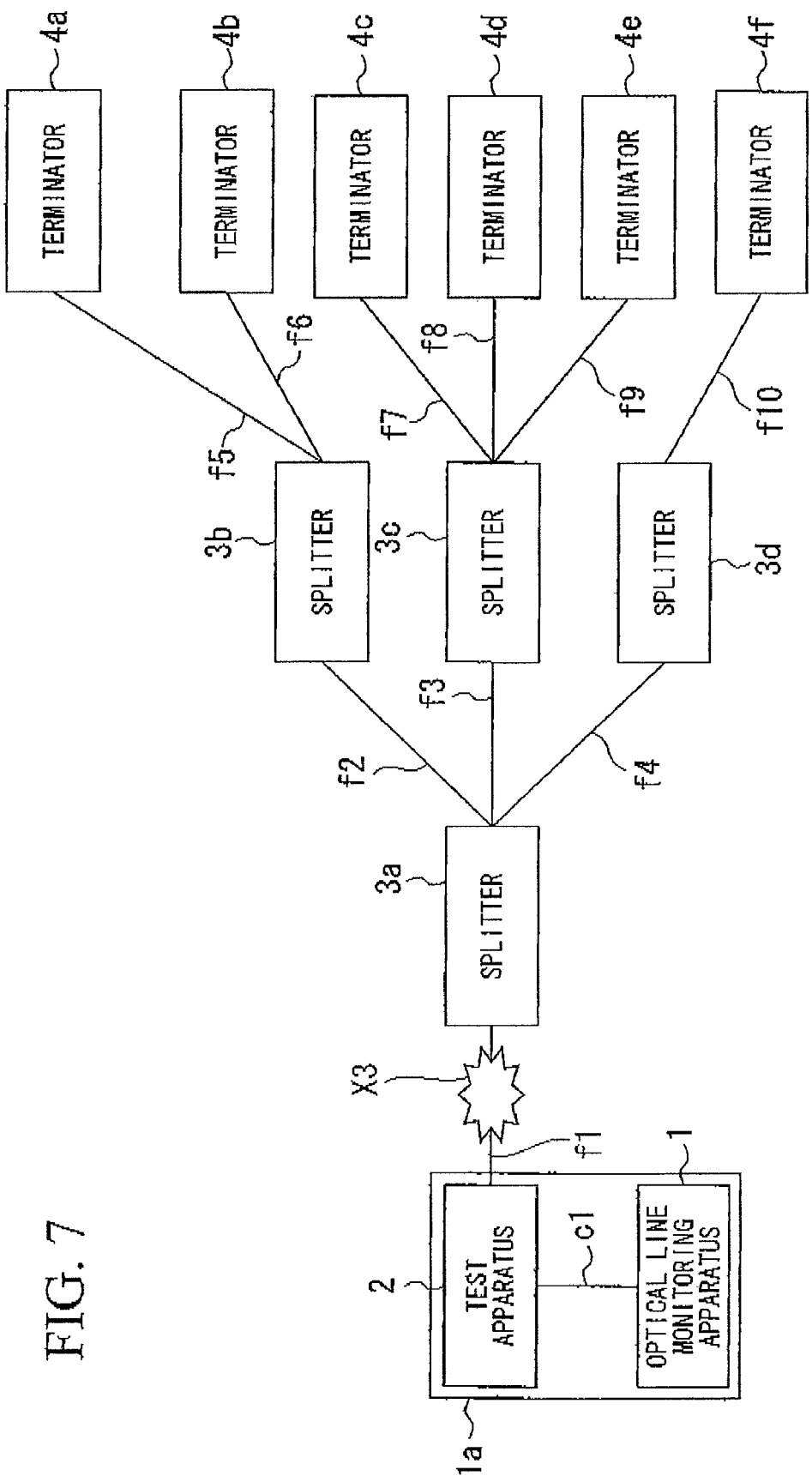
FIG. 7 shows a state in which a failure has occurred in still another optical line in the optical line monitoring system according to the first embodiment.

FIG. 7 shows a state in which a failure X3 has occurred in the optical line f1 in the optical line monitoring system according to the first embodiment. It is assumed that no failure has occurred in the optical lines f2 to f10 other than the optical line f1. In this case, an optical signal emitted from the test apparatus 2 is attenuated when passing through the optical line f1. Therefore, the intensities of the reflected lights from the terminators 4a to 4f are attenuated by the same value. Of the processing steps for the case where the failure X3 has occurred in the optical line f1 in FIG. 7, the processing of Steps S01, S02, S03, S04, S05, S06, S08, S10, S12 and S14 described for FIG. 6 is the same. Therefore, their description is omitted.

After Step S10, Step S12 determines "YES" because the reflected light intensities of all the terminators 4, that is, the terminators 4a to 4f belonging to the downstream groups g1 to g3 of the splitter 3a are attenuated by the same value. Step S14 then sets the splitter 3a, which is connected on the upstream side of the splitter 3b as the target apparatus, newly as a target apparatus. Subsequently, Step S08 determines "test apparatus" because the test apparatus 2 is connected on the upstream side of the splitter 3a as the target apparatus. Step S09 then notifies the administrator or others the fact that there is a failure in the optical line f1 between the test apparatus 2 and the splitter 3a by displaying it on the display portion 16 or the like.

According to the aforementioned optical line monitoring system according to the first embodiment, group information about which terminator 4 is connected to which splitter 3 is previously recorded in the group information recording portion 14a (Step S01 of FIG. 4). Furthermore, the intensities of the reflected lights from the respective terminators 4 when there is no failure in the optical lines f are previously recorded in the normal information recording portion 14b (Step S02 of FIG. 4). Then, in the case where the reflected light intensities of the terminator 4 connected to the same splitter 3 in terms of group information when a failure of the optical lines f is monitored are attenuated by the same value, it is determined that a failure has occurred in the optical line f to which those terminators 4 are commonly connected. Consequently, when a failure has occurred in any of the optical lines f1 to f10, the administrator or others do not have to check the state of the optical lines f connected to the test apparatus 2, the splitters 3, and the terminators 4 one by one. Therefore, efforts of the administrator or others required to monitor the optical lines can be greatly reduced.

In the aforementioned description of FIG. 5, FIG. 6, and FIG. 7, the description was for the case where a failure has occurred in any one of the optical lines X1, X2, X3, that is, the optical lines f5, f2, f1. However, when failures have occurred in a plurality of optical lines, the optical lines f with a possible failure may be notified to the administrator or others.

For example, in the case where there is a difference in degree of attenuation between the intensity of reflected light from the terminator 4a and that from the terminator 4b, and the other terminators 4c to 4f undergo no attenuation in returning light intensity, it may be determined that there is a failure in the optical line f1 which is common to the terminator 4a and the terminator 4b, and it may also be determined that there is a failure in either or both of the optical lines f4 and f5.

In the first embodiment described above, a program for implementing the functions of the control portion 12, the test apparatus connection portion 13, and the attenuation amount determination portion 15 of FIG. 2 may be recorded in a computer-readable recording medium, and a computer system may be allowed to read and execute the program recorded in this recording medium to control the optical line monitoring system. Note that the term "computer system" here includes an OS and hardware such as peripheral equipment.

Furthermore, the term "computer-readable recording medium" denotes a portable medium such as a flexible disk, a magneto-optical disk, a ROM, or a CD-ROM, and a storage device such as a hard disk drive built into the computer system. Furthermore, the term "computer-readable recording medium" also includes: one which dynamically retains a program for a short period of time like a communication wire when a program is output via a network such as the Internet or via a communications line such as a telephone line; and one which, in the former case, retains a program for a certain period of time like a volatile memory inside the computer system serving as a server or a client. In addition, the above-mentioned program may be for implementing a part of the above-mentioned functions. Furthermore, it may be one that can implement the above-mentioned functions in combination with a program already recorded in the computer system.

While the first embodiment has been described in detail above with reference to the drawings, the specific configuration of this invention is not limited to this embodiment. Designs or the like without departing from the spirit or scope of this invention are included in this invention.

Next is a description of a second and third embodiment of the present invention with reference to the drawings.

Figure 8:
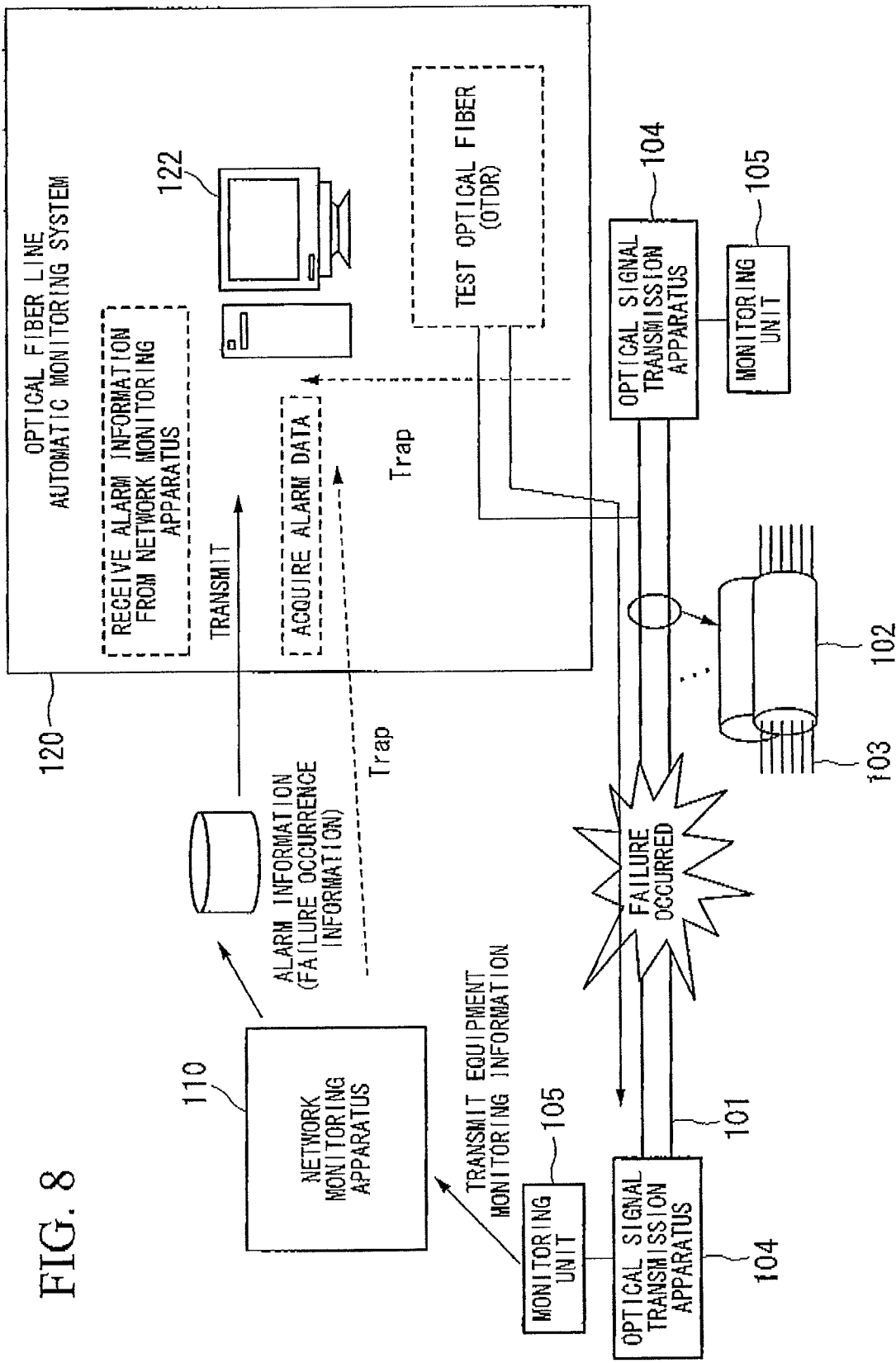
FIG. 8 is a diagram for explaining an outline of an optical fiber line automatic monitoring system according to the present invention.

FIG. 8 is a diagram for explaining an outline of an optical fiber line automatic 6 monitoring system according to the present invention. In FIG. 8, an optical fiber line 101 is a communication line made of one or more optical fiber cables 102. In the optical fiber cable 102, there is contained a plurality of optical fibers (coated optical fibers) 103. This optical fiber line 101 is connected to an optical signal transmission apparatus 104 which is for example a relay amplifier of a CATV network, a router of a TCP/IP network, or the like. It transmits image signals of CATV, digital packet signals, or the like as optical signals. To the optical signal transmission apparatus 104, there is provided a monitoring unit 105, which measures a received signal level and monitors an operation status or the like in the optical signal transmission apparatus 104.

Here, in the present embodiment, an optical fiber line means an optical communication line using one or more optical fiber cables. An optical fiber means a coated optical fiber in an optical fiber cable. An optical fiber line network means an optical communication network made of optical fiber lines.

A measurement/monitoring signal in the monitoring unit 105 is transmitted as equipment monitoring information to a network monitoring apparatus 110. The network monitoring apparatus 110 always determines whether there is a failure in the optical signal transmission apparatus 104 and the optical fiber line 101 based on the equipment monitoring signal received from the monitoring unit 105.

If a failure has occurred in an optical fiber 103 of the optical fiber line 101, an abnormality occurs in the signal level of the optical signal transmission apparatus 104. This information is transmitted to the network monitoring apparatus 110 via the monitoring unit 105. On detecting a communication error, the network monitoring apparatus 110 detects that a failure has occurred in an optical fiber 103 of the optical fiber line 101. It then transmits, as alarm information, the fact that a failure has occurred in an optical fiber 103 together with the information for identifying the optical fiber 103 with the abnormality to an optical fiber line automatic monitoring system.

Transmission of an alarm signal from the network monitoring apparatus 110 to the optical fiber line automatic monitoring system 120 is carried out by transmitting the alarm signal by means of a Trap of SNMP (Simple Network Management Protocol), in the case where it is carried out via a router of the TCP/IP network.

On receiving the alarm signal from the network monitoring apparatus 110, the optical fiber line automatic monitoring system 120 selects the optical fiber 103 identified by the failure occurrence information in the alarm signal from the optical fiber cable 102, and makes a test by an OTDR to determine the location of failure in the optical fiber 103. This test information with regard to the optical fiber 103 by the OTDR is displayed on a monitor screen of a display portion 122. Furthermore, it is possible to display the information with regard to the location of failure in the optical fiber on a map on the monitor screen.

In this manner, in the optical fiber line automatic monitoring system 120 of the present invention, the alarm information (the failure occurrence information) of the optical fiber line 101 and the optical fiber 103 detected by the network monitoring apparatus 110 is used by the optical fiber line automatic monitoring system 120 side to automatically test the optical fiber 103 with a failure. Thereby, it is possible to speedily identify the range in which a failure has occurred.

In the example shown in FIG. 8, the network monitoring apparatus 110 receives the equipment monitoring information from the monitoring unit 105 of the optical signal transmission apparatus 104 to determine the optical fiber 103 with a failure. However, it may be configured such that the optical fiber line automatic monitoring system 120 itself receives the equipment monitoring information from the monitoring unit 105 to determine the optical fiber 103 with a failure.

Figure 9:
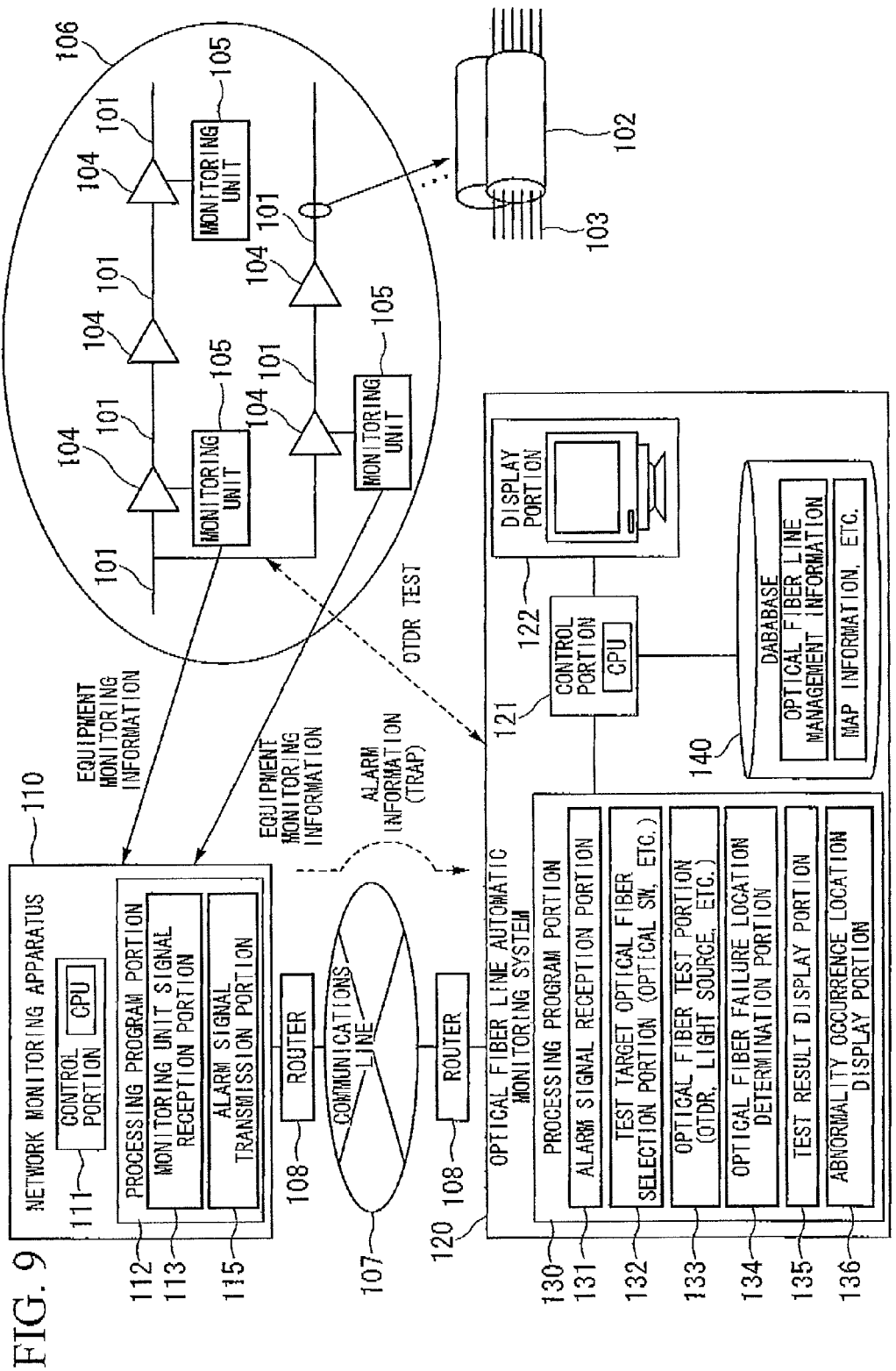
FIG. 9 shows an exemplary configuration of an optical fiber line automatic monitoring system as a second embodiment of the present invention.

FIG. 9 shows an exemplary configuration of an optical fiber line automatic monitoring system according to a second embodiment of the present invention. In the figure, an exemplary configuration of an optical fiber line automatic monitoring system 120 is shown together with an exemplary configuration of a network monitoring apparatus 110. Only a portion directly related to the present invention is shown.

In the exemplary configuration shown in FIG. 9, the network monitoring apparatus 110 and the optical fiber line automatic monitoring system 120 are connected to each other via a communications line (a dedicated line, an ISDN line, or the like) 107 and a router 108. Alarm information is transmitted from the network monitoring apparatus 110 to the optical fiber line automatic monitoring system 120.

The network monitoring apparatus 110 is made of: a control portion (including a CPU) 111 for controlling the whole network monitoring apparatus 110; and a processing program portion 112. A monitoring unit signal reception portion 113 in the network monitoring apparatus 110 performs processing of receiving equipment monitoring information from a monitoring unit 105 provided to an optical signal transmission apparatus 104 in an optical fiber line network 106. An alarm signal transmission portion 115 performs transmission processing as an alarm signal, failure occurrence information with regard to a communication network (for example, an optical fiber 103 in an optical fiber line 101) which has been determined as abnormal based on the equipment monitoring information received by the monitoring unit signal reception portion 113 to the optical fiber line automatic monitoring system.

Figure 30:
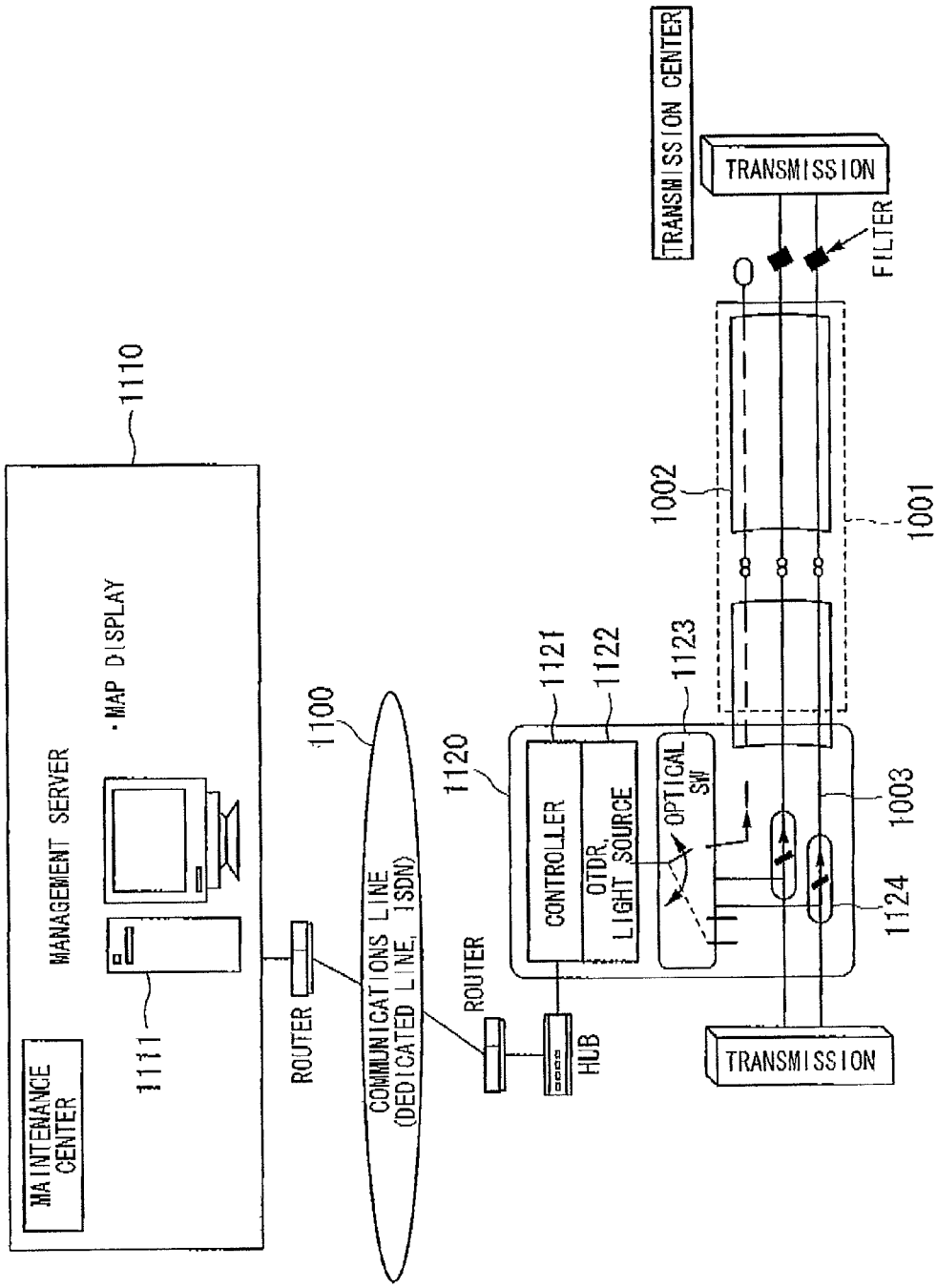
FIG. 30 shows an exemplary configuration of a conventional optical line monitoring system for monitoring optical fiber lines.
Figure 31:
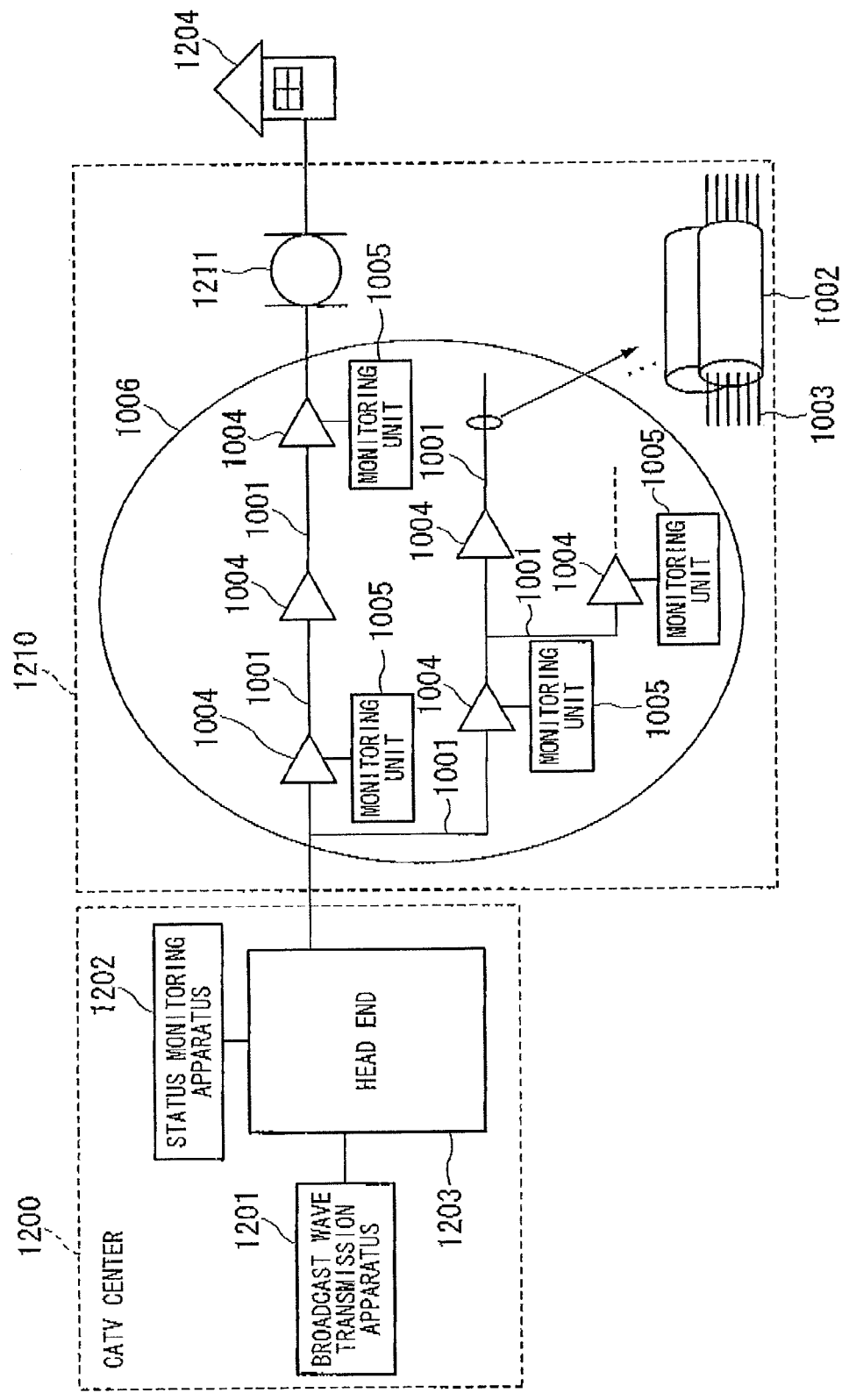
FIG. 31 shows an exemplary configuration of a CATV network.

The optical fiber line automatic monitoring system 120 is made of: a control portion (including a CPU) 121 for controlling the whole optical fiber line automatic monitoring system 120; a display portion 122; a processing program portion 130; and a database 140. An alarm signal reception portion 131 in the processing program portion 130 performs processing of receiving, as an alarm signal, failure occurrence information with regard to the optical fiber 103 with a failure from the network monitoring apparatus 110. When an alarm signal is received by the alarm signal reception portion 131, a test target optical fiber selection portion 132 selects the optical fiber 103 with a failure as an optical fiber to be tested. For example, it controls an optical switch (for example, see an optical switch 1123 shown in FIG. 30) to select an optical fiber 103 to be tested.

An optical fiber test portion 133 injects a test optical pulse into the optical fiber 103 selected by the test target optical fiber selection portion 132, to perform processing for observing an OTDR waveform. An optical fiber failure location determination portion 134 determines a location of failure in the optical fiber 103 based on the test result by the optical fiber test portion 133. A test result display portion 135 displays a result of the OTDR test on the optical fiber 103 on a monitor screen of the display portion 122. An abnormality occurrence location display portion 136 determines a location of failure from the result of the OTDR test on the optical fiber 103, and displays the location where a failure has occurred on a map of the monitor screen of the display portion 122. For example, it displays a path of the optical fiber line and a location of failure on the map. In addition, it may be configured such that photo information with regard to the current state of the location or the like are displayed. Furthermore, it may also be configured such that information with regard to a location of failure is transmitted to another communication terminal (for example, a cellular phone of a maintenance staffer or the like).

In a database 140, optical fiber line management information such as path information with regard to the optical fiber line 101 in the optical fiber line network 106, map information used for displaying a path of the optical fiber line 101 and a location of failure in the optical fiber 103, or the like are recorded.

In the exemplary configuration shown in FIG. 9, the network monitoring apparatus 110 receives equipment monitoring information from the monitoring unit 105 of the optical signal transmission apparatus 104 to determine the optical fiber 103 with a failure. However, the function of the network monitoring apparatus 110 may be integrated into the optical fiber line automatic monitoring system 120, and the optical fiber line automatic monitoring system 120 itself may receive equipment monitoring information from the monitoring unit 105 to determine the optical fiber 103 with a failure. An exemplary configuration for this case will be described below.

Figure 10:
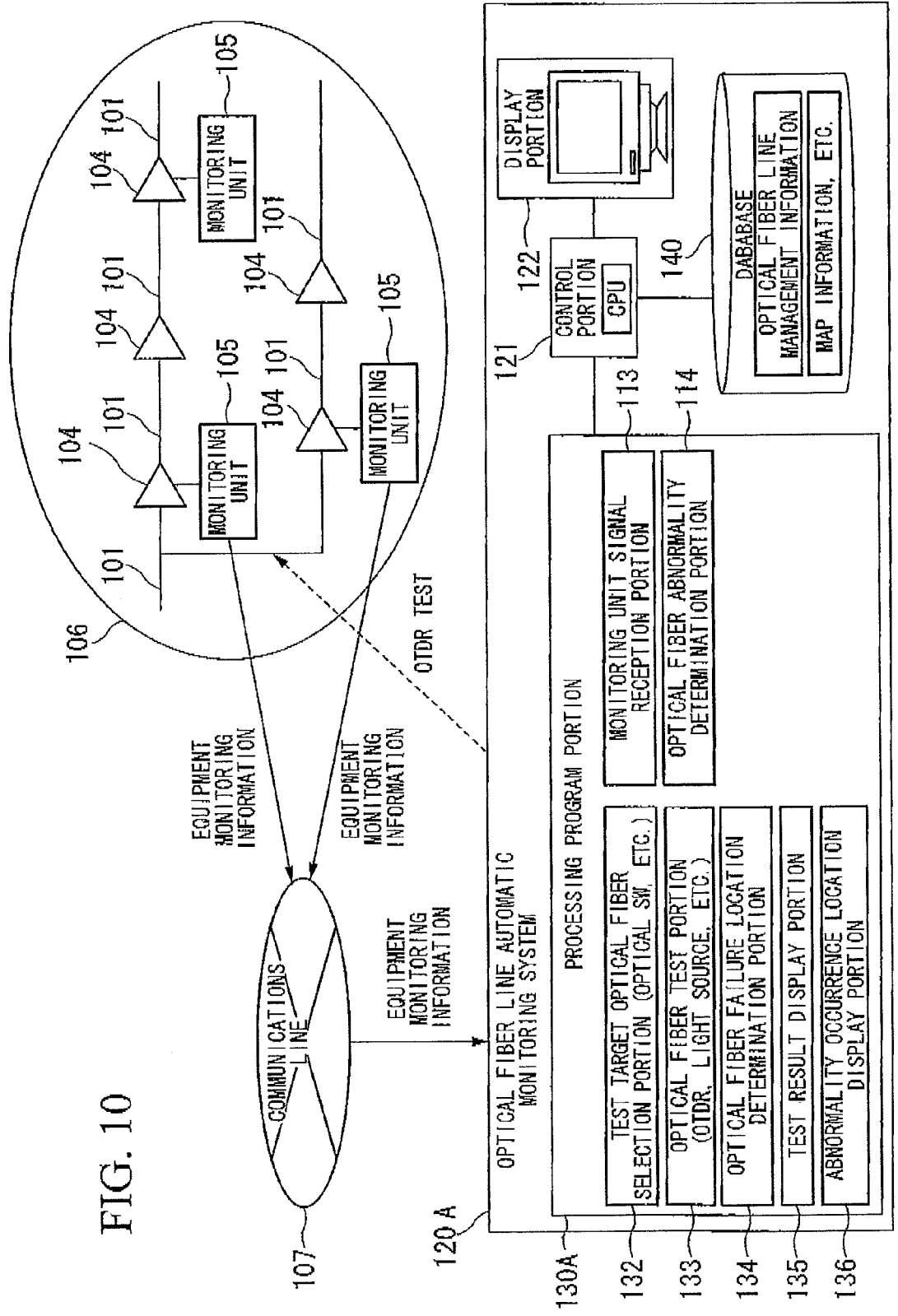
FIG. 10 shows another exemplary configuration of an optical fiber line automatic monitoring system as a third embodiment of the present invention.

FIG. 10 shows another exemplary configuration of an optical fiber line automatic monitoring system 120 as a third embodiment of the present invention. This shows an exemplary configuration in which the function of the network monitoring apparatus 110 shown in FIG. 9 is integrated into a processing program portion 130A in an optical fiber line automatic monitoring system 120A.

That is, the processing program portion 130A in the optical fiber line automatic monitoring system 120A shown in FIG. 10 has a configuration to which is added a monitoring unit signal reception portion 113 and from which is removed the alarm signal reception portion 131 (see FIG. 9). Note that operations of the respective portions are similar to those of the respective processing portions denoted by the like reference numerals in FIG. 9.

Figure 11:
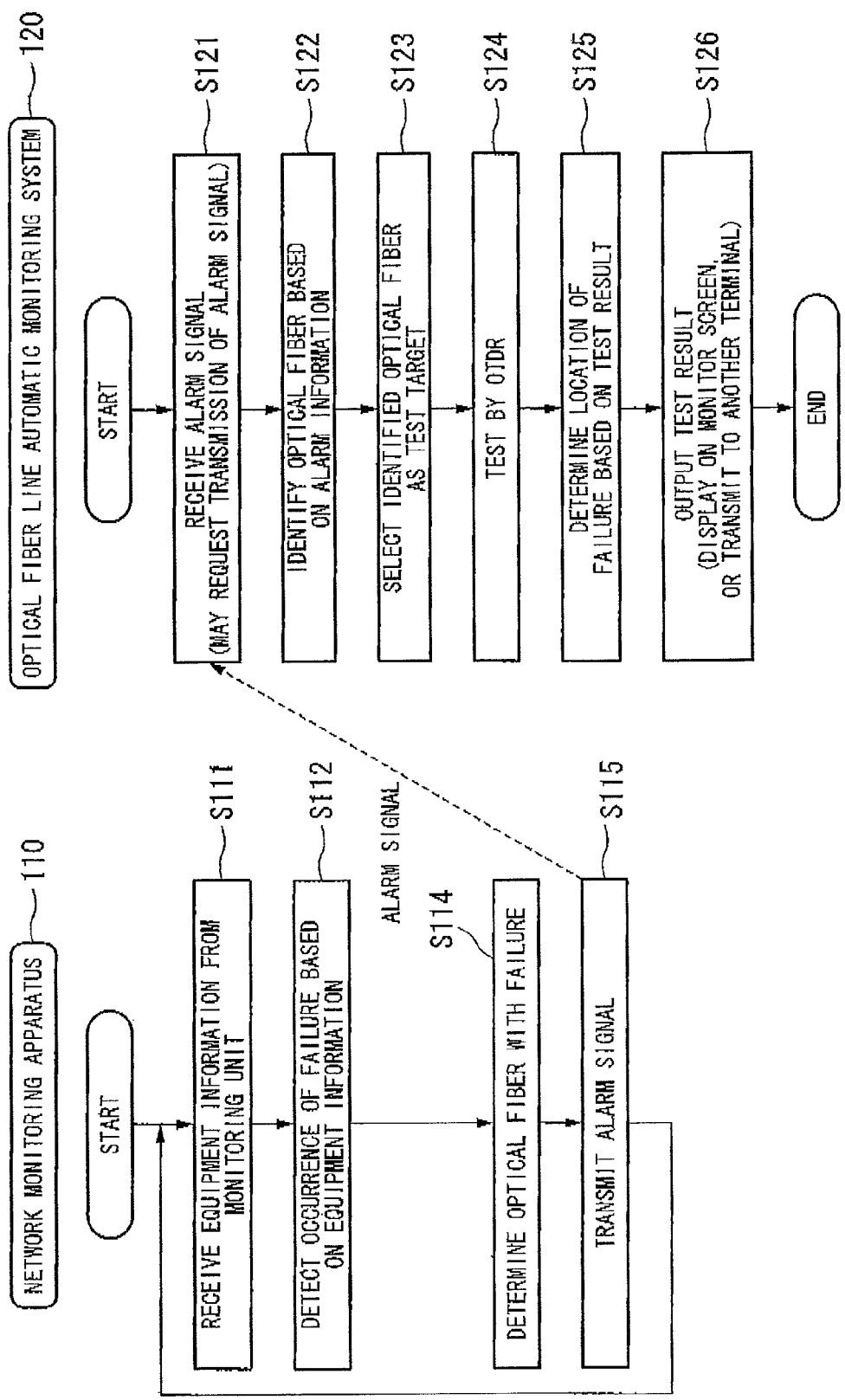
FIG. 11 is a flow chart showing a flow of processing steps in the optical fiber line automatic monitoring system shown in FIG. 9.

FIG. 11 is a flow chart showing a flow of processing steps in the optical fiber line automatic monitoring system of the present invention. This shows a flow of processing steps in the optical fiber line automatic monitoring system 120 shown in FIG. 9 in the form of a flow chart. Hereinafter is a description of the flow of the processing steps with reference to FIG. 11.

The side of the network monitoring apparatus 110 receives equipment monitoring information with regard to the optical signal transmission apparatus 104 such as a relay amplifier and a relay connection apparatus from the respective monitoring units 105 in the optical fiber line network 106 (Step S111).

It then detects the occurrence of a failure based on the equipment monitoring information received from the monitoring units 105 (Step S112), and transmits, as an alarm signal, information with regard to the optical fiber 103 with a failure to the optical fiber line automatic monitoring system 120 (Step S115).

On the other hand, the optical fiber line automatic monitoring system 120 side receives the alarm signal from the network monitoring apparatus 110 (Step S121). Note that the reception of the alarm signal from the network monitoring apparatus 110 may be carried out by sending an alarm signal transmission request from the optical fiber line automatic monitoring system 120 to the network monitoring apparatus 110.

It then identifies the optical fiber 103 with a failure based on the failure occurrence information included in the alarm signal (Step S122), selects the identified optical fiber 103 as a test target (Step S123), and performs a test (measurement) by an OTDR (Step S124).

It then determines the location of failure in the optical fiber 103 based on the test result by the OTDR (Step S125), and outputs the test result (Step S126). This test result may be displayed on the monitor screen of the display portion 122, or alternatively transmitted to another terminal (for example, a cellular phone held by a maintenance staffer or the like).

Figure 12:
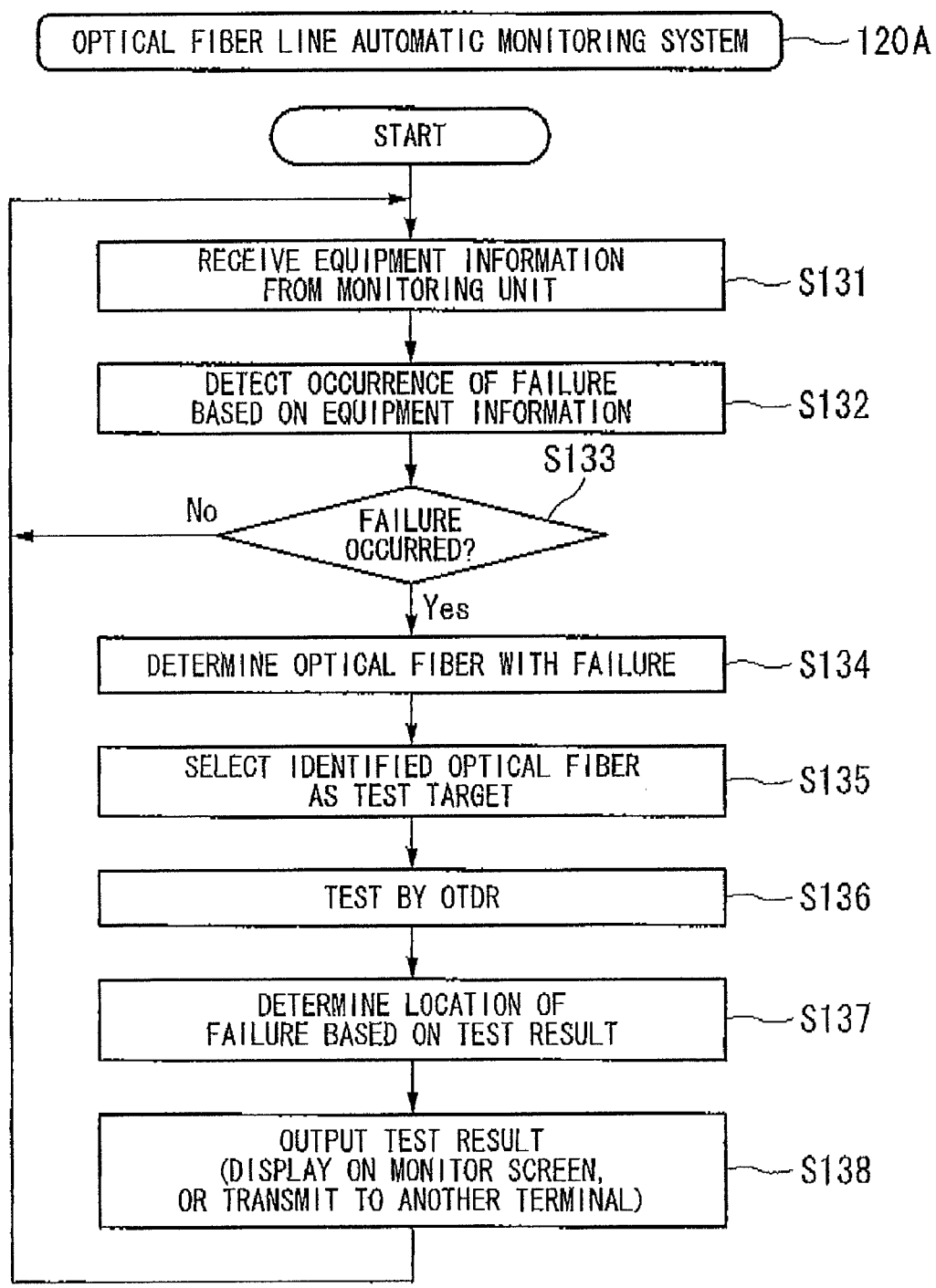
FIG. 12 is a flow chart showing a flow of processing steps in the optical fiber line automatic monitoring system shown in FIG. 10.

FIG. 12 shows a processing procedure for the optical fiber line automatic monitoring system 120A shown in FIG. 10. This is a combination of the processing procedure on the network monitoring apparatus 110 side and the processing procedure of the optical fiber line automatic monitoring system 120 side which are shown in FIG. 11. Hereinafter is a description of a flow of the processing steps with reference to FIG. 12.

The optical fiber line automatic monitoring system 120A receives equipment monitoring information with regard to the optical signal transmission apparatus 104 from the respective monitoring units 105 in the optical fiber line network 106 (Step S131).

It then detects an occurrence of failure based on the equipment monitoring information received from the monitoring units 105 (Step S132), and determines whether there is a failure in the optical fiber line 101 (Step S133). If it determines that a failure has occurred in optical fiber line 101 in Step S133, it determines the optical fiber 103 with a failure (Step S134). It then selects the identified optical fiber 103 as a test target (Step S135), and performs a test (measurement) by an OTDR (Step S136).

It then determines the failure occurrence location based on the test result by the OTDR (Step S137), and outputs the test result (Step S138). This test result may be displayed on the monitor screen of the display portion 122, or alternatively transmitted to another terminal (for example, a cellular phone held by a maintenance staffer or the like).

The second and third embodiments of the present invention have been described above. The optical fiber line automatic monitoring system 120 according to the present invention has a computer system inside it. A series of processes related to the above processing steps are stored in a computer-readable recording medium in the form of a program. The above processing steps are performed by the computer reading and executing this program. That is, the respective processing steps in the optical fiber line 2a automatic monitoring system 120 are implemented by a central processing unit such as a CPU reading the above program into a main memory such as a ROM or a RAM to process the information and performs a computation.

Here, a computer-readable recording medium denotes a magnetic disk, a magneto-optical disk, a CD-ROM, a DVD-ROM, a semiconductor memory, or the like. Furthermore, it may be configured such that this computer program is distributed to a computer via a communications line to allow the computer which has received this distribution to run the program.

The optical fiber line automatic monitoring system of the present invention is not limited to the aforementioned examples shown in the drawings. It is obvious that various modifications can be made insofar as they do not depart from the spirit or scope of the present invention.

Hereinafter is a description of a fourth, fifth, and sixth embodiment of the present invention with reference to the drawings.

Figure 13:
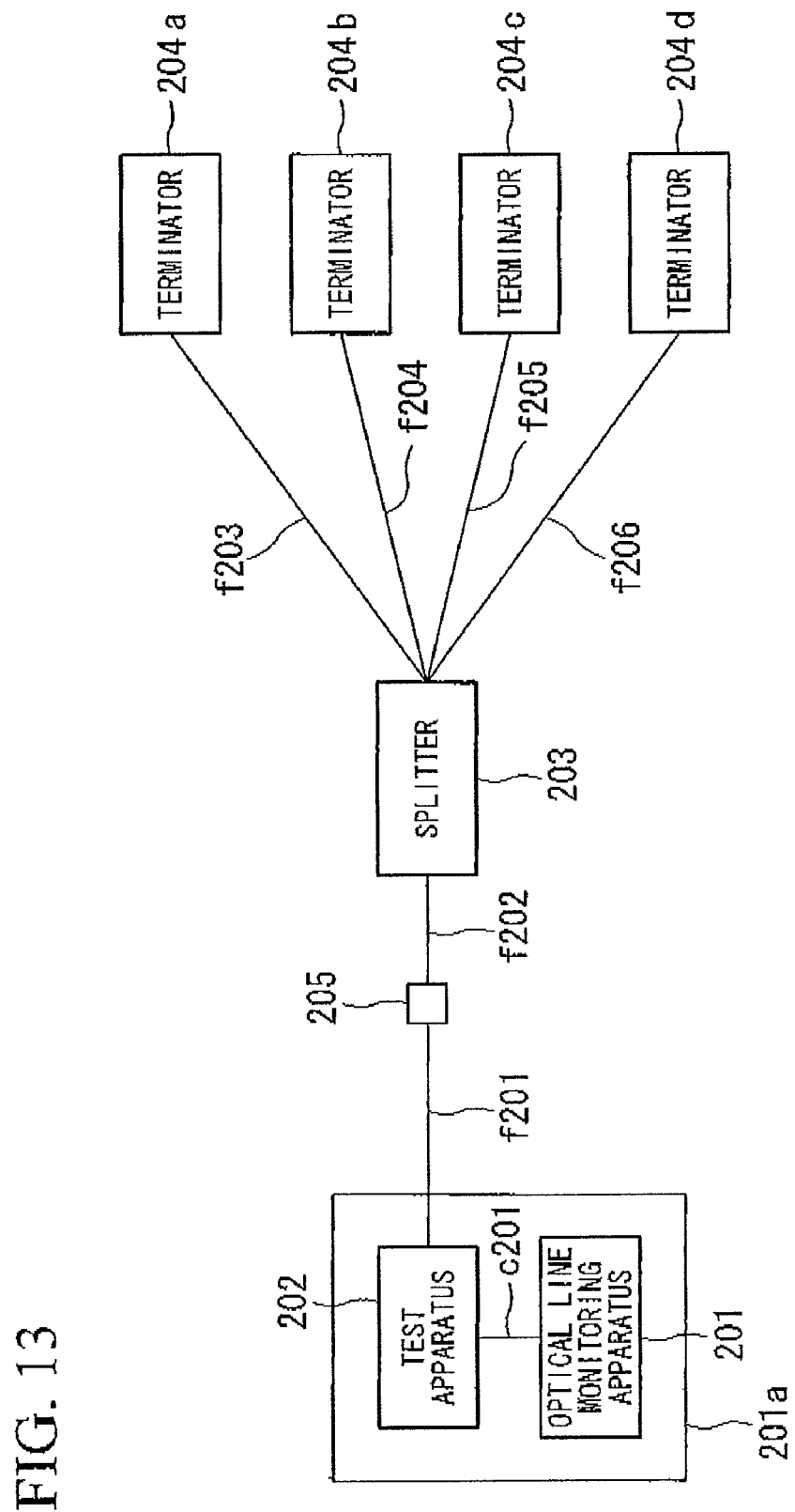
FIG. 13 is a schematic block diagram of an optical line monitoring system according to a fourth embodiment of the present invention.

FIG. 13 is a schematic block diagram of an optical line monitoring system according to the fourth embodiment of the present invention. This optical line monitoring system includes: an optical line monitoring apparatus 201; a test apparatus 202; a splitter 203, and terminators 204 (204a to 204d). In the fourth embodiment, the case where an OTDR (Optical Time Domain Reflectometer) is used as the test apparatus 202 and ONUs (Optical Network Units) are used as the terminators 204 will be described.

The optical line monitoring apparatus 201 and the test apparatus 202 are connected via a cable c201 with a standard such as the RS232-C (Recommended Standard 232 version C), and is contained in one enclosure 201a. One end of an optical line f201 is connected to the test apparatus 202, and the other end of the optical line f201 is connected to a connector 205. One end of an optical line f202 is connected to the connector 205, and the other end of the optical line f202 is connected to the splitter 203. Note that the optical line f201 and the optical line f202 may be connected by splicing or the like instead of using the connector 205. Furthermore, one end of optical lines f203 to ±206 are connected to the splitter 203, and the other end of the optical lines f203 to f206 are respectively connected to the terminators 204a to 204d.

In the fourth embodiment, optical fibers with a length of 10 km and 350 m are used as the optical lines f201 and f202, respectively. In addition, optical fibers with a length of 280 m, 290 m, 300 m, and 310 m are used as the optical lines f203 to f206, respectively.

The optical line monitoring apparatus 201 controls the test apparatus 202 and acquires information with regard to waveforms measured by the test apparatus 202 or the like via the cable c201. The test apparatus 202 emits an optical signal to the splitter 203 and receives an optical signal emitted by the splitter 203 via the optical line f201, based on the control by the optical line monitoring apparatus 201.

When receiving an optical signal from the test apparatus 202 which is connected on the upstream side, the splitter 203 branches the optical signal equally in terms of power, and emits the branched optical signals to the terminators 204a to 204d which are connected on the downstream side. Furthermore, when receiving optical signals from the terminators 204a to 204d which are connected on the downstream side, the splitter 203 multiplexes those optical signals and emits the multiplexed optical signal to the test apparatus 202 which is connected on the upstream side. As a splitter 203, for example a PLC (Planar Lightwave Circuit) type splitter can be used in which optical waveguides are branched in a tree-like manner on a silica substrate.

Here, an upstream side designates a direction in which the test apparatus 202 corresponding to the root of the optical lines laid in a tree-like manner from the test apparatus 202 to the terminators 204a to 204d is connected. A downstream side designates a direction in which a terminator 204 corresponding to a leaf of the optical lines laid in a tree-like manner from the test apparatus 202 to the respective terminators 204a to 204d is connected.

When receiving an optical signal from the splitter 203, the terminator 204 reflects a specific wavelength of the optical signal to the splitter 203. As a terminator 204, for example an optical connector containing a fiber grating filter which reflects an optical signal at a specific wavelength can be used.

While in the fourth embodiment, the case where the terminators 204a to 204d are connected to the splitter 203 is described, the number of the terminators 204 connected to the splitter 203 may be optional, as long as it is less than or equal to the number of the branches of the splitter 203. Although the fourth embodiment is described in which the terminators 204a to 204d are connected to the splitter 203, another splitter (other splitters) may be further arranged between the splitter 203 and the terminators 204a to 204d to provide a multistage configuration.

Figure 14:
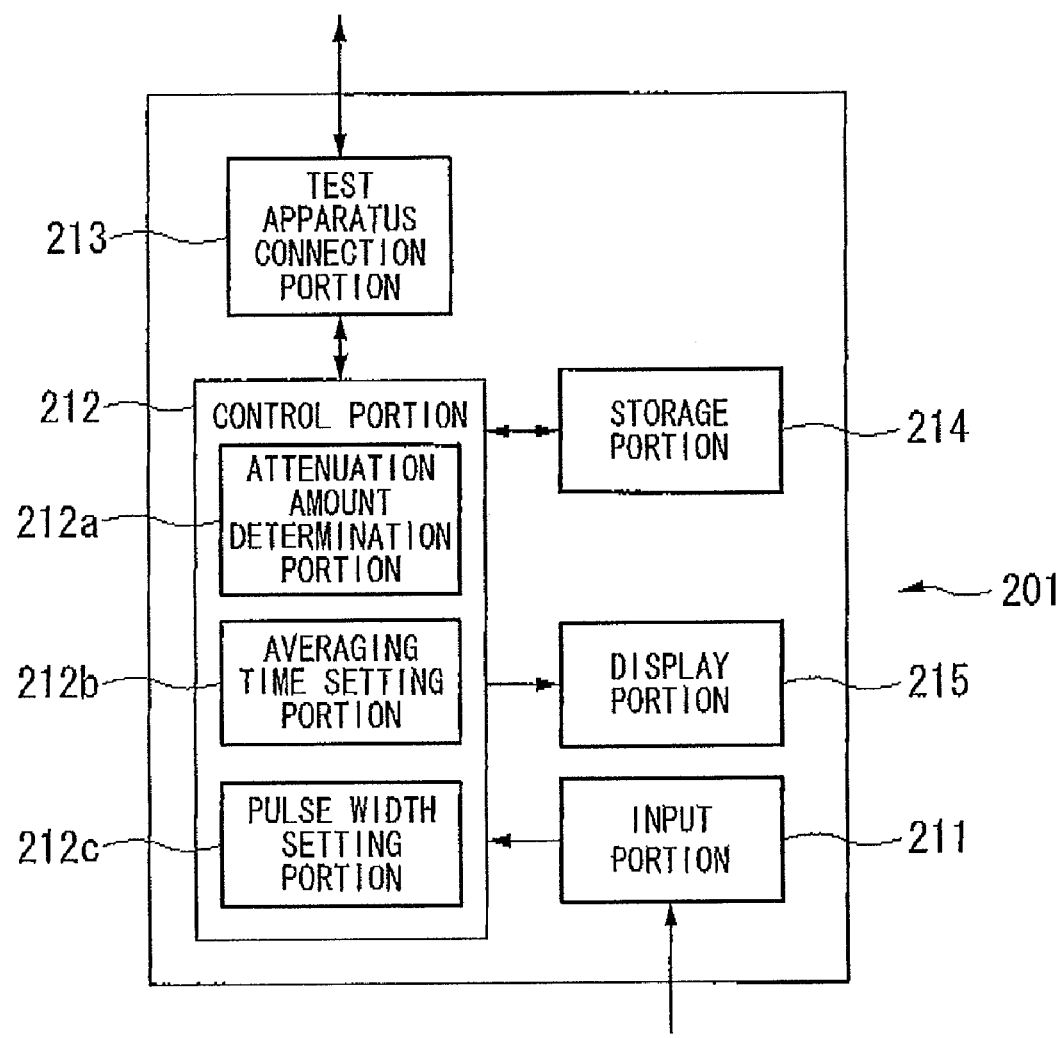
FIG. 14 is a block diagram showing a configuration of the optical line monitoring apparatus according to the fourth embodiment.

FIG. 14 is a block diagram showing a configuration of the optical line monitoring apparatus 201 according to the fourth embodiment. The optical line monitoring apparatus 201 includes: an input portion 211; a control portion 212 (a first to fourth control devices); a test apparatus connection portion 213; a storage portion 214 (a first and second storage devices); aid a display portion 215 (a display device). As the optical line monitoring apparatus 201, equipment such as a PC (Personal Computer) may be used.

As the input portion 211, input equipment such as a keyboard is used. To the input portion 211, information including the distances from the test apparatus 202 to the respective terminators 204a to 204d, and the equipment names is input through operation by the administrator or others of the optical line monitoring system according to the fourth embodiment.

The control portion 212 controls the input portion 211, the test apparatus connection portion 213, the storage portion 214, and the display portion 215 which constitute the optical line monitoring apparatus 201. The control portion 212 includes: an attenuation amount determination portion 212a (an attenuation amount determination device); an averaging time setting portion 212b, and a pulse width setting portion 212c.

The attenuation amount determination portion 212a analyzes a waveform of the multiplexed reflected lights received by the test apparatus 202 from the respective terminators 204, to thereby determine whether or not the intensities of the reflected lights from the respective terminators 204 are attenuated.

The averaging time setting portion 212b sets the length of an averaging time of an optical signal emitted from the test apparatus 202. The averaging time refers to a time for averaging processing, that is, the number of times for averaging processing.

The pulse width setting portion 212c sets a width of a pulse width of an optical signal emitted from the test apparatus 202. If a pulse width is narrow, an axial resolution is high, making it unlikely for the reflections from the terminators 204a to 204d to overlap even if they are close to each other. However, this makes the dynamic range (the distance allowing the measurement accuracy to be maintained) short. On the other hand, if the pulse width is wide, the axial resolution is low, causing the reflections from the terminators 204a to 204d to overlap when they are close to each other. However, this makes the dynamic range long.

The test apparatus connection portion 213 is connected to the test apparatus 202 via the cable c201 (see FIG. 13). The test apparatus connection portion 213 emits an optical signal from the test apparatus 202 to the splitter 203 via the optical line f201, based on the control by the control portion 212. Furthermore, the test apparatus connection portion 213 acquires, via the cable c201, information with regard to a waveform of the multiplexed reflected lights received by the test apparatus 202 from the respective terminators 204.

FIG. 15 shows one example of information stored in the storage portion 214 according to the fourth embodiment. As shown in the figure, the storage portion 214 associates terminator names (such as terminator 204a) with: optical line lengths (such as 280 m) showing a distance from the test apparatus 202 to the respective terminators 204; reflected light intensities (such as 48.0 dB) of the terminators 204 in normal time; and reflected light intensities (such as 48.0 dB) of the terminators 204 in failure monitoring time, and store them.

Here, normal time is used for the case where there is no failure in the optical lines f (f201 to f206). Failure monitoring time is used for the case where a measurement is made for finding whether or not a failure has occurred. This refers to a regular checkup time after the optical lines f (f201 to f206) and the terminators 204a to 204d are deployed, or the case where a failure point is intended to be found after a failure occurrence is informed (when an alarm is given).

The information representing the terminator names and the information with regard to the optical line lengths are input from the input portion 211 through the operation by the administrator or others of the optical line monitoring system according to the fourth embodiment. The information with regard to the reflected light intensities in normal time and the information with regard to the reflected light intensities in failure monitoring time are found based on the waveform of multiplexed returning lights received by the test apparatus 202 from the respective terminators 204.

There is a difference in distance from the test apparatus 202 to the respective terminators 204, which results in a time difference from the time an optical signal is emitted from the test apparatus 202 to the time the reflected light is received. Therefore, it is possible to determine which reflected light is from which terminator 4 based on the time difference.

As the display portion 215, a liquid crystal display unit or the like is used. The display portion 215 displays a waveform of the multiplexed reflected lights received from the terminators 204a to 204d, and displays information with regard to the optical lines f201 to f206 with a failure.

Next is a description of processing by the optical line monitoring system according to the fourth embodiment.

Figure 16:
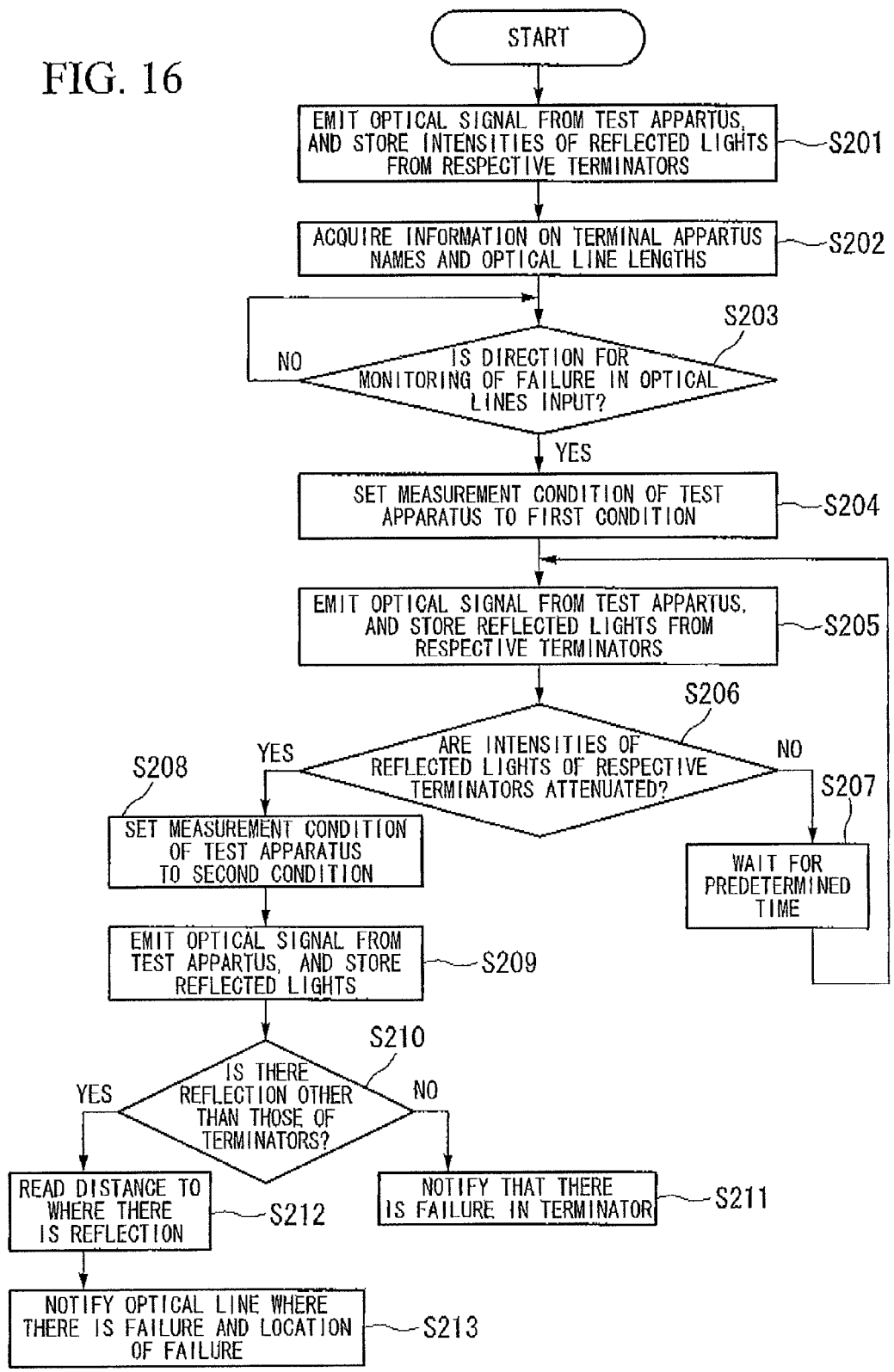
FIG. 16 is a flow chart showing a flow of processing steps in the optical line monitoring apparatus according to the fourth embodiment of the present invention.

FIG. 16 is a flow chart showing a flow of processing steps of the optical line monitoring apparatus 201 according to the fourth embodiment. First, the control portion 212 directs the test apparatus 202 to emit an optical signal to the splitter 203 in normal time in a state in which a failure is not occurring in the optical lines f (f201 to f206). The optical signal emitted from the test apparatus 202 is branched by the splitter 203 laid in a tree-like manner, and reflected by the respective terminators 204a to 204d to be returned to the test apparatus 202. The test apparatus connection portion 213 acquires information with regard to a waveform of the multiplexed reflected lights (FIG. 17) received by the test apparatus 202.

Figure 17:
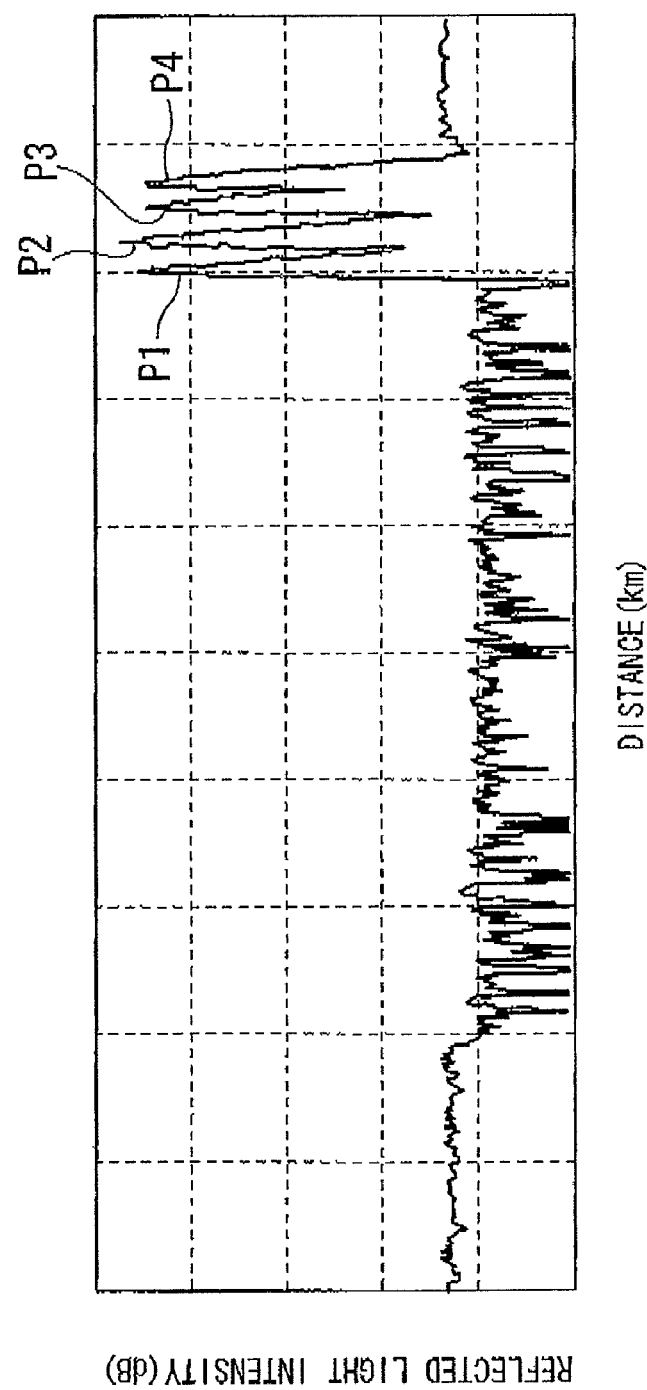
FIG. 17 shows one example of a waveform of an optical signal received by a test apparatus in normal time in the fourth embodiment of the present invention.

FIG. 17 shows one example of a waveform of an optical signal received by the test apparatus 202 in normal time in the fourth embodiment of the present invention. The axis of abscissa represents a distance from the test apparatus 202, and the axis of ordinate represents reflected light intensity. The waveform of FIG. 17 has four reflections P1 to P4. These reflections P1 to P4 denotes reflected lights from the terminators 204a to 204d, respectively. Note that the measurement of the waveform of FIG. 17 was made under a condition with an averaging time of 5 seconds and a pulse width of 20 ns.

The control portion 212 analyzes the waveform (FIG. 17) received by the test apparatus 202, to thereby associate the reflected light intensities of the reflections P1 to P4 of the respective terminators 204a to 204d in normal time with the terminator names, and store them in the storage portion 214 (Step S201 of FIG. 16). The optical line lengths can be found by reading the values on the axis of abscissa where the reflections occur.

Furthermore, the administrator or others of the optical line monitoring system according to the fourth embodiment input the information with regard to the terminator names and the information with regard to the optical line lengths from the input portion 211. As a result, the input portion 211 acquires the information with regard to the terminator names and the information with regard to the optical line lengths (Step S202). The control portion 212 associates the information with regard to the terminator names acquired by the input portion 211 with the information with regard to the optical line lengths acquired by the input portion 211, and stores them (see FIG. 15).

Getting back to FIG. 16, the control portion 212 determines whether or not a direction for starting a failure monitoring of the optical lines has been input from the input portion 211 (Step S203). If the direction has not been input, Step S203 determines "NO," and the procedure is again moved to Step S203. On the other hand, if the direction has been input, Step S203 determines "YES." The averaging time setting portion 212a directs the test apparatus 202 to use a first measurement condition to emit an optical signal to the optical line f201 (Step S204). In the fourth embodiment, the measurement was made under a condition with an averaging time of 5 seconds and a pulse width of 20 ns, as the first measurement condition.

The optical signal emitted by the test apparatus 202 is branched by the splitter 203 laid in a tree-like manner, and reflected by the respective terminators 204 to be returned to the test apparatus 202. The test apparatus connection portion 213 acquires information with regard to a waveform of the multiplexed reflected lights (FIG. 18) received by the test apparatus 202.

Figure 18:
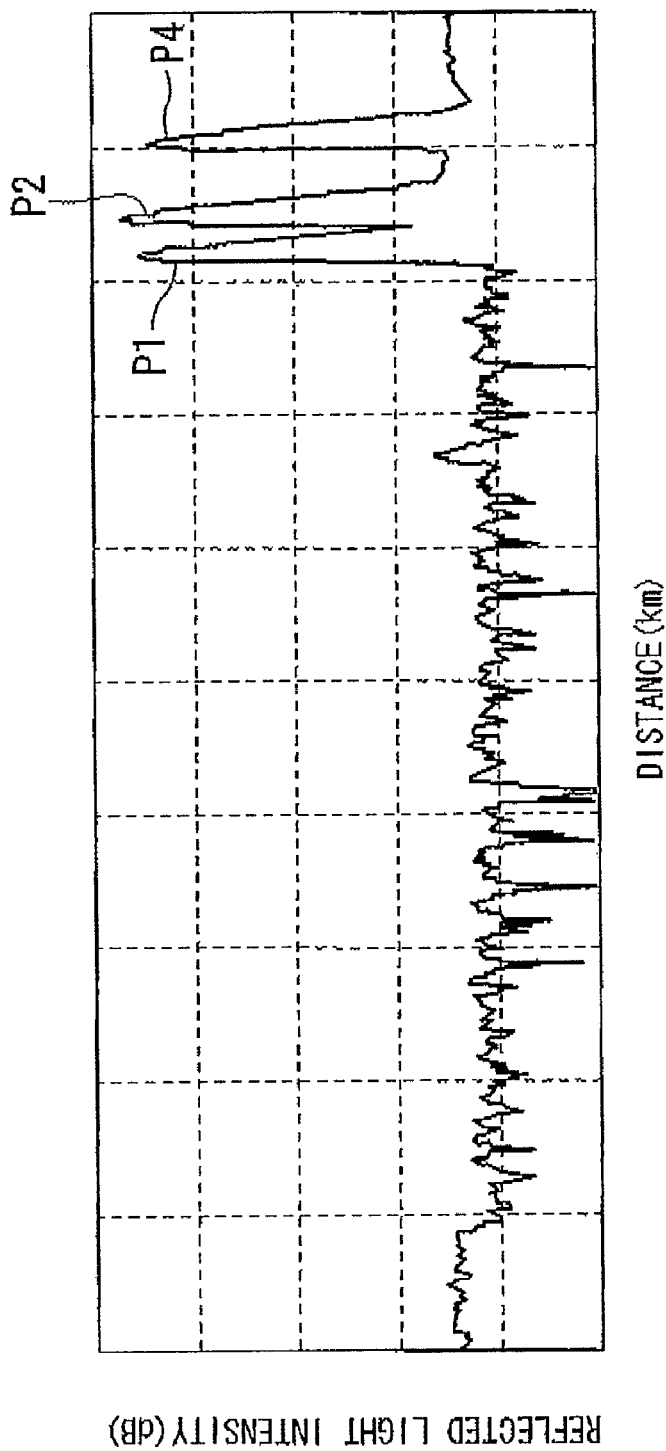
FIG. 18 shows one example of a waveform of an optical signal received by the test apparatus in the event of a failure in the fourth embodiment of the present invention.

FIG. 18 shows one example of a waveform of an optical signal received by the test apparatus 202 in failure occurrence time in the fourth embodiment of the present invention. The axis of abscissa represents a distance from the test apparatus 202, and the axis of ordinate represents a reflected light intensity. The control portion 212 reads, in the waveform shown in FIG. 18, the reflected light intensities which correspond to the optical line lengths in the respective terminators 204a to 204d. It then associates the optical line lengths in the respective terminators 204a to 204d with the reflected light intensities, and stores them in the storage portion 214 as the reflected light intensities in failure monitoring time (Step S205).

Next, the attenuation amount determination portion 212a determines whether or not the reflected light intensities of the respective terminators 204a to 204d in failure monitoring time, which are stored in the storage portion 214, is attenuated from the corresponding reflected light intensities in normal time, which are stored in the storage portion 214 (Step S206).

If the reflected light intensities are not attenuated, the Step S206 determines "NO," and after a predetermined waiting time (Step S207), the procedure is again moved to Step S205 to restart the processing.

On the other hand, if the reflected light intensities are attenuated, Step S206 determines "YES," and the averaging time setting portion 212a directs the test apparatus 202 to use a second measurement condition to emit an optical signal to the optical line f201 (Step S208). In the fourth embodiment, the measurement was made under a condition with an averaging time of 144 seconds and a pulse width of 20 ns, as the second measurement condition.

The control portion 212 directs the test apparatus 202 to use the second measurement condition to emit an optical signal to the splitter 203. The optical signal emitted by the test apparatus 202 is branched by the splitter 203 laid in a tree-like manner, and reflected by the respective terminators 204a to 204d to be returned to the test apparatus 202. The test apparatus connection portion 213 acquires information with regard to a waveform of the multiplexed reflected lights (FIG. 19) received by the test apparatus 202.

Figure 19:
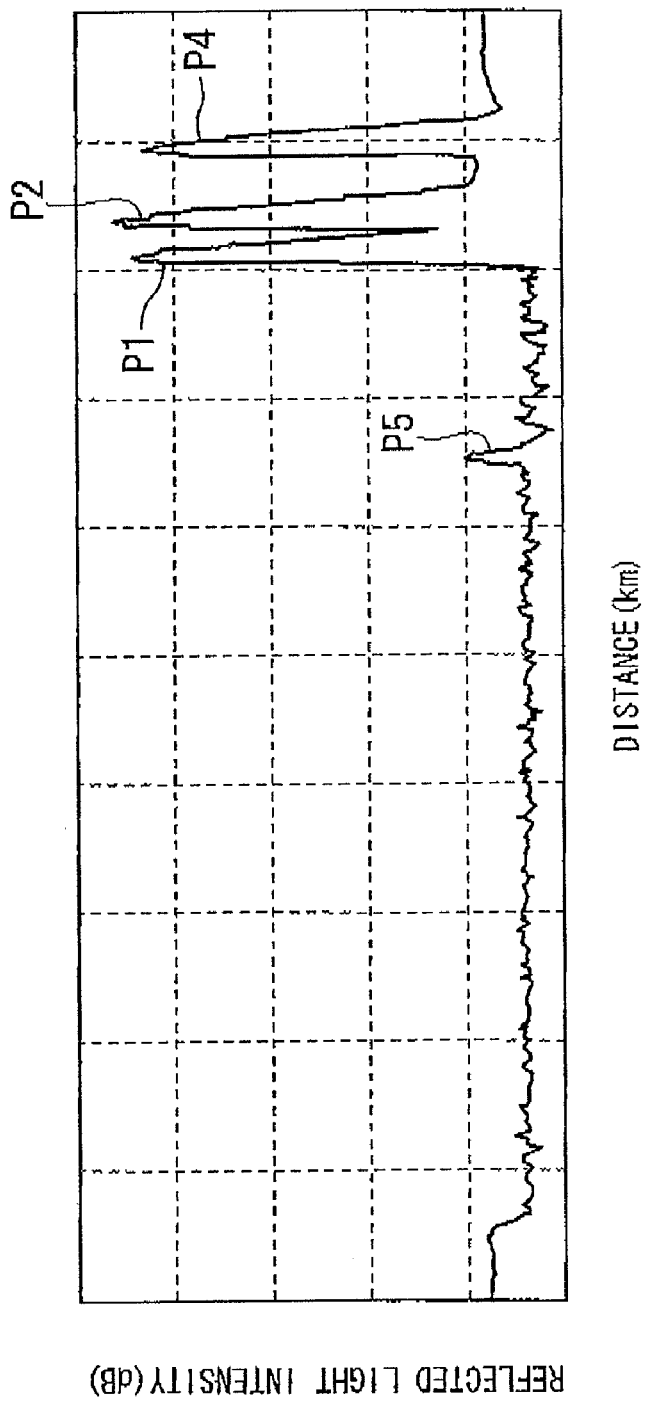
FIG. 19 shows one example of a waveform of an optical signal received by the test apparatus in the event of a fault in the fourth embodiment of the present invention.

FIG. 19 shows one example of a waveform of an optical signal received by the test apparatus 202 in failure occurrence time in the fourth embodiment. The axis of abscissa represents a distance from the test apparatus 2, and the axis of ordinate represents a reflected light intensity. Compared with the measurement result with an averaging time set to 5 seconds (FIG. 18), the measurement result with an averaging time set to 144 seconds (FIG. 19) has less noise, which is a fluctuation in waveform in the axis of ordinate direction, allowing clear distinction of a reflection abnormality P5 due to the failure in the optical line.

Getting back to FIG. 16, the control portion 212 determines whether there is a reflection other than the reflections P1 to P4 of the respective terminators 204a to 204d (Step S210). If there is no reflection other than the reflections P1 to P4, Step S210 determines "NO," and displays on the display portion 215 the fact that there is a failure in the terminator (here, the terminator 204c) whose reflection light intensity has been determined as attenuated in Step S206 (Step S211), to thereby notify the administrator or others the fact of the optical line monitoring system according to the fourth embodiment.

On the other hand, if there is a reflection other than the reflections P1 to P4, that is, if there is a reflection abnormality P5 with more than a predetermined reflection light intensity as shown in FIG. 19, Step S210 determines "YES," and the procedure is moved to Step S212. The control portion 212 reads the value on the axis of abscissa at which the reflection abnormality P5 occurs, to thereby find a failure occurrence distance from the test apparatus 202 (Step S212). The control portion 212 displays on the display portion 215 the fact that there is a failure at a point on the optical lines f (here, f201, f202, and f205) connecting between the test apparatus 202 and a terminator 204 (here, the terminator 204c) the reflection light intensity of which has been determined as attenuated, the point being away from the test apparatus 202 by the failure occurrence distance (here, a point on the optical line f205) (Step S213), to thereby notify the administrator or others the fact of the optical line monitoring system according to the fourth embodiment.

In the optical line monitoring system according to the fourth embodiment of the present invention, a measurement is made using a short averaging time (an averaging time of 5 seconds) as a first measurement condition. If the reflected light intensity of a terminator is attenuated, a measurement is made using a long averaging time (an averaging time of 144 seconds) as a second measurement condition. As a result, when the first measurement condition is used, a measurement time can be made short. In addition, when the second measurement condition is used, a reflection abnormality due to a failure in the optical lines can be recognized from a waveform with little noise. Therefore, the distance to a point at which a failure has occurred can be accurately calculated, and the optical lines can be monitored with good accuracy.

In the above measurements, a measurement of an intensity of the reflected returning light from the terminator can detect not only an abnormality of the terminator but also the presence or absence of an occurrence of an excessive line loss from the transmission terminal (the transmission side) to the terminator. This is because if the presence of a failure in the line brings about an excessive loss, a peak of the reflected returning light is lowered accordingly.

Especially in a splitter-branched line, if there is a loss due to a failure between a splitter and the transmission terminal, all the peaks of the reflected returning lights from the terminators connected to the splitter are lowered. This shows that there is a failure between the splitter and the transmission terminal. A failure occurs due to various causes such as an abnormality in a connection point or an abnormality in a line (optical fiber cable).

As described above, the presence or absence of a line loss or the like is accurately measured under the first or second condition, preferably the second condition.

Next is a description of processing by an optical line monitoring system according to a fifth embodiment of the present invention. The configuration of the optical line monitoring system according to the fifth embodiment and the configuration of the optical line monitoring apparatus 201 are similar respectively to that of the optical line monitoring system according to the fourth embodiment (FIG. 13) and that of the optical line monitoring apparatus 201 (FIG. 14). Therefore, their description will be omitted.

The flow chart showing a flow of processing steps of the optical line monitoring apparatus 201 according to the fifth embodiment is much the same as that showing a flow of processing steps of the optical line monitoring apparatus 201 according to the fourth embodiment (FIG. 16), the difference lying in the processing in Step S208 of FIG. 16. In the fifth embodiment, the waveform of the returning light received after emitting an optical signal using a first condition (an averaging time of 5 seconds, a pulse width of 20 ns) from the test apparatus 202 in the processing of Step S205 is the same as that of FIG. 18.

In Step S208 of the fifth embodiment, the pulse width setting portion 212b directs the test apparatus 202 to use a second measurement condition to emit an optical signal to the optical line f201. In the fifth embodiment, the measurement was made under a condition with an averaging time of 5 seconds and a pulse width of 100 ns, as the second measurement condition.

The control portion 212 directs the test apparatus 202 to use the second measurement condition to emit an optical signal to the splitter 203. The test apparatus connection portion 213 acquires information with regard to a waveform of the returning lights (FIG. 20) received by the test apparatus 202.

Figure 20:
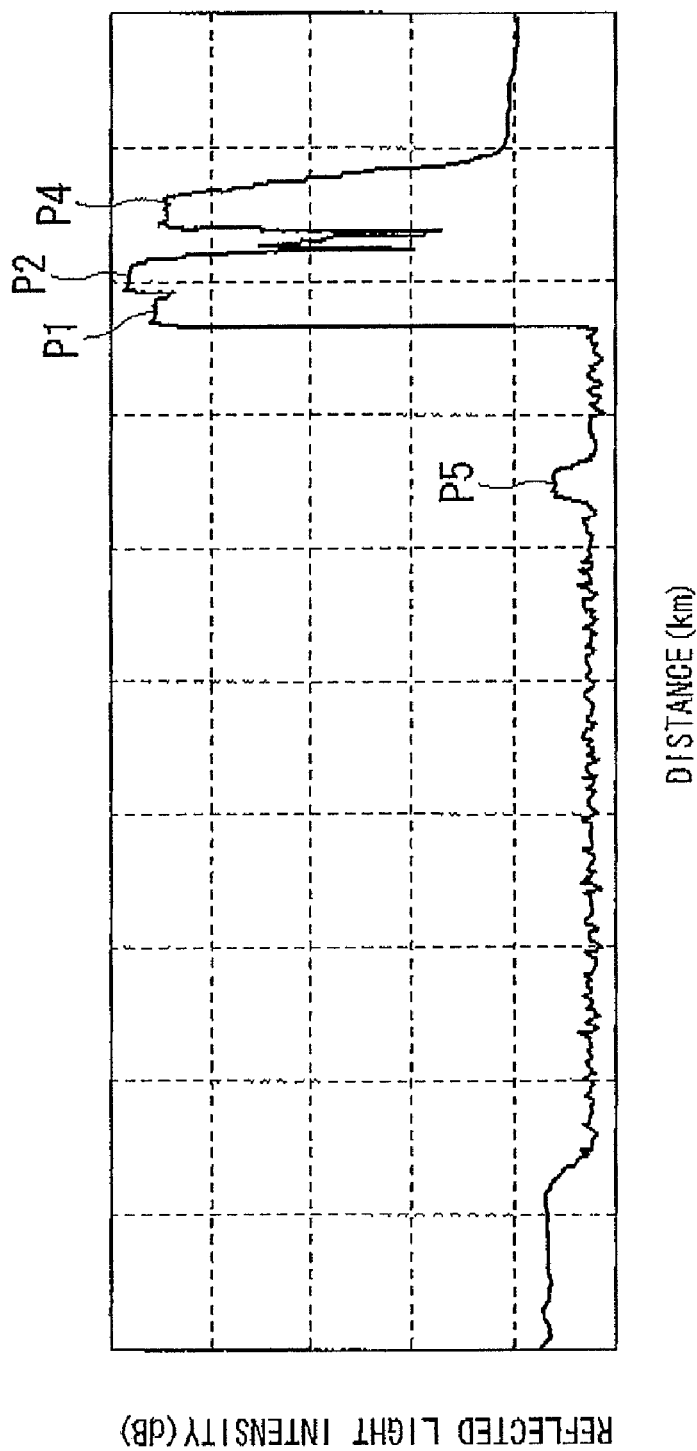
FIG. 20 shows one example of a waveform of an optical signal received by a test apparatus 2 in the event of a fault in the fifth embodiment of the present invention.

FIG. 20 shows one example of a waveform of an optical signal received by the test apparatus 202 in failure occurrence time in the fifth embodiment. The axis of abscissa represents a distance from the test apparatus 202, and the axis of ordinate represents a reflected light intensity. Compared with the measurement result with a pulse width set to 20 ns (FIG. 18), the measurement result with a pulse width set to 100 ns (FIG. 20) has less noise, which is a fluctuation in waveform in the axis of ordinate direction, allowing clear distinction of the reflection abnormality P5 due to the failure in the optical line.

In the optical line monitoring system according to the fifth embodiment of the present invention, a measurement is made using a narrow pulse width (a pulse width of 20 ns) as a first measurement condition. If the reflected light intensity of a terminator is attenuated, a measurement is made using a wide pulse width (a pulse width of 100 ns) as a second measurement condition. As a result, when the first measurement condition is used, a clear distinction of an abnormality in the reflections of the reflected lights from the respective terminators can be made. In addition, when the second measurement condition is used, a distance to a point at which a failure has occurred can be calculated from the waveform with little noise. Therefore, the optical lines can be monitored with good accuracy.

Next is a description of processing by an optical line monitoring system according to a sixth embodiment of the present invention. The configuration of the optical line monitoring system according to the sixth embodiment and the configuration of the optical line monitoring apparatus 201 according to the sixth embodiment are similar to that of the optical line monitoring system according to the fourth embodiment (FIG. 13) and that of the optical line monitoring apparatus 201 (FIG. 14). Therefore, their description will be omitted.

The flow chart showing a flow of processing steps of the optical line monitoring apparatus 201 according to the sixth embodiment is much the same as that showing a flow of processing steps of the optical line monitoring apparatus 201 according to the fourth embodiment (FIG. 16), the difference lying in the processing in Step S208 of FIG. 16. In the sixth embodiment, the waveform of the multiplexed reflected lights received after emitting an optical signal using a first condition (an averaging time of 5 seconds, a pulse width of 20 ns) from the test apparatus 202 in the processing of Step S205 is the same as that of FIG. 18.

In Step S208 of the sixth embodiment, the averaging time setting portion 212a and the pulse width setting portion 212b direct the test apparatus 202 to use a second measurement condition to emit an optical signal to the optical line f201. In the sixth embodiment, the measurement was made under a condition with an averaging time of 144 seconds and a pulse width of 100 ns, as the second measurement condition.

The control portion 212 directs the test apparatus 202 to use the second measurement condition to emit an optical signal to the splitter 203. The test apparatus connection portion 213 acquires information with regard to a waveform of the returning lights (FIG. 21) received by the test apparatus 202.

Figure 21:
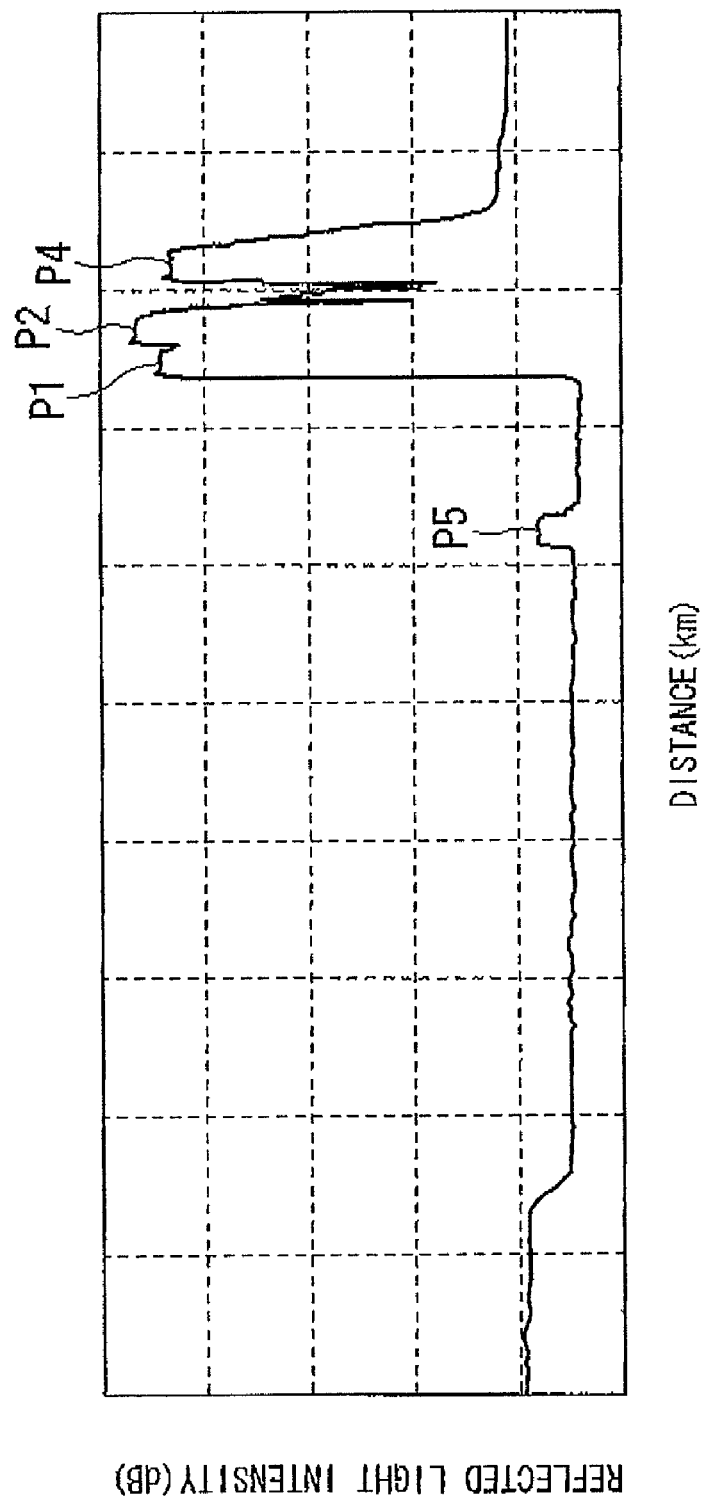
FIG. 21 shows one example of a waveform of an optical signal received by a test apparatus 2 in the event of a fault in the sixth embodiment of the present invention.

FIG. 21 shows one example of a waveform of an optical signal received by the test apparatus 202 in failure occurrence time in the sixth embodiment. The axis of abscissa represents a distance from the test apparatus 202, and the axis of ordinate represents a reflected light intensity. Compared with the measurement result with an averaging time set to 5 seconds as well as a pulse width set to 20 ns (FIG. 18), the measurement result with an averaging time set to 114 seconds as well as a pulse width set to 100 ns (FIG. 21) has still less noise, which is a fluctuation in waveform in the axis of ordinate direction, allowing clear distinction of the reflection abnormality P5 due to a failure in the optical line.

In the optical line monitoring system according to the sixth embodiment of the present invention, a measurement is made using a short averaging time of (an averaging time of 5 seconds) and a narrow pulse width (a pulse width of 20 ns) as a first measurement condition. If the reflected light intensity of a terminator is attenuated, a measurement is made using a long averaging time (an averaging time of 144 seconds) and a wide pulse width (a pulse width of 100 ns) as a second measurement condition. As a result, when the first measurement condition is used, a clear distinction of the reflected lights from the respective terminators can be made and a measurement time can be made short, compared with the fourth and fifth embodiments. In addition, when the second measurement condition is used, a distance to a point at which a failure has occurred can be calculated from the waveform with even less noise compared with that of the fourth and fifth embodiments. Therefore, the optical lines can be monitored with extremely good accuracy.

In the fourth, fifth, and six embodiments above, the combination of the length of an averaging time and the width of a pulse width is optional, but at least a selection to allow an easy detection of a failure under a second measurement condition is required.

In the fourth, fifth, and sixth embodiments described above, a program for implementing the functions or a part of the functions of the input portion 211, the control portion 212, the attenuation amount determination portion 212a, the averaging time setting portion 212b the pulse width setting portion 212c, the test apparatus connection portion 213, and the storage portion 214 of FIG. 14 may be recorded in a computer-readable recording medium, and a computer system may be allowed to read and execute the program recorded in this recording medium to control the optical line monitoring apparatus. Note that the term "computer system" here includes an OS and hardware such as peripheral equipment.

Furthermore, the term "computer-readable recording medium" denotes a portable medium such as a flexible disk, a magneto-optical disk, a ROM, a CD-ROM, or a storage device such as a hard disk drive built into the computer system. Furthermore, the term "computer-readable recording medium" also includes: one which dynamically retains a program for a short period of time like a communication wire when a program is output via a network such as the Internet or via a communications line such as a telephone line; and one which, in the former case, retains a program for a certain period of time like a volatile memory inside the computer system serving as a server or a client. In addition, the above-mentioned program may be for implementing a part of the above-mentioned functions. Furthermore, it may be one that can implement the above-mentioned functions in combination with a program already recorded in the computer system.

While the fourth, fifth, and sixth embodiments of the present invention have been described in detail above with reference to the drawings, the specific configurations of this invention are not limited to these embodiments. Designs or the like without departing from the spirit or scope of this invention are included in this invention.

Figure 22:
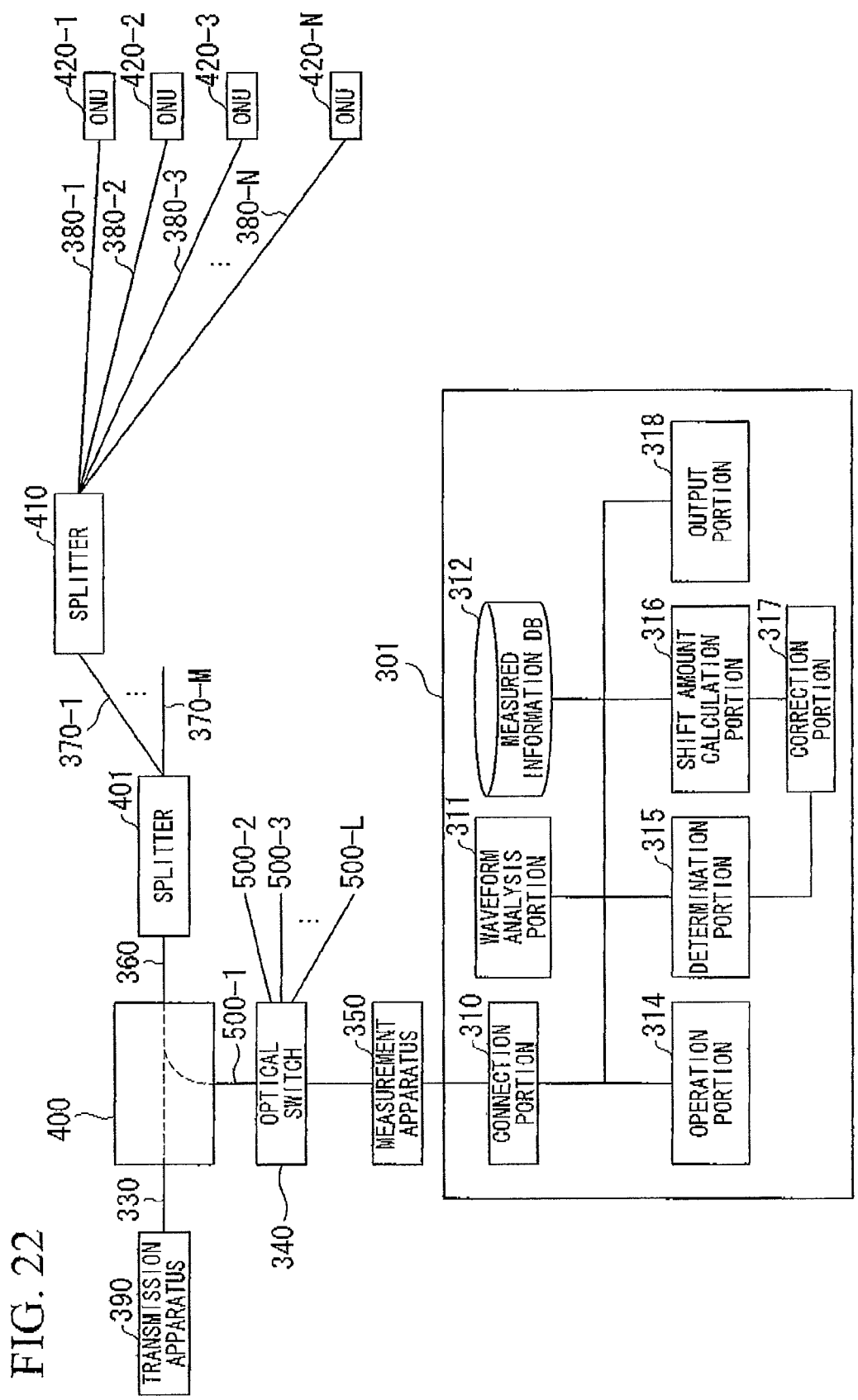
FIG. 22 is a block diagram showing a connective relationship among an optical transmission line monitoring apparatus and optical transmission lines connected to the apparatus in a seventh embodiment of the present invention.

Next is a description of a seventh embodiment of the present invention with reference to the drawings. FIG. 22 is a schematic block diagram showing an internal configuration of an optical transmission line monitoring apparatus 301 according to the seventh embodiment, and a connective relationship among optical transmission lines to be monitored by the optical transmission line monitoring apparatus 301, a measurement apparatus 350 for measuring light intensities in the optical transmission lines, equipment connected to the optical transmission lines, or the like.

In FIG. 22, the network of the optical transmission lines is of a PON-type, which is made of: an optical fiber 360; a splitter 401; optical fibers 370-1 to 370-M; a splitter 410; and optical fibers 380-1 to 380-N. To the ends of the optical fibers 380-1 to 380-N, there are respectively connected ONUs (Optical Network Units) 420-1 to 420-N or the like which are terminators utilized in the users' homes. Furthermore, each of the optical fibers 380-1 to 380-N is provided with an optical filter in the vicinity of the connection ends to the ONUs 420-1 to 420-N, the optical filter being with a Fiber Bragg. Grating (FBG) which causes a peak to arise in a waveform formed from a reflected light in response to an optical pulse incident from a later-described measurement apparatus 350.

Furthermore, the optical fiber lengths from the measurement apparatus 350 to the respective ONUs 420-1 to 420-N as the terminators are previously designed to be different when the optical fibers are deployed. Therefore, the peaks appearing in the waveform formed from the reflected lights occur at different positions for every terminator. Note that the returning lights which the measurement apparatus 350 receives include the reflected lights from all the terminators connected to the measurement apparatus 350.

The splitters 401, 410 are devices for branching or multiplexing optical signals, also called optical couplers. For example, the splitter 401 branches an optical signal from the optical fiber 360 into a plurality of optical fibers 370-1 to 370-M, and multiplexes optical signals from the plurality of optical fibers 370-1 to 370-M into the optical fiber 360. The number of branches in a general splitter is 4, 8, 16, and 32. It is possible to provide more branches by connecting splitters in a multistage.

A directional coupler (optical coupler) 400 has three connection terminals for connection with optical fibers. At each of the connection terminals, it is connected respectively to: an optical fiber 500-1 which is connected to the optical fiber 360 connected to the splitter 401; an optical fiber 500-1 which is connected to an optical switch 340; and an optical fiber 330 which is connected to a transmission apparatus 390. The directional coupler 400 performs multiplexing/demultiplexing with wavelength dependency to multiplex communication light incident from the transmission apparatus 390 via the optical fiber 330 and an optical pulse from the measurement apparatus 350 which is incident from the optical switch 340 via the optical fiber 500-1, and outputs the multiplexed communication light and optical pulse to the optical fiber 360. In addition, when the multiplexed communication light and optical pulse is incident via the optical fiber 360, the directional coupler 400 does not output the reflected wave of the communication light to the optical fiber 500-1, but to the optical fiber 330 connected to the transmission apparatus 390. As for the returning light of the optical pulse, the directional coupler 400 does not output it to the optical fiber 330, but to the optical fiber 500-1 connected to the optical switch 340.

At one end, the optical switch 340 is connected to the measurement apparatus 350. At the other end, it is connected to a plurality of optical transmission lines via optical fibers 500-1 to 500L and via directional coupler connected to the respective optical fibers. Thus, it connects any one connection terminal connected to one of the optical fibers 500-1 to 500-L with the connection terminal connected to the measurement apparatus 350, based on at input switching direction. Note that FIG. 22 shows a state in which the optical fiber 500-1 is selected.

The measurement apparatus 350 is for example an OTDR (Optical Time Domain Reflectometer). It launches an optical pulse signal into the optical fiber 360 via the optical switch 340 and the optical fiber 500-1, and receives returning light which has returned from the optical transmission line as a result of reflection, the returning light being multiplexed reflected lights from the ONUs 420-1 to 420-N. Furthermore, the measurement apparatus 350 measures a light intensity value of the received returning light, calculates a distance based on the time it has taken to receive the light, and outputs the measured light intensity value and the calculated distance as measurement information.

The optical transmission line monitoring apparatus 301 receives the measurement information with regard to the optical transmission lines, stores the received measurement information or previously stores normal measurement information, and detects the presence or absence of an abnormality due to a failure based on the stored measurement information after completion of the measurement. In the optical transmission line monitoring apparatus 301, a connection portion 310 is an interface for connection to the measurement apparatus 350. An operation portion 314 is connected to an input device such as a keyboard and a mouse. It detects a signal which is output by the input device having received an operation by the user, and inputs information corresponding to the detected signal. A output portion 318 is connected to for example a CRT (Cathode Light Tube) or a liquid crystal display. It displays a waveform formed from the measurement information received from the measurement apparatus 350, and when an abnormality has been detected, displays on a screen the information for notifying an occurrence of an abnormality.

A waveform analysis portion 311 performs waveform analysis processing such as a detection of a value on the distance axis at which a waveform peak formed from the measurement information read from a measured information DB 312 exists (hereinafter, also described as a peak position). Furthermore, the waveform analysis portion 311 associates the peak position detected by the waveform analysis processing or the like with the point of measurement, and writes it to the measured information DB 312 as peak information.

In the following description, of the pieces of information stored in the measured information DB 312, measurement information previously selected by the user as measurement information which has been measured when the optical transmission line is normal is described as measurement information in normal time, while measurement information which is measured by the measurement apparatus 350 at the time when a monitoring target is determined is described as monitoring target measurement information.

Furthermore, the analysis of a waveform peak by the waveform analysis portion 311 extracts a waveform portion (hereinafter, described as a measured waveform in normal time) from the waveform formed from the measurement information in normal time based on a threshold value on the light intensity axis for extracting a specific waveform portion including at least one waveform peak which is formed from the measurement information.

This threshold value is a value which is set based on the statistics using past measurement results. It may also be previously set by the user. Alternatively, it may be set as a value varying in correspondence to the measurement information such as a maximum light intensity value of the measurement information multiplied by a given rate. Alternatively, it may be set in the waveform analysis portion 311 through the operation by the user with reference to the waveform displayed on the screen by the output portion 318.

Here, the method of finding a peak position is: for example, in a waveform formed from sampled measurement information, the waveform is differentiated for every sampling point to calculate gradients, and a point at which the value of the gradient changes from a positive value to a negative value is found as a peak position. A peak position may be found at a position on the distance axis for the point at which a maximum light intensity value has been measured, in a range which successively exceeds the above threshold value. Any search method is permissible as long as it can find a peak position.

The measured information DB (Data Base) 312 stores: the measured information in normal time which is the measured information received from the measurement apparatus 350 via the connection portion 310; the monitoring target measurement information; and the peak information in normal time which is input from the waveform analysis portion 311, the peak information in normal time corresponding to the measurement information in normal time. As this peak information in normal time, the measured information DB 312 stores: reference priority numbers; distances from the measurement apparatus 350 to each measurement point; initial peak positions of waveforms respectively by a reflected light from the measurement point; and correction range widths, in a table form in which they are associated with measurement point names, as shown in FIG. 23. The reference priority numbers are assigned for the measurement points in ascending order of easiness to detect a waveform. They may be assigned for example by the user based on the statistics using past measurement results. Alternatively, they may be specified by the waveform analysis portion 311 according to a distance to the measurement point, a maximum light intensity for every measurement 6 point, a half-value width of the peak for every measurement point, or the like.

The correction range width is a width of a range in which a displacement in peak position may occur due to an extension/contraction of an optical fiber resulting from a change in temperature, engineering work, or the like, that is, a width of a correction range (hereinafter, also described as a correction region). It is a predetermined width previously specified by the user. In addition, the waveform analysis portion 311 may calculate this correction range width, for example by multiplying a distance of an optical fiber by an extension/contraction rate of the optical fiber with respect to a temperature change, the optical fiber being from the measurement apparatus 350 to one of the ONUs 420-1 to 420-N, as the case may be.

The shift amount calculation portion 316 calculates a shift amount for correcting a displacement due to an extension/contraction of an optical fiber based on the peak information with regard to the monitoring target measurement information input from the waveform analysis portion 311 and on the peak information in normal time read from the measured information DB 312. Note that the waveform corresponding to the measured waveform in normal time is defined as the waveform formed from the monitoring target measurement information present in a correction region for every measurement point (hereinafter, also described as a monitoring target measurement waveform). The correction region is shown in FIG. 25 as a range whose region edges are a correction region edge 1001-1 and a correction region edge 1001-2 across an initial peak distance 1101.

A correction portion 317 corrects the distance value of the monitoring target measurement information based on the shift amount calculated by the shift amount calculation portion 316, and takes it as correction monitoring target measurement information.

The determination portion 315 compares the peak of a waveform formed from the correction monitoring target measurement information (hereinafter, also described as a correction monitoring measurement waveform) with the peak of the measured waveform in normal time to determine whether or not the peak of the correction monitoring target measurement waveform is normal.

Figure 24:
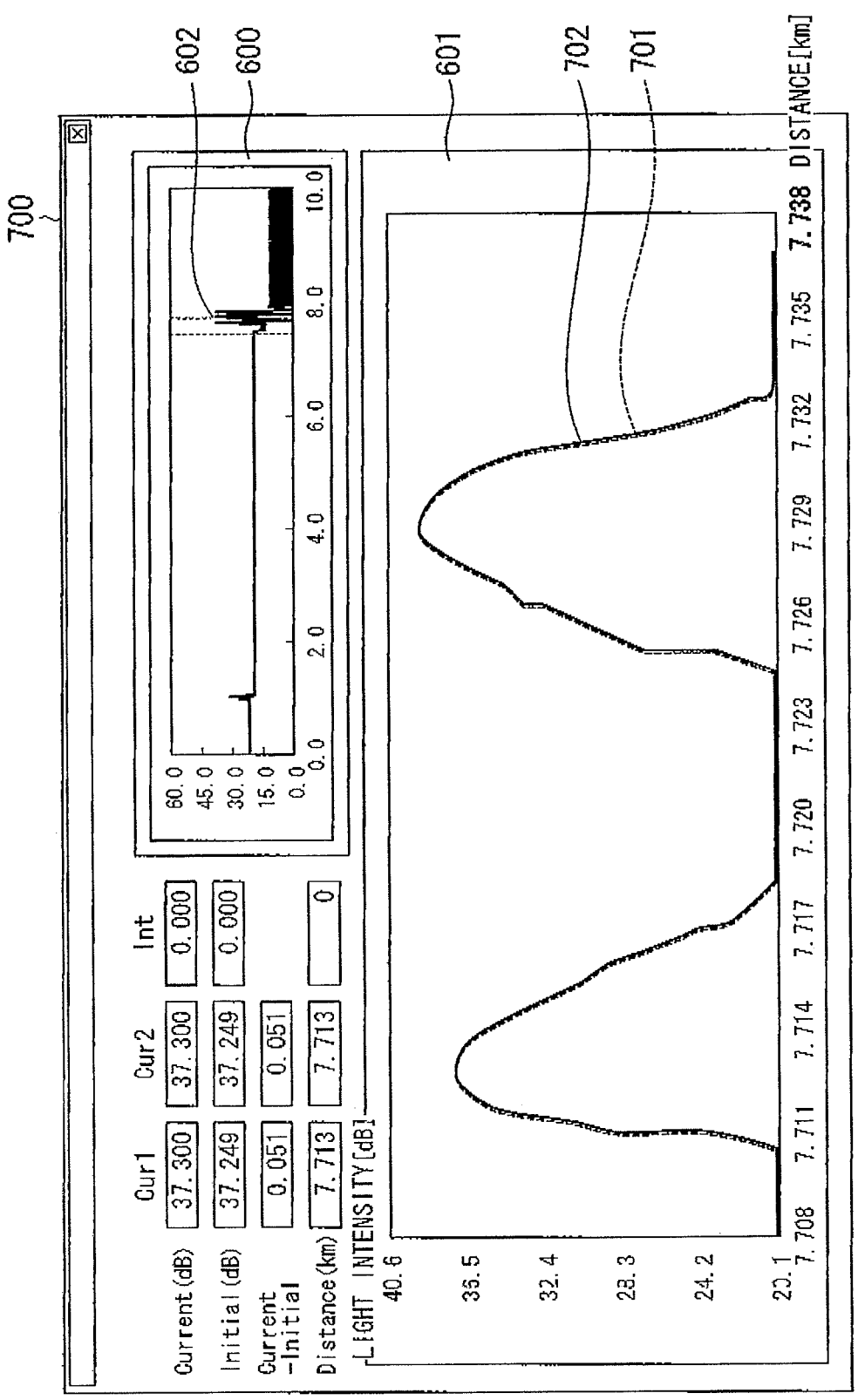
FIG. 24 shows an example of a waveform formed from measured information in the seventh embodiment.
Figure 25:
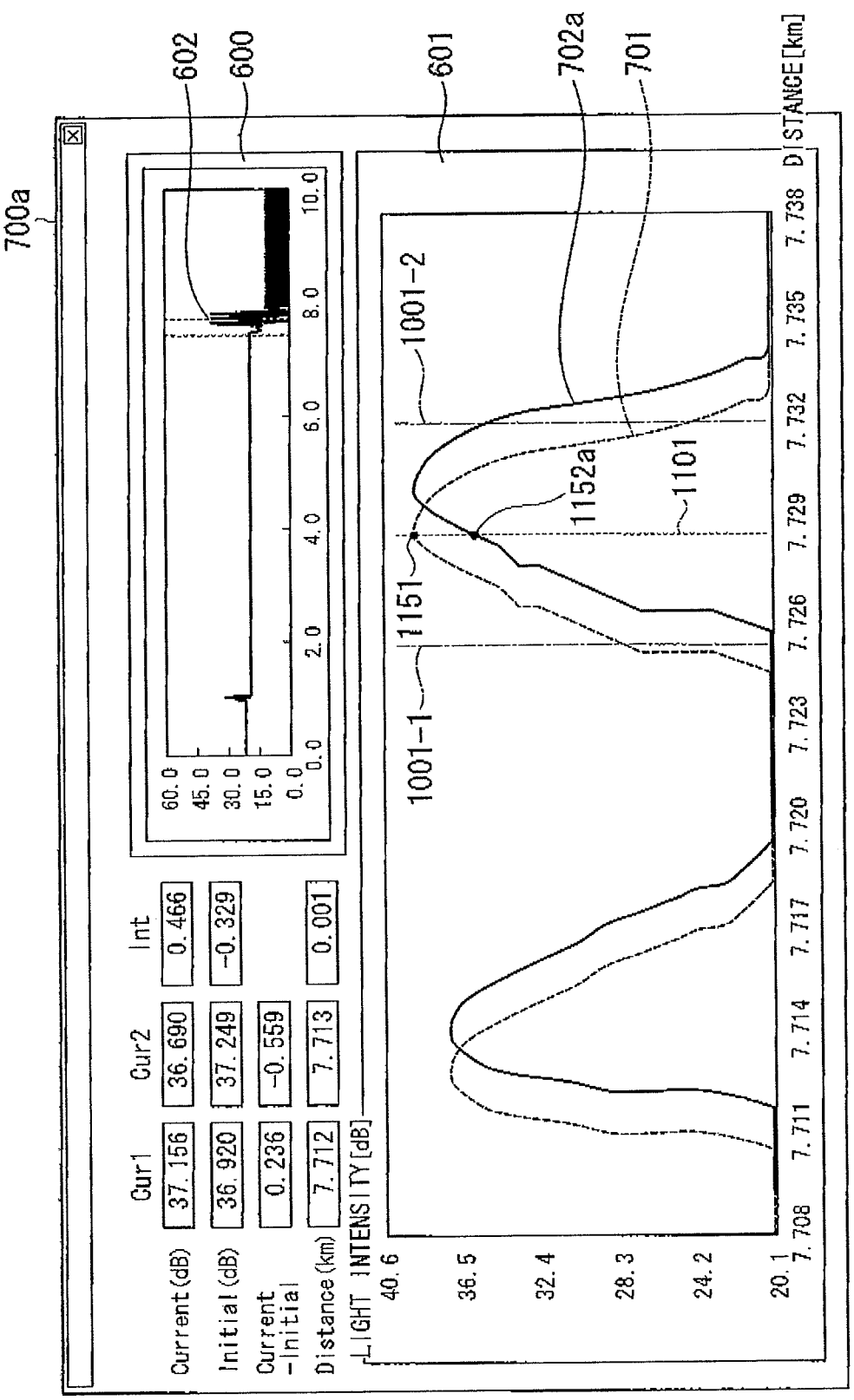
FIG. 25 shows an example of a waveform in the case of an optical fiber with an extension/contraction in the seventh embodiment.

Next is a description of a difference in waveform formed from the measurement information when an extension/contraction has occurred in an optical fiber, with reference to FIG. 24 and FIG. 25. FIG. 24 and FIG. 25 respectively show a state where the output portion 318, in which a waveform display direction signal has been input through the operation on the operation portion 314 by the user, reads the measurement information in normal time and the monitoring target measurement information from the measured information DB 312, and displays on screen a waveform formed from the respective pieces of the measurement information which has been read.

A waveform display screen 700 shown in FIG. 24 has two regions for displaying waveforms: a partial measured information display region 601 and an entire measured information display region 600. In the partial measured information display region 601, a measured waveform in normal time 701 formed from the measurement information in normal time and a monitoring target waveform 702 formed from the monitoring target measurement information are displayed. A waveform formed from the monitoring target measurement information is displayed in the respective regions, with the axis of abscissa representing the distance and the axis of ordinate representing the light intensity. In the entire measured information display region 600, a waveform formed from both of the measurement information in normal time and the monitoring target measurement information is displayed.

The relationship between the partial measured information display region 601 and the entire measured information display region 600 is that when the user operates the mouse or the like in the entire measured information display region 600 to set a region frame 602 based on the information input by the operation portion 314 which has received the operation, the waveform of the measurement information in normal time included in the set region frame 602 and the waveform of the monitoring target measurement information are displayed in the partial measured information display region 601 by the output portion 318.

FIG. 24 shows a case where there is no extension/contraction in an optical fiber. The measured waveform in normal time 701 formed from the measurement information in normal time and the monitoring target waveform 702 formed from the monitoring target measurement information substantially overlap with each other. The difference between the light intensity value at a peak position of the measured waveform in normal time 701 and the light intensity value at the relevant position of the monitoring target waveform 702 is substantially zero. Therefore, the difference in light intensity value does not exceed a peak abnormality detection threshold value. As a result, the relevant peak position of the monitoring target measurement information will not be detected as abnormal.

FIG. 25 shows a case where an optical fiber is extended. Compared with the measured waveform in normal time 701, a monitoring target waveform 702a has a waveform peak at a distance longer than that of the measured waveform in normal time 701.

For example, as for the measured waveform in normal time 701, a peak occurs at a distance with a value designated by an initial peak distance 1101, and hence the peak has a light intensity value designated by reference numeral 1151. On the other hand, as for the monitoring target waveform 702a, a light intensity value on the distance axis designated by the initial peak distance 1101 is a value designated by reference numeral 1152a because the peak occurs at a displaced location. As a result, if the difference between these light intensity values exceeds the peak abnormality detection threshold value, the monitoring target measurement information is determined as abnormal at a distance of the initial peak distance 1101. However, in this case, the extension of the optical fiber has only caused a displacement in position on the distance axis, which means that no abnormality has occurred in actuality. Therefore, this is an erroneous detection.

Here, it is known property that even if an optical fiber is extended/contracted, there is no difference in waveform between the Monitoring target waveform 702a in which the peak position is displaced due to an extension/contraction and the measured waveform in normal time 701 except a displacement by a given amount of distance, in the case where the same measurement apparatus 350 is used to launch optical pulses at the same intervals. Therefore, processing for preventing an erroneous detection due to an extension/contraction of an optical fiber in consideration of this property will be described below by way of two processes: preliminary process and abnormality detection process, with reference to FIG. 26 to FIG. 28.

Figure 26:
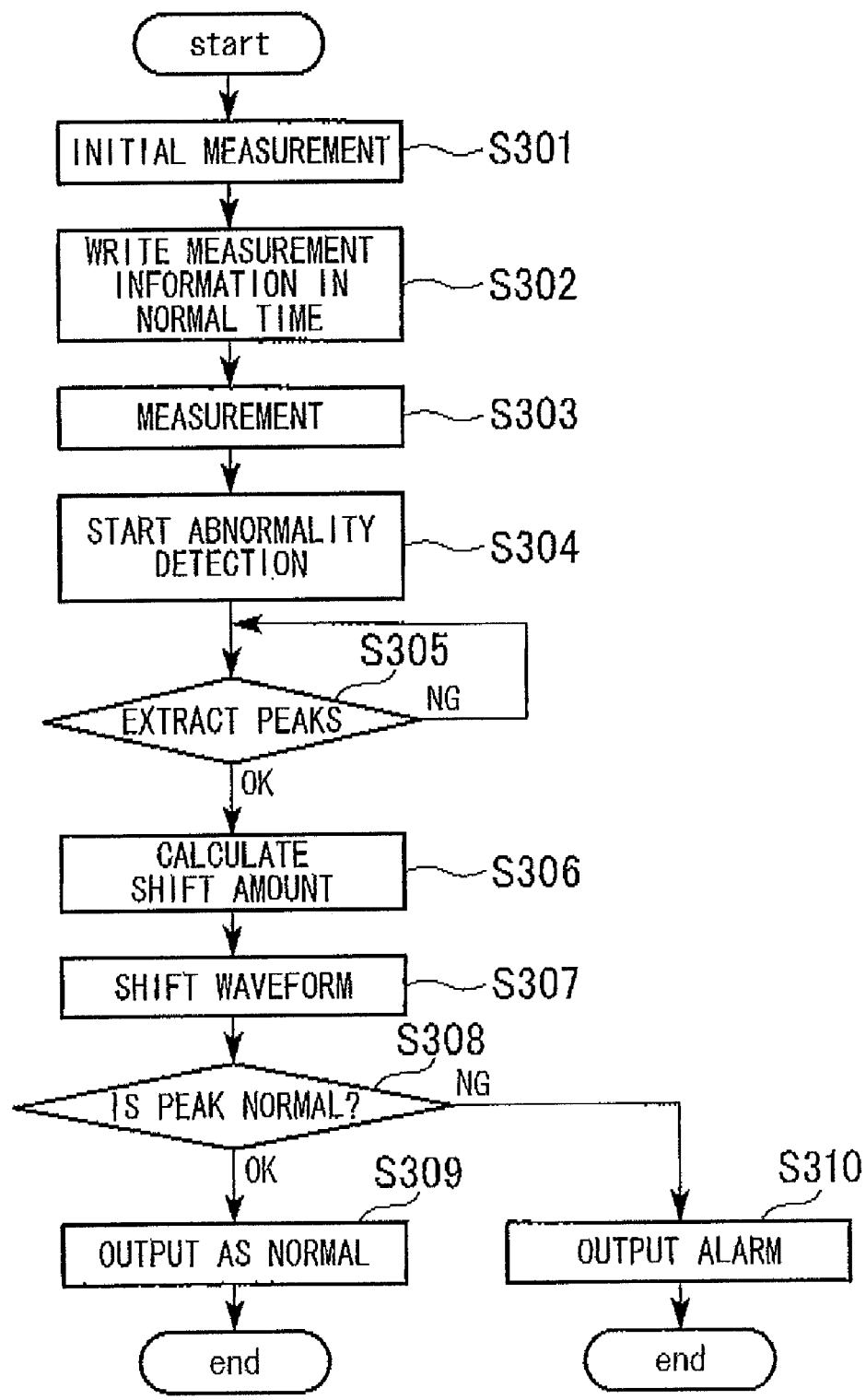
FIG. 26 is a flow chart showing processing steps of the optical transmission line monitoring apparatus in the seventh embodiment.
Figure 27:
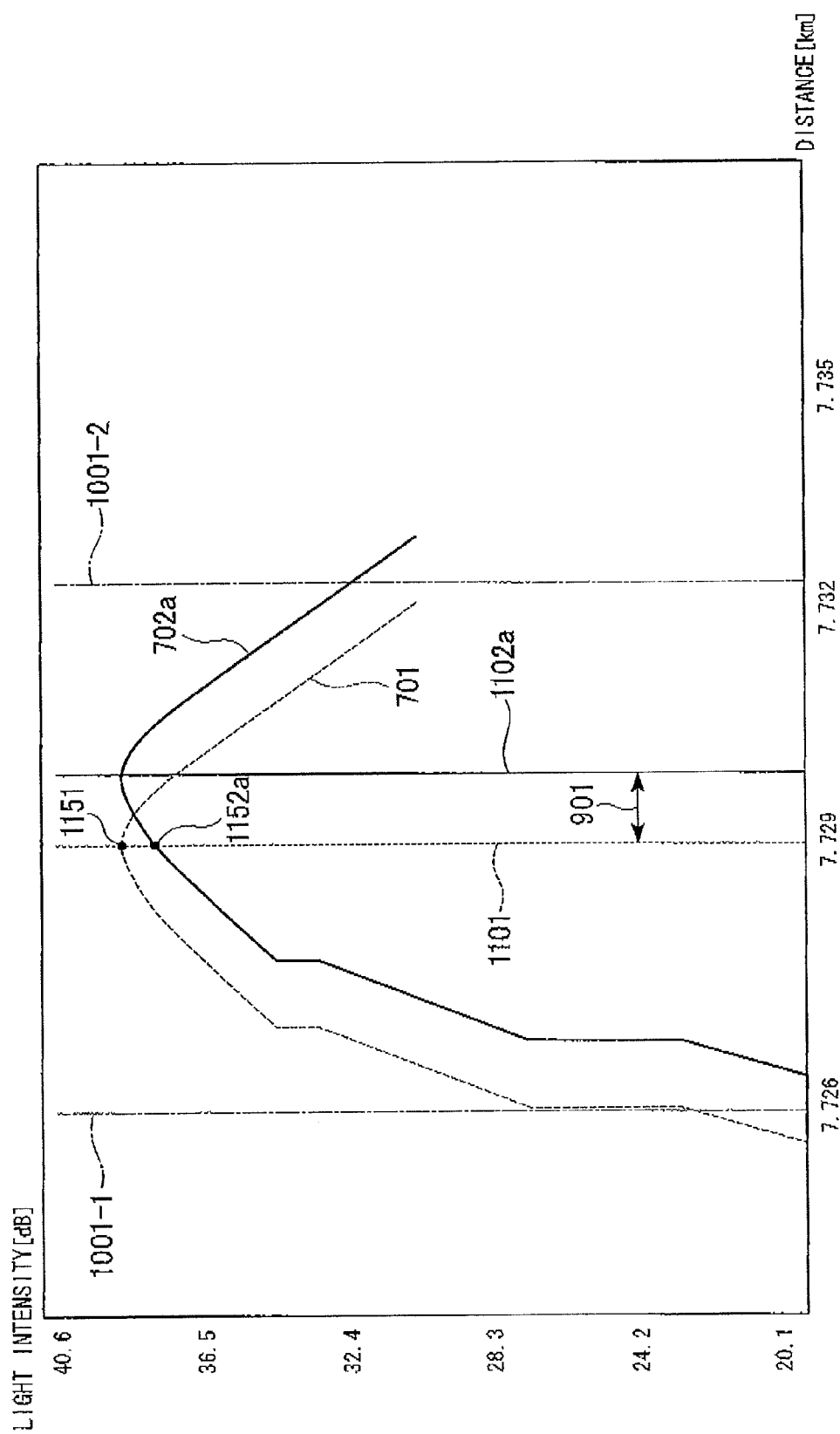
FIG. 27 is a diagram for explaining a calculation device for a shift amount in the seventh embodiment.

FIG. 26 is a flow chart showing processing for preventing an erroneous detection due to an extension/contraction of an optical fiber in the optical transmission line monitoring apparatus 301. FIG. 27 shows an enlarged view of apart of a waveform displayed in the partial measured information display region 601 on the waveform display screen 700a in FIG. 25. Moreover, FIG. 27 shows one example of a waveform which allows an abnormality detection by use of the optical transmission line monitoring apparatus 301 of the seventh embodiment.

<Preliminary Process>

First, a preliminary process for previously recording measurement information serving as a normal value in the measured information DB 312 will be described.

An operation on the operation portion 314 by the user transmits an initial measurement start command signal for making an initial measurement to the measurement apparatus 350 via the connection portion 310. On receiving the initial measurement start command signal, the measurement apparatus 350 launches an optical pulse into the optical fiber 360 of the optical transmission lines via the optical switch 340 and the optical fiber 500-1, and then receives returning light which has returned from the optical transmission lines as a result of reflection, the returning light being multiplexed reflected lights from the ONUs 420-1 to 420-N. The measurement apparatus 350 measures a light intensity value of the received returning light, calculates a distance based on the time it has taken to receive the light and transmits the measured light intensity value and the calculated distance to the optical transmission line monitoring apparatus 301 as measurement information in normal time (Step S301).

On receiving the measurement information in normal time, the connection portion 310 outputs the received measurement information in normal time to the waveform analysis portion 311. The waveform analysis portion 311 detects analysis information such as a position of a peak of the received measured waveform in normal time or the like, and causes the output portion 318 to display the analysis information. The waveform analysis portion 311 writes to the measured information DB 312: peak information in normal time in which a waveform peak according to one or more pieces of analysis information serving as a reference, which is selected by the user operating on the operation portion 314, is associated with the reference priority number denoting the order of priority of the peak; the detected analysis information; and the measurement information in normal time (Step S302).

Here, the peak information in normal time is defined as information made of: the reference priority numbers; measurement point names; distances to the respective measurement points; initial peak position distances analyzed by the waveform analysis portion 311; and correction region widths respectively denoting a range of a correction region. For a correction region width, a distance between the two correction region edges is specified so that, in FIG. 25, an absolute value of a value of the correction region edge 1001-2 on the distance axis subtracted from a value of the correction region edge 1001-1 on the distance axis is equal in value to the correction region width.

<Abnormality Detection Process>

Next is a description of an abnormality detection process. As in the similar operation as in Step S301, the measurement apparatus 350 launches optical pulses in a predetermined cycle specified by the user, and then receives a multiplexed reflected lights from the ONUs 4201 to 420-N. The measurement apparatus 350 transmits a light intensity value measured from the received returning lights and a distance calculated based on the time it has taken to receive the light to the optical transmission line monitoring apparatus 301 as monitoring target measurement information. In the optical transmission line monitoring apparatus 301, the connection portion 310 writes the received monitoring target measurement information to the measured information DB 312 (Step S303). As described above, the monitoring target measurement information which is transmitted from the measurement apparatus 350 as occasion arises is written to the measured information DB 312, and thereby the measured information DB 312 is kept updated.

An abnormality detection start command signal for conducting an abnormality detection is output to the waveform analysis portion 311 by the user operating on the operation portion 314 (Step S304).

When the abnormality detection start command signal is input, the waveform analysis portion 311 reads from the measured information DB 312: the measurement information in normal time; the peak information in normal time; and the monitoring target measurement information which is identified by the information included in the abnormality detection start direction signal. The waveform analysis portion 311 detects analysis information such as a position of a peak of the monitoring target measurement waveform or the like. The waveform analysis portion 311 outputs the peak information in normal time, the monitoring target analysis information, and the monitoring target measurement information to the shift amount calculation portion 316.

The shift amount calculation portion 316 extracts a measurement point with the smallest reference priority number from the peak information in normal time which has been input, and extracts a monitoring target peak from the monitoring target analysis information after associating the monitoring target peak with the correction region set at this measurement point (Step S305).

If no peak is detected from the correction region at the measurement point which is intended to be used as the measured waveform in normal time due to lowering of a reflection level, a break in a fiber, or the like, the shift amount calculation portion 316 adds 1 to the reference priority number, and repeats Step S305 until a monitoring target peak is detected from the correction region.

The shift amount calculation portion 316 calculates a shift amount 901 shown in FIG. 27, which signifies a displacement in position from the initial position. It then outputs this shift amount 901 and the monitoring target measurement information to the correction portion 317 (Step S306).

A property is known that measured waveforms show no difference in waveform except for a displacement by a given amount of distance even if the cable is extended/contracted due to a temperature change or engineering work. In consideration of this property, the shift amount calculated in Step S306, which signifies a displacement in position between the monitoring target peak and the initial peak, is used as a reference value for correcting a displacement in all the other measurement points, enabling the correction of the monitoring target waveform 702. This provides an advantage in that a correct abnormality detection can be made irrespective of the extension/contraction of a cable.

A method of calculating the shift amount 901 in Step S306 will be specifically described with reference to FIG. 27.

The shift amount calculation portion 316 sets the correction region edge 1001-1 and the correction region edge 1001-2 so as to include the initial peak distance 1101 as shown in FIG. 27, and also sets the correction region edge 1001-1 and the correction region edge 1001-2 at such positions as to make the distance between them equal to the correction region width. The shift amount calculation portion 316 detects a measured peak distance 1102a as a peak position of a monitoring target waveform 702a within the range from the correction region edge 1001-1 to the correction region edge 1001-2, as shown in FIG. 21. The shift amount calculation portion 316 subtracts the initial peak distance 1101 from the detected measured peak distance 1102a to calculate the shift amount 901.

The positional relationship on the distance axis among the correction region edge 1001-1, the initial peak distance 1101, and the correction region edge 1001-2 may be a positional relationship previously set by the user in which the position on the distance axis of the correction region edge 1001-1 is set at a position at which a distance from the initial peak distance 1101 is a value which is set based on the statistics from past measurement results, for example a value derived by multiplying the correction region width by a given rate, or may be set in the shift amount calculation portion 316 through the operation by the user with reference to the waveform displayed on the screen by the output portion 318.

The correction portion 317 shifts the monitoring target measurement waveform which has been input, in accordance with the shift amount 901, and outputs it as corrected monitoring target measurement information to the waveform analysis portion 311 (Step S307).

When the corrected monitoring target measurement information is input, the waveform analysis portion 311 outputs the peak information in normal time, the measurement information in normal time, and the corrected monitoring target measurement information to the determination portion 315.

The determination portion 315 determines whether or not the peaks of the corrected monitoring target measurement waveform have an abnormality for every measurement point of the peak information in normal time which has been input (Step S308). If determining that the waveform has no abnormality, the determination portion 315 outputs a determination result that the pieces of measurement information at the relevant measurement points are normal to the output portion 318, and terminates the processing (Step S309). If determining that the waveform has an abnormality, the determination portion 315 outputs an alarm and determination result that the piece of the measurement information at the relevant measurement point is abnormal to the output portion 318, and terminates the processing (Step S310).

A determination method in Step S308 is performed by, for example, the following operations. The determination portion 315 calculates a difference obtained by subtracting the light intensity values of the corrected monitoring target measurement information at an initial peak position from the light intensity values, at the initial peak position, of the reflected lights from the respective measurement points in the waveform formed from the measurement information in normal time.

Next the determination portion 315 determines whether or not the calculated differences in light intensity value exceed a predetermined threshold value for detecting a peak abnormality. If detecting that a difference in light intensity value at the measurement information in normal time exceeds the threshold value for detecting a peak abnormality, the determination portion 315 determines it as abnormal.

This threshold value for detecting a peak abnormality is a value which is set based on the statistics using past measurement results. It may be previously set by the user. Alternatively, it may be set as a value varying in correspondence to the measurement information such as a maximum light intensity value of the measurement information multiplied by a given rate specified by the user based on the statistics using past measurement results.

Figure 28:
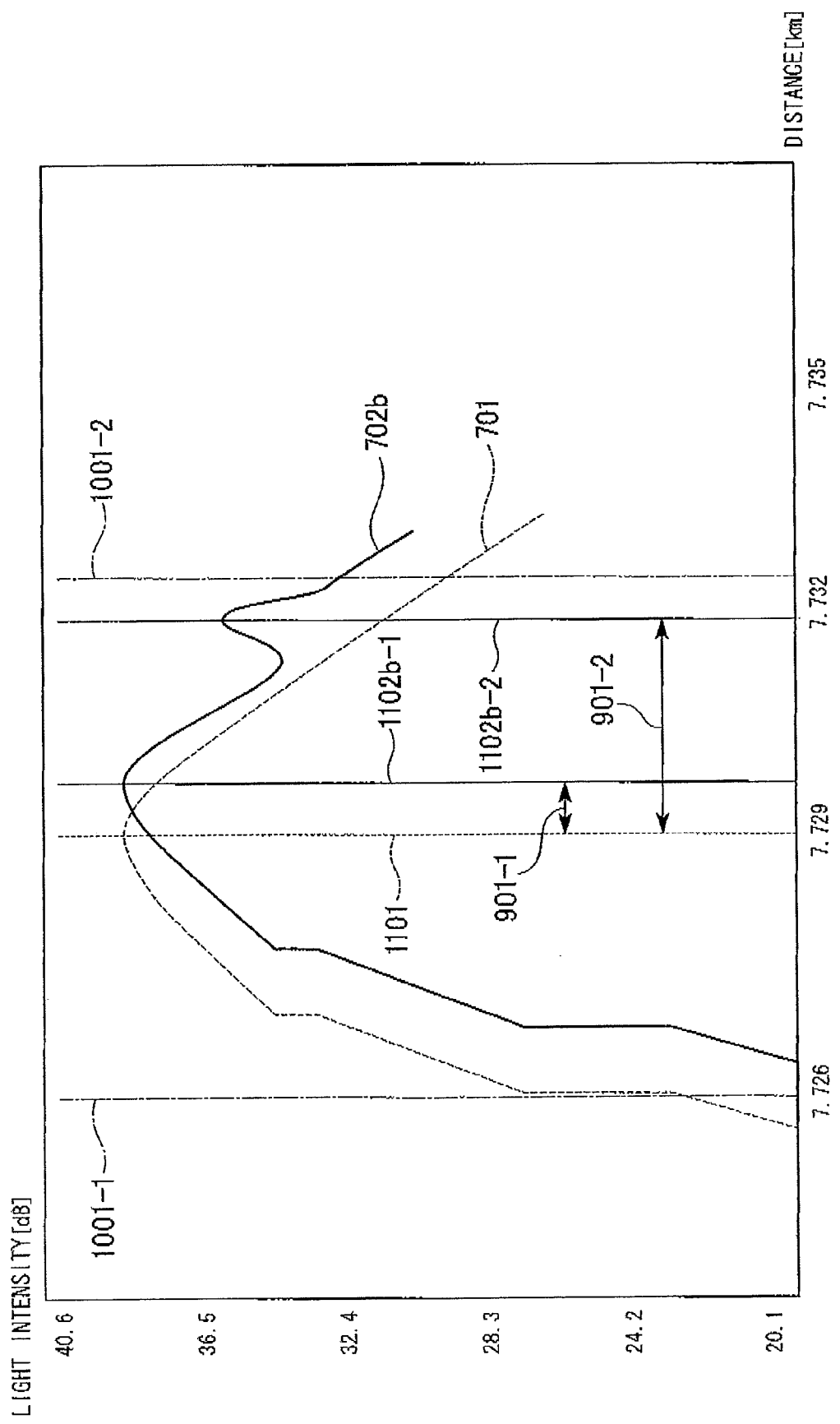
FIG. 28 is a diagram for explaining a calculation device for a shift amount when peaks are closely present in the seventh embodiment.

Next is a description of operations for calculating the shift amount in Step S307 in the case where a plurality of peaks are detected in the correction range due to engineering work or the like, with reference to FIG. 28. FIG. 28 is an enlarged view of a part of the partial measured information display region 601 in the case where two peaks are detected in the monitoring target waveform 702b.

The shift amount calculation portion 316 detects a measured peak distance 1102b-1 and a measured peak distance 1102b-2 as the peak positions of the monitoring target waveform 702b within a correction range from a correction region edge 1001-1 to a correction region edge 1001-2, as shown in FIG. 28.

The shift amount calculation portion 316 calculates a shift amount 901-1 by subtracting an initial peak distance 1101 from the detected measured peak distance 1102b-1, and a shift amount 901-2 by subtracting the initial peak distance 1101 from the measured peak distance 1102b-2. The shift amount calculation portion 316 compares the calculated shift amount 901-1 with the calculated shift amount 901-2, and outputs the shift amount 901-1, the value of which is closer to 0, to the correction portion 317 as a correct shift amount.

Note that the shift amount is output, regarding the measured peak distance 1102b-1, which is closer to the initial peak distance 1101, as the shifted version of the peak in normal time. However, other than this method, the shift amount may be calculated as follows: let the light intensity of the measured waveform in normal time 701 at the initial peak distance 1101 be a reference light intensity, the light intensities at the measured peak distance 1102b-1 and measured peak distance 1102b-2 of the monitoring target waveform 702b are found, and one for which a difference value obtained by subtracting the reference light intensity is the closer to 0 is regarded as the shifted version of the peak in normal time.

Furthermore, as a calculation method for the shift amount other than these, applicable methods include: a method using an average of the shift amounts at two or more measurement points; and a method of calculating shift amounts for every measurement point according to the ratio of the shift amount to the distance at the measurement point.

There is a case where after engineering work, the peaks of the reflecting waves from the ONUs 420-1 to 420-N are close to each other, resulting in a plurality of peaks within the correction range. However, according to the above methods of calculating a shift amount, an advantage of allowing prevention of an erroneous operation of the monitoring apparatus is offered even in such a case.

In the seventh embodiment, the reflected lights from the ONUs 420-1 to 420-N are described as the returning lights, by way of example. However, as the returning lights, the following may be used: reflected lights from the connection points and splicing points of the optical fibers 360, 370-1 to 370-M, and 380-1 to 380-N; reflected lights from the splitters 401 and 410, and from the above-described optical fiber with an FBG; or backscattering lights by the Rayleigh scattering inherent in the optical fibers 360, 370-1 to 370-M, and 380-1 to 380-N.

Furthermore, in the seventh embodiment, the determination portion 315 determines whether or not the difference in light intensity value between the measurement information in normal time and the monitoring target measurement information exceeds the threshold value for detecting a peak, to thereby determine whether or not the monitoring target measurement waveform is abnormal. However, to determine whether or not the monitoring target measurement waveform is abnormal, it may use a method of calculating a value of a waveform width at a peak portion extracted from the measured waveform in normal time and a value of a waveform width of a waveform portion extracted from the monitoring target measurement waveform to determine whether the difference in value between the calculated waveform widths exceeds a predetermined threshold value for detecting a waveform width abnormality or not. Alternatively, it may combine a determination by a threshold value for detecting a peak abnormality and a determination by a threshold value for detecting a waveform width abnormality. Alternatively, it may use an existing abnormality determination method.

To be more specific, the determination by this threshold value for detecting a waveform width abnormality is performed in the following procedure.

The determination portion 315 extracts a waveform portion of the measured waveform in normal time 701 and a waveform portion of the monitoring target waveform 702 based on a predetermined threshold value for identifying a waveform portion. The determination portion 315 then calculates respective waveform widths of the extracted waveform portions.

This threshold value for identifying a waveform portion is a value which is set based on the statistics using past measurement results. It may be previously set by the user. Alternatively, it may be set as a value varying in correspondence to the measurement information, for example a value of 50% of the maximum light intensity value of the measurement information. Alternatively, it may be set in the determination portion 315 through the operation by the user with reference to the waveform displayed on the screen by the output portion 318.

Figure 29:
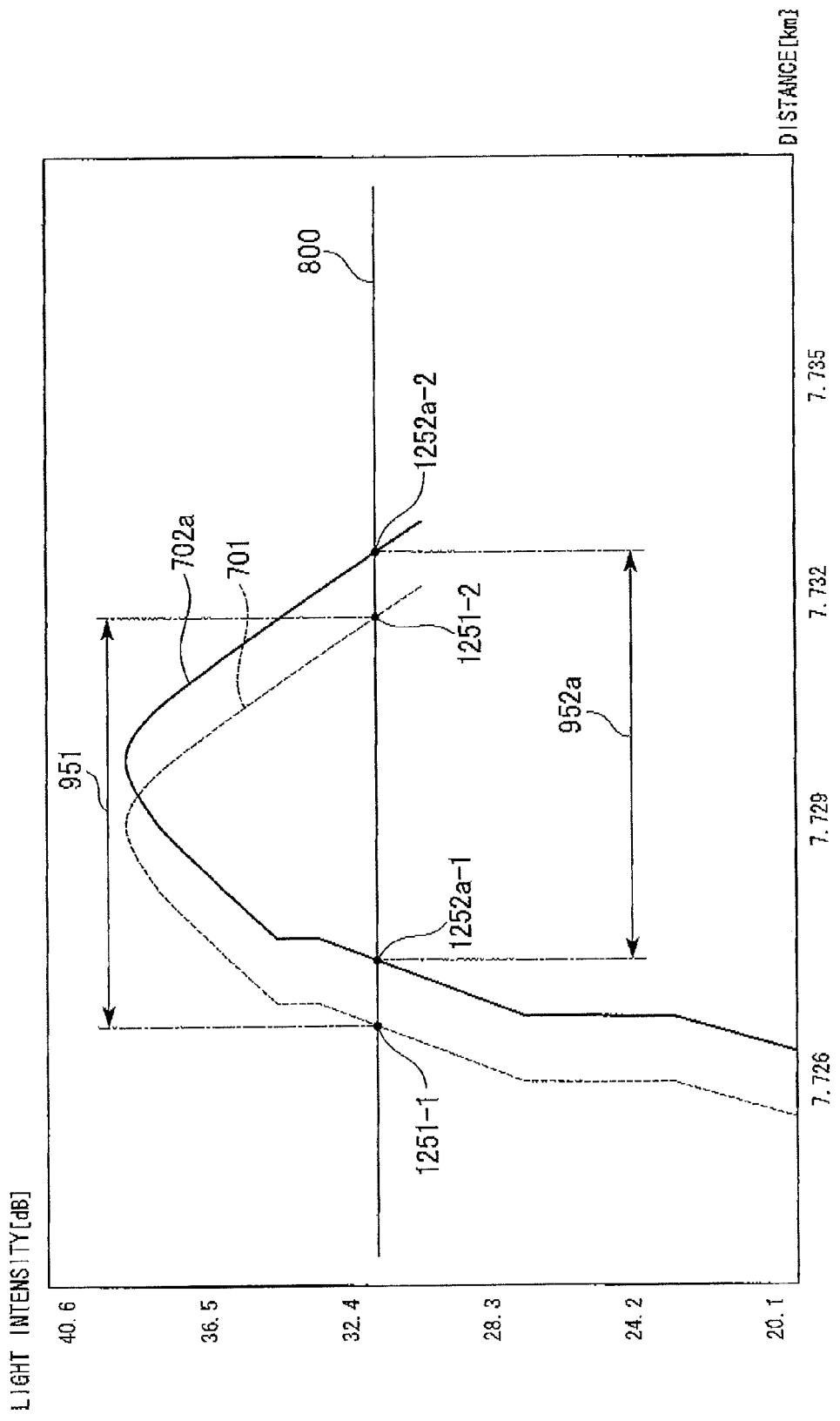
FIG. 29 is a diagram for explaining a calculation device for a waveform width in the seventh embodiment.

To be more specific, as shown in FIG. 29, the determination portion 315 detects an intersection 1251-1 and an intersection 1251-2 between a light intensity value (reference numeral 800) of the threshold value for identifying a waveform portion and the measured waveform in normal time 701 of the measurement information in normal time, calculates the difference obtained by subtracting the value on the distance axis of the intersection 1251-1 from the value on the distance axis of the intersection 1251-2, and takes the calculated difference as a width of the waveform (a waveform width 951). Furthermore, as for a monitoring target waveform 702a, the determination portion 315 similarly detects an intersection 1252a-1 and an intersection 1252a-2 between a light intensity value (reference numeral 800) of the threshold value for identifying a waveform portion and the monitoring target waveform 702a, calculates the difference obtained by subtracting the value on the distance axis of the intersection 1252a-1 from the value on the distance axis of the intersection 1252a-2, and takes the calculated difference as a width of the waveform (a waveform width 952a).

Then, the determination portion 315 determines whether or not the peak has a failure by determining the difference obtained by subtracting the calculated waveform width 952a from the calculated waveform width 952a exceeds the aforementioned threshold value for detecting a waveform width. If detecting that the calculated difference in waveform width exceeds the threshold value for detecting a waveform width, the determination portion 315 determines it as abnormal. If detecting that the calculated difference in waveform width does not exceed the threshold value for detecting a waveform width, the determination portion 315 determines that there is no abnormality, that is, determines it as normal.

With the above configuration of the seventh embodiment, even if there is an extension/contraction in an optical fiber, it is possible to correct a displacement in position at which a peak occurs. Therefore, an abnormality of an optical fiber can be correctly detected based on light intensity values, making it possible to prevent an erroneous detection.

Furthermore, a peak distance of a specific waveform portion obtained from a waveform in normal time is compared with a peak distance of a specific waveform portion obtained from a waveform in monitoring target time, to thereby make it possible to calculate a shift amount for correcting a displacement due to an extension/contraction in an optical fiber and correct the displacement. Moreover, the light intensity values at a position where the waveform peak in normal time appears are compared, to thereby make it possible to correctly detect whether or not a failure has occurred.

While the measurement information to be monitored has been described in the aforementioned seventh embodiment as being previously stored in the measured information DB 312, the present invention is not limited to this. The as-is measurement information received from the measurement apparatus 350 via the connection portion 310 may be used as the monitoring target measurement information.

Furthermore, the present invention may have any configuration as long as it utilizes the property that the shape of a waveform does not change even if there is an extension/contraction in an optical fiber. For example, the configuration in which the entire waveforms are compared may be used.

Furthermore, in the above seventh embodiment, the optical transmission lines have been described as PON-type optical transmission lines, by way of example. However, the present invention is not limited to this. The present invention is also applicable to optical transmission lines with a star topology, or the like.

The first detection device and the second detection device described in the present invention correspond to the waveform analysis portion 311. The shift amount calculation device described in the present invention corresponds to the shift amount calculation portion 316. The correction device corresponds to the correction portion 317. The first determination device and the second determination device correspond to the determination portion 315. The first output device and the second output device correspond to the output portion 318. The threshold value calculation device corresponds to the threshold value calculation portion 313.

The aforementioned optical transmission time monitoring apparatus 301 has a computer system inside it. The aforementioned processing of calculating a width of a waveform, the aforementioned processing of correcting a displacement due to an extension/contraction in an optical fiber, and the aforementioned processing of detecting an abnormality are stored in a computer-readable recording medium in the form of a program. The above processing is performed by the computer reading and executing this program. Here, a computer-readable recording medium denotes a magnetic disk, a magneto-optical disk, a CD-ROM, a DVD-ROM, a semiconductor memory, or the like. Furthermore, it may be configured such that this computer program is distributed to a computer via a communications line to allow the computer which has received this distribution to run the program.

What is claimed is:

1. An optical fiber line automatic monitoring system which selects an optical fiber within an optical fiber line and observes an OTDR waveform by injecting a test optical pulse into the selected optical fiber, to thereby determine a failure location, comprising:
   an alarm signal reception portion which receives information with regard to an optical fiber with a failure as an alarm signal from a network monitoring apparatus which detects a communication error;
   an optical switch which is configured to switch between optical fibers to select one of the optical fibers into which a test optical pulse is to be injected;
   a test target optical fiber selection portion which identifies, based on failure occurrence information included in the alarm signal received by the alarm signal reception portion, the optical fiber with a failure, and selects a test target optical fiber using the optical switch;
   an optical fiber test portion which injects a test optical pulse into the optical fiber selected by the test target optical fiber selection portion to observe an OTDR waveform; and
   an optical fiber failure location determination portion which determines a location of failure in the optical fiber based on a test result by the optical fiber test portion.

2. The optical fiber line automatic monitoring system according to claim 1, wherein the network monitoring apparatus comprises:
   a monitoring unit signal reception portion which is provided in a predetermined optical signal transmission apparatus in an optical fiber line network which receives equipment monitoring information with regard to the optical signal transmission apparatus from a monitoring unit which monitors equipment operational states in the optical signal transmission apparatus; and
   an alarm signal transmission portion which transmits, as an alarm signal, information with regard to a communication network determined as abnormal based on the equipment monitoring information received by the monitoring unit signal reception portion to the optical fiber line automatic monitoring apparatus.

3. An optical fiber line automatic monitoring system which selects an optical fiber within an optical fiber line and observes an OTDR waveform by injecting a test optical pulse into the selected optical fiber, to thereby determine a failure location, comprising:
   a monitoring unit signal reception portion which receives equipment monitoring information with regard to a predetermined optical signal transmission apparatus from a monitoring unit provided in the optical signal transmission apparatus in an optical fiber line network, which monitors equipment operational states in the optical signal transmission apparatus;
   an optical fiber abnormality determination portion which determines an optical fiber with a failure based on the equipment monitoring information received by the monitoring unit signal reception portion;
   an optical switch which is configured to switch optical fibers to select one of the optical fibers into which a test optical pulse is to be injected;
   a test target optical fiber selection portion which selects the optical fiber determined as abnormal by the optical fiber abnormality determination portion, as a test target optical fiber using the optical switch;
   an optical fiber test portion which injects a test optical pulse into the optical fiber selected by the test target optical fiber selection portion to observe an OTDR waveform; and
   an optical fiber failure location determination portion which determines a location of failure based on a test result by the optical fiber test portion.

4. The optical fiber line automatic monitoring system according to any one of claims 1 to 3, further comprising
   a test result display portion which displays a result of the optical fiber test on a monitor screen.

5. The optical fiber line automatic monitoring system according to any one of claims 1 to 3, further comprising
   an abnormality occurrence location display portion which determines a failure location from the result of the optical fiber test to display the abnormal site on a map of a monitor screen of a display portion.

6. An optical fiber line automatic monitoring method in an optical fiber line automatic monitoring system, which selects an optical fiber within an optical fiber line and observes an OTDR waveform by injecting a test optical pulse into the selected optical fiber, to thereby determine a failure location, by the function of a control portion in the optical fiber line automatic monitoring system, the monitoring method comprising:

an alarm signal reception procedure in which information is accepted, with regard to an optical fiber with a failure as an alarm signal, from a network monitoring apparatus which detects a failure occurrence of an optical fiber in an optical fiber line;

a test target optical fiber selection procedure which identifies an optical fiber with an abnormality based on failure occurrence information included in the alarm signal received in the alarm signal reception procedure, to select an optical fiber to be tested using an optical switch which is configured to switch optical fibers to select one of the optical fibers into which a test optical pulse is to be injected;

an optical fiber test procedure which injects a test optical pulse into the optical fiber selected in the test target optical fiber selection procedure to observe an OTDR waveform; and an optical fiber failure location determination procedure which determines a location of failure in the optical fiber based on a test result in the optical fiber test procedure.

* * * * *